(12) United States Patent
Hioki

(10) Patent No.: US 8,448,871 B2
(45) Date of Patent: May 28, 2013

(54) TAG TAPE, RFID LABEL, TAG TAPE ROLL, AND RIFD CIRCUIT ELEMENT CARTRIDGE

(75) Inventor: Hitomi Hioki, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 747 days.

(21) Appl. No.: 12/383,133

(22) Filed: Mar. 20, 2009

(65) Prior Publication Data
US 2009/0236429 A1 Sep. 24, 2009

(51) Int. Cl.
*G06K 5/00* (2006.01)

(52) U.S. Cl.
USPC .......................................... 235/492; 235/387

(58) Field of Classification Search
USPC .................................. 235/487, 492
See application file for complete search history.

(56) References Cited

U.S. PATENT DOCUMENTS

| | | | |
|---|---|---|---|
| 5,066,152 A | 11/1991 | Kuzuya et al. | |
| 7,552,556 B2 * | 6/2009 | Anderson | 40/638 |
| 7,557,715 B1 * | 7/2009 | Noakes et al. | 340/572.8 |
| 2006/0118229 A1 * | 6/2006 | Ohashi et al. | 156/60 |
| 2006/0208095 A1 | 9/2006 | Yamagajo et al. | |
| 2008/0150721 A1 * | 6/2008 | Weslake et al. | 340/572.3 |
| 2010/0045437 A1 | 2/2010 | Hioki et al. | |

FOREIGN PATENT DOCUMENTS

| | | |
|---|---|---|
| CN | 1835000 A | 9/2006 |
| DE | 102 05 914 A1 | 8/2003 |
| EP | 1 845 484 A1 | 10/2007 |
| JP | Y-02-59971 | 5/1990 |
| JP | Y-06-34126 | 9/1994 |
| JP | 2003-136861 | 5/2003 |
| JP | 2005-309956 A | 11/2005 |
| JP | 2005-352886 | 12/2005 |
| JP | 2006-155265 | 6/2006 |
| JP | 2008-021291 A | 1/2008 |
| WO | WO 2005/076206 A1 | 8/2005 |
| WO | WO 2008/004409 A1 | 1/2008 |

OTHER PUBLICATIONS

Japanese Office Action in JP 2008-154726 on Mar. 19, 2012.
Japanese Office Action in JP 2008-154727 on Mar. 19, 2012.
Chinese Office Action in CN 200910128277.1 on Apr. 28, 2012.

\* cited by examiner

*Primary Examiner* — Daniel St Cyr
(74) *Attorney, Agent, or Firm* — McCarter & English, LLP

(57) ABSTRACT

A disclosure discloses tag tape comprising a plurality of RFID tag main bodies, and a first tape and a second tape provided on opposite sides in the tape thickness direction so as to position said plurality of RFID tag main bodies therebetween, wherein: said RFID tag main body comprises a sheet-shaped antenna base, a tag antenna provided on said antenna base that transmits and receives information, and an IC holding body that includes an IC circuit part storing information and a holding member holding said IC circuit part to said antenna base; said second tape comprises an affixing adhesive layer for affixing said plurality of RFID tag main bodies to an object to be affixed, and a separation material layer provided on said affixing side of said affixing adhesive layer and peeled off by a user at the affixing; and an affixing streamlining process for streamlining label affixing without impairing a communication function is executed on at least of said separation material layer and said IC holding body.

8 Claims, 35 Drawing Sheets

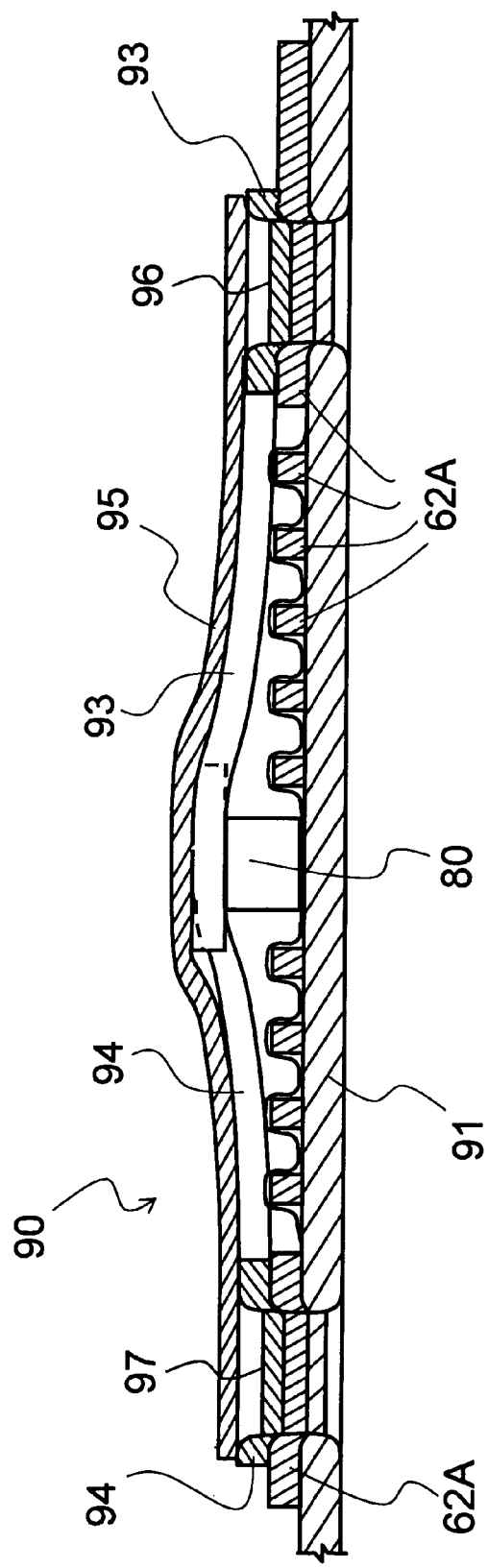

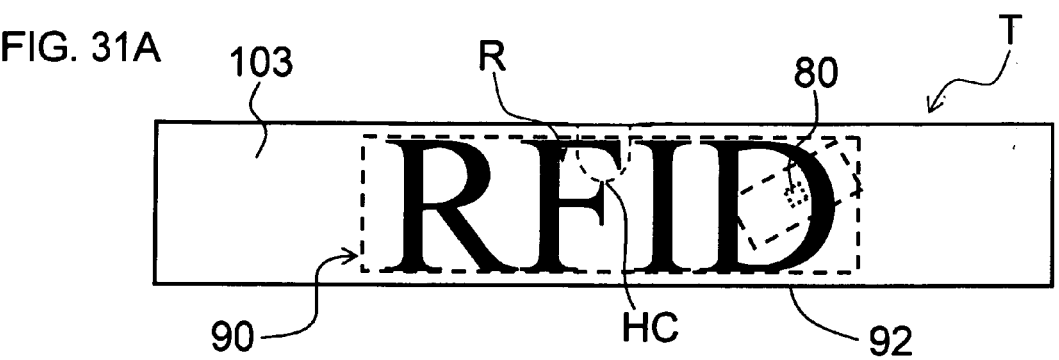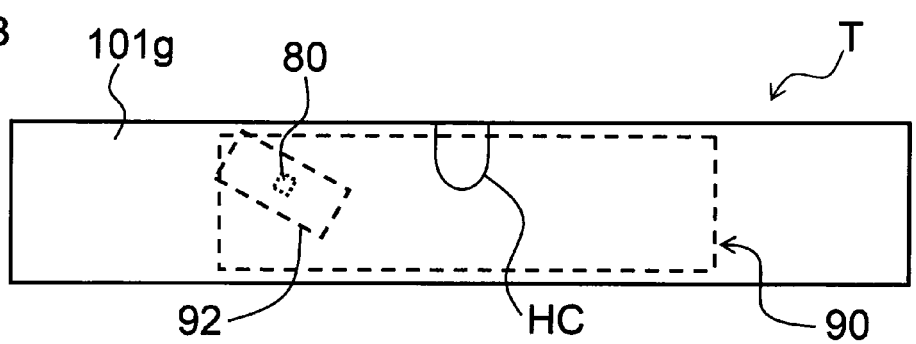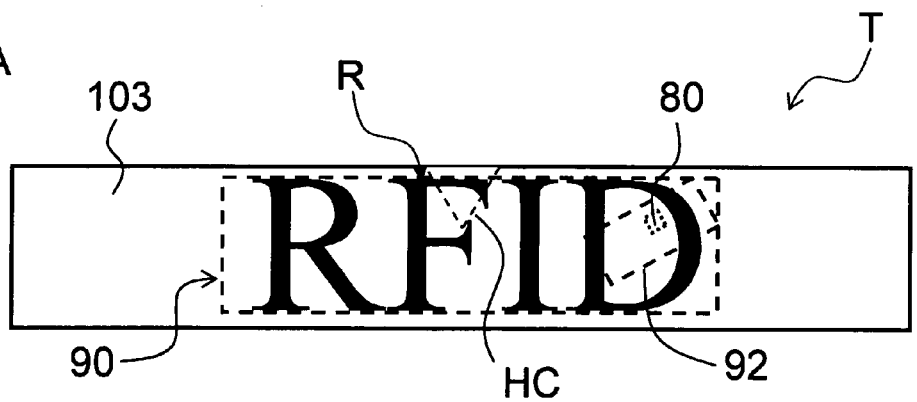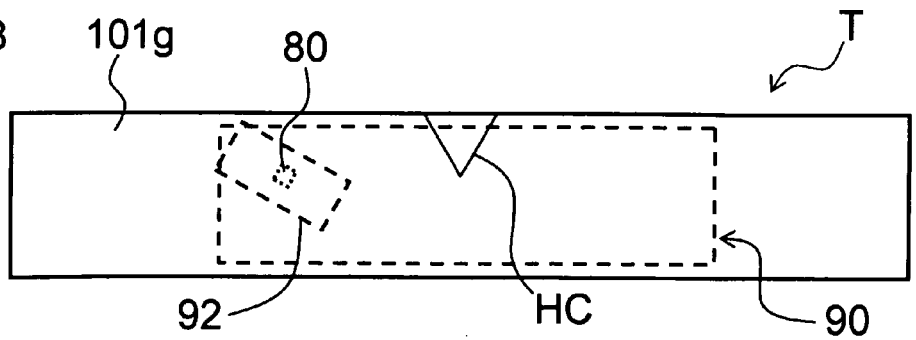

TAG TAPE, RFID LABEL, TAG TAPE ROLL, AND RIFD CIRCUIT ELEMENT CARTRIDGE

CROSS-REFERENCE TO RELATED APPLICATIONS

This application claims priority from JP 2008-72946, filed Mar. 21, 2008, and JP 2008-154725, filed Jun. 12, 2008, the contents of which are hereby incorporated by reference.

BACKGROUND

1. Field

The present disclosure relates to a tag tape having an RFID circuit element comprising an IC circuit part that stores information and a tag antenna that transmits and receives information, an RFID label produced using this tag tape, a tag tape roll comprising the tag tape, and an RFID circuit element cartridge capable of supplying the tag tape.

2. Description of the Related Art

In prior art, a tape printing apparatus (a label producing apparatus) that stores a tape that is to serve as a print-receiving material in the form of a roll and print desired text on the tape while the tape is fed out from the roll so as to discharge the tape in the form of a label has already been proposed (refer to JP, Y, 06-34126, for example).

In this prior art, the tape printing apparatus comprises a roll (supply spool) around which a print-receiving tape is wound, and a roll (supply spool) around which a separation sheet comprising an adhesive layer on one surface is wound. The apparatus is characterized in that desired printing is performed on the print-receiving tape while the print-receiving tape is fed out from one roll, a separation sheet with an adhesive layer fed out from the other roll is bonded to the print-receiving tape after printing, and this print-receiving tape with the separation sheet bonded thereto is then cut by a cutter (full-cutting cutter) at a predetermined length so as to produce a printed label (piece of tape).

The produced printed label is then affixed to an object to be affixed by peeling off the separation sheet and exposing the adhesive layer. At this time, a cut is provided on the separation sheet in advance or cutting is performed on only the separation sheet of each printed label using a half-cutting cutter (without cutting the print-receiving tape) so as to form a cut line (half-cut part) that serves as a cut when the separation sheet is peeled off. When the separation sheet is peeled off and the printed label is affixed to a predetermined object to be affixed, the area near the cut line of the printed label is bent towards the print-receiving tape side, causing the end part of the area near the cut line of the separation sheet to peel from the print-receiving tape and protrude upward, allowing the user to take hold of the protruding section with his/her fingers and easily peel the separation sheet from the print-receiving tape.

In recent years, an RFID (Radio Frequency Identification) system that reads/writes information between a small-sized RFID tag comprising an RFID circuit element and a reader/writer (reading/writing apparatus) in a non-contact manner has attracted attention. An RFID circuit element provided to an RFID tag comprises an IC circuit part that stores predetermined information, and a tag antenna that transmits/receives information, connected (joined) to the IC circuit part. With such an arrangement, the reader/writer can access (read/write information with) the IC circuit part provided in the tag even if the RFID tag has become dirty or has come to be located at a position where it cannot be seen. Thus, it is anticipated that such a technique will be of practical use in a wide variety of fields such as commodity management, inspection process, and the like.

With such an RFID tag, when information related to the RFID tag information aside from the tag information stored in the interior is printed on the label and the label is used as an RFID label with print in the same manner as the prior art described above, the user is able to visually check the related information, making the design convenient in various ways.

Here, a tag label producing apparatus of the above-described prior art is used as an apparatus that produces RFID labels, an RFID label is produced by reading and writing information to and from the RFID tag and printing the information on the RFID tag, and a cut line is formed on the separation sheet on the back of the label, thereby making it possible for the user to easily peel off the separation sheet from the cut line using his/her fingers and affix the RFID label.

Nevertheless, in such a case, when the area near the cut line is bent as described above, the possibility exists that the resultant external force and deformation will result in an adverse physical effect on the RFID circuit element provided to the RFID label. For example, because the IC circuit part and antenna are conductably connected (joined) in some type of standard format, resulting in a relative weak point strengthwise in comparison to other sections, this connected part (or joined part) may become damaged by the above-described bend, resulting in impairment of the communication function.

SUMMARY

It is therefore an object of the present disclosure to provide a tag tape, an RFID label, a tag tape roll, and an RFID circuit element cartridge that improves user-friendliness at the time of label affixing without impairing the communication function.

To achieve the above-described object, an aspect of the present application is a tag tape comprising a plurality of RFID tag main bodies and a first tape and a second tape provided on opposite sides in the tape thickness direction so as to position the plurality of RFID tag main bodies therebetween, wherein: the RFID tag main body comprises a sheet-shaped antenna base, a tag antenna provided on the antenna base that transmits and receives information, and an IC holding body that includes an IC circuit part storing information and a holding member holding the IC circuit part to the antenna base; the second tape comprises an adhesive layer for affixing the plurality of RFID tag main bodies to an object to be affixed, and a separation material layer provided on the affixing side of the affixing adhesive layer and peeled off by the user at the time affixing, and an affixing streamlining process for streamlining label affixing without impairing a communication function is executed on at least of the separation material layer and the IC holding body.

In the aspect of the present disclosure, the IC circuit part of the tag tape is held on the antenna base by the holding member of the IC holding body, thereby electrically connecting the IC circuit part to the tag antenna provided in the antenna base. Note that when the user peels off the separation material layer, the peeling mode (peel-off location, peel-off direction, etc.) causes an external force to be applied to the IC holding body as well, resulting in the possibility that some of the components of the IC holding body may become damaged, thereby impairing the communication function. In the first aspect of the present disclosure, the affixing streamlining process is implemented on at least the separation material layer or IC holding body so as to prevent impairment of the communication function and streamline label affixing. As a result, the user can efficiently peel off the separation material layer and affix the label to the object while preventing the communication function of the RFID tag from becoming impaired. The user-friendliness at the time of label affixing is thus improved.

BRIEF DESCRIPTION OF THE DRAWING

FIG. 6B shows an enlarged view of section VIb of FIG. 6A of the first tape and the holding member from the front surface side, and FIG. 6C shows the detailed configuration of section VIc of FIG. 6B.

FIG. 7 is a cross-sectional view of the area surrounding the IC circuit part of the RFID tag main body shown in FIG. 6. FIG. 7A shows a cross-sectional view of the cross-section VIIa-VIIa of FIG. 6C, and FIG. 7B shows a cross-sectional view of the cross-section VIIb-VIIb of FIG. 6C.

FIG. 9A shows the front surface, FIG. 9B shows a cross-sectional view of the cross-section IXb-IXb of FIG. 9A, FIG. 9C shows the back surface, and FIG. 9D shows a cross-sectional view of the cross-section IXd-IXd of FIG. 9A.

FIG. 10 schematically shows the state of the RFID tag main body when the RFID label is bent along the half-cut line.

FIG. 11 is a diagram showing an example of the configuration of the RFID label in a case where the half-cut line extends in the tape width direction.

FIG. 12 is a diagram showing an example of the configuration of the RFID label in a case where the half-cut line is provided as a perforated line.

FIG. 13 is a diagram showing an example of the configuration of the RFID label in a case where the half-cut line is provided as a perforated line in the tape width direction.

FIG. 14 is a diagram showing an example of the configuration of the RFID label in a case where the half-cut line is provided in an L-shape.

FIG. 15 is a diagram showing an example of the configuration of the RFID label in a case where the half-cut line is provided in a circular-arc shape.

FIG. 16 is a diagram showing an example of the configuration of the RFID label in a case where the half-cut line is provided in a U-shape.

FIG. 17 is a diagram showing an example of the configuration of the RFID label in a case where the half-cut line is provided in a U-shape.

FIG. 18 is a diagram showing an example of the configuration of the RFID label in a case where the half-cut line is provided in a V-shape.

FIG. 19 is a diagram showing an example of the configuration of the RFID label in a case where the half-cut line is provided in a diagonal slit shape.

FIG. 20 is a diagram showing an example of the configuration of the RFID label in a case where the half-cut line is provided in a half-line shape in the tape longitudinal direction.

FIG. 21 is a diagram showing an example of the configuration of the RFID label produced from the tag tape of embodiment 2 of the present disclosure.

FIG. 22 is a diagram showing an example of the configuration of the RFID label in a case where the IC holding body is provided so as to protrude on the second tape side. FIG. 22A shows the front surface, FIG. 22B shows the cross-sectional view of the cross-section XXIIb-XXIIb of FIG. 22A, FIG. 22C shows the back surface, and FIG. 22D shows the cross-sectional view of the cross-section XXIId-XXIId of FIG. 22A.

FIG. 23 is a diagram showing an example of the configuration of the RFID label in a case where the half-cut line is provided in the tape width direction.

FIG. 28 is a diagram showing an example of the configuration of the RFID label in a case where the half-cut line is provided in a circular-arc shape.

FIG. 29 is a diagram showing an example of the configuration of the RFID label in a case where the half-cut line is provided in a U-shape.

FIG. 30 is a diagram showing an example of the configuration of the RFID label in a case where the half-cut line is provided in an L-shape.

FIG. 31 is a diagram showing an example of the configuration of the RFID label in a case where the half-cut line is provided in a U-shape. FIG. 31A shows the front surface of the RFID label, and FIG. 31B shows the back surface of the RFID label.

FIG. 32 is a diagram showing an example of the configuration of the RFID label in a case where the half-cut line is provided in a V-shape. FIG. 32A shows the front surface of the RFID label, and FIG. 32B shows the back surface of the RFID label.

FIG. 33 is a diagram showing an example of the configuration of the RFID label in a case where the half-cut line is provided in a diagonal slit shape.

FIG. 34 is a diagram showing an example of the configuration of the RFID label in a case where the half-cut line is provided as a perforated line in the width direction.

FIG. 43 is a diagram showing an example of the configuration of the RFID label produced from the tag tape of embodiment 3 of the present disclosure.

FIG. 45 is a diagram illustrating one example of the configuration of the RFID label in a case where the peel-off display part imparts peel-off from the side near the IC holding body.

DETAILED DESCRIPTION OF THE PREFERRED EMBODIMENTS

In the following, some embodiments of the present disclosure will be described with reference to the accompanying drawings. First, embodiment 1 will be described.

Figure 1:
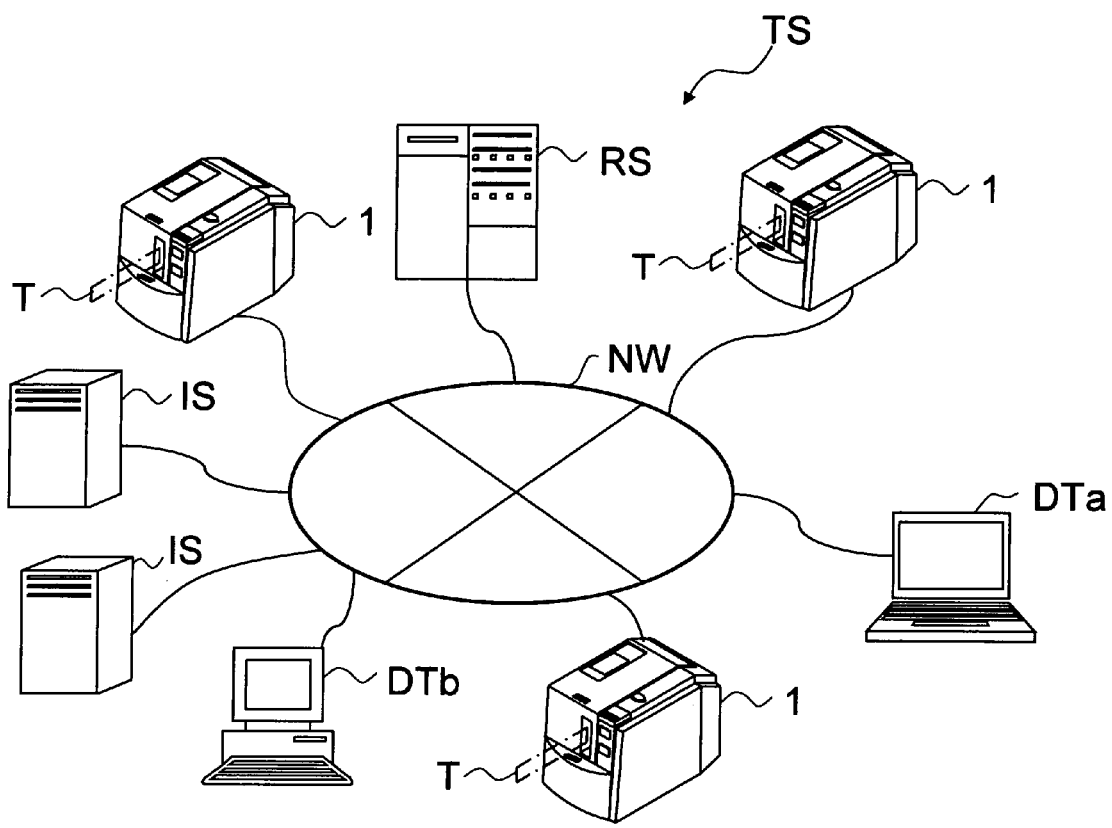
FIG. 1 is a diagram showing the configuration of an RFID label system comprising a tag label producing apparatus that uses the tag tape of embodiment 1 of the present disclosure.

An RFID label system TS comprising a tag label producing apparatus 1 that uses the tag tape of embodiment 1 is shown in FIG. 1.

In the RFID label system TS, the tag label producing apparatus 1 comprises a route server RS, an information server IS, a terminal apparatus DTa, a general-purpose computer DTb, etc., via a communication network NW comprising a suitable communication line, etc.

Figure 2:
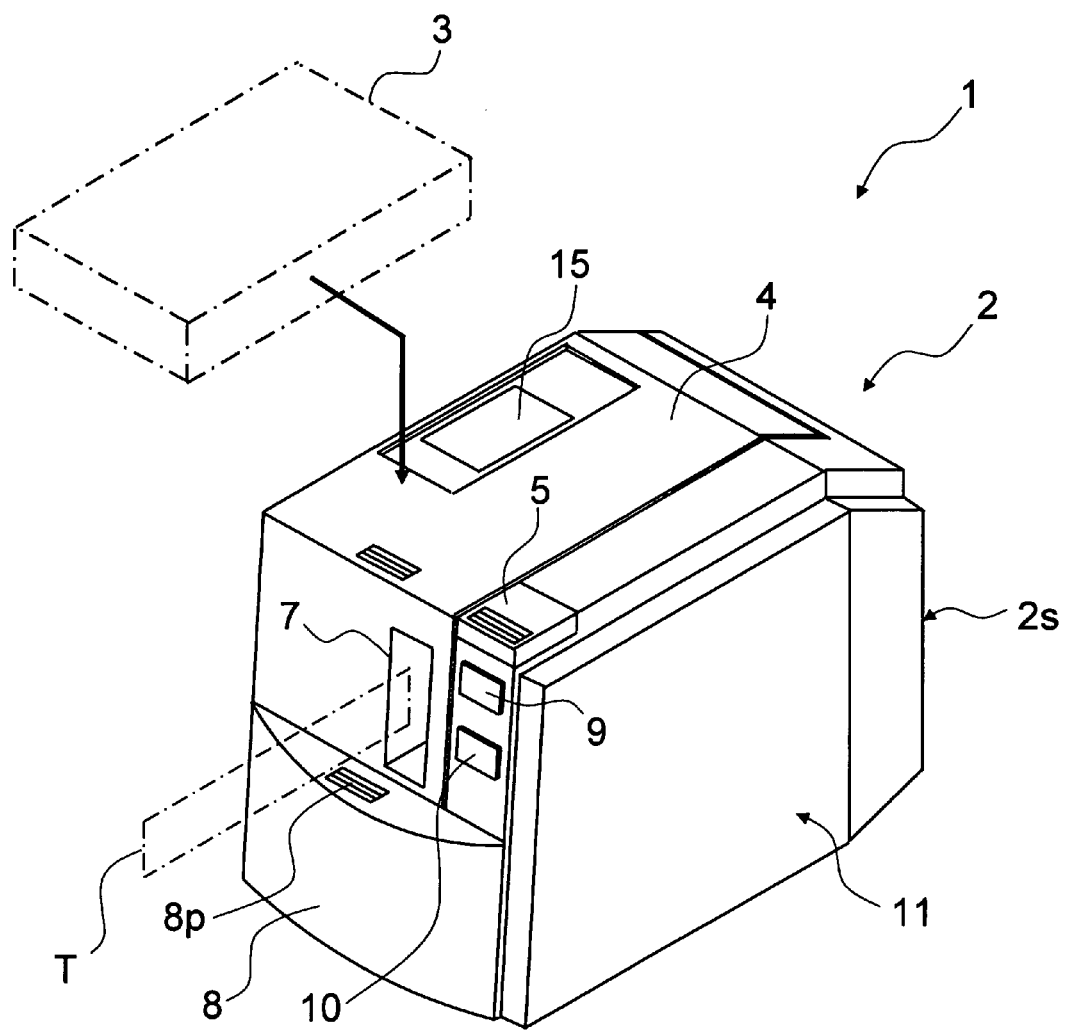
FIG. 2 is a diagram showing the outer appearance structure of the tag label producing apparatus.

As shown in FIG. 2, the tag label producing apparatus 1 has an apparatus main body 2 comprising a cartridge holder 31 (refer to FIG. 3) to which a cartridge 3 is mounted.

The apparatus main body 2 comprises a housing 2s of an overall rectangular shape as an outer shell comprising an upper surface part, a lower surface part, a front surface part, a rear surface part, and both left and right side surface parts. On the upper surface part are provided an upper lid 4 and an upper lid operation button 5. On the front surface part are provided a label discharging exit 7, a front lid 8, a power button 9, and a cutter driving button 10.

The upper lid 4 is rotatably supported at the end part of the right back side in FIG. 2 of the apparatus main body 2, is biased in the opening direction by a biasing member (not shown), and is lockable with the apparatus main body 2. When the cartridge 3 is removed or installed, the lid operation button 5 is pressed, thereby releasing the lock and opening the upper lid 4 via the biasing action of the biasing member, enabling cartridge 3 removal or installation in that state. Furthermore, on the upper lid 4 is provided an inspection window 15 fit with a transparent cover, etc.

The label discharging exit 7 discharges to the outside an RFID label T formed in the interior of the apparatus main body 2. The front lid 8 can be opened and closed when rotated using the lower end as the fulcrum point, and rotates forward and opens when a pressing part 8p provided on the upper end part is pressed upward. The power button 9 is used to turn on and off the main power source of the tag label producing apparatus 1. The cutter driving button 10 is for cutting a tag label tape 109 with print and forming an RFID label T when a cutter 51 (refer to FIG. 3) described later is operated manually by a user.

Figure 3:
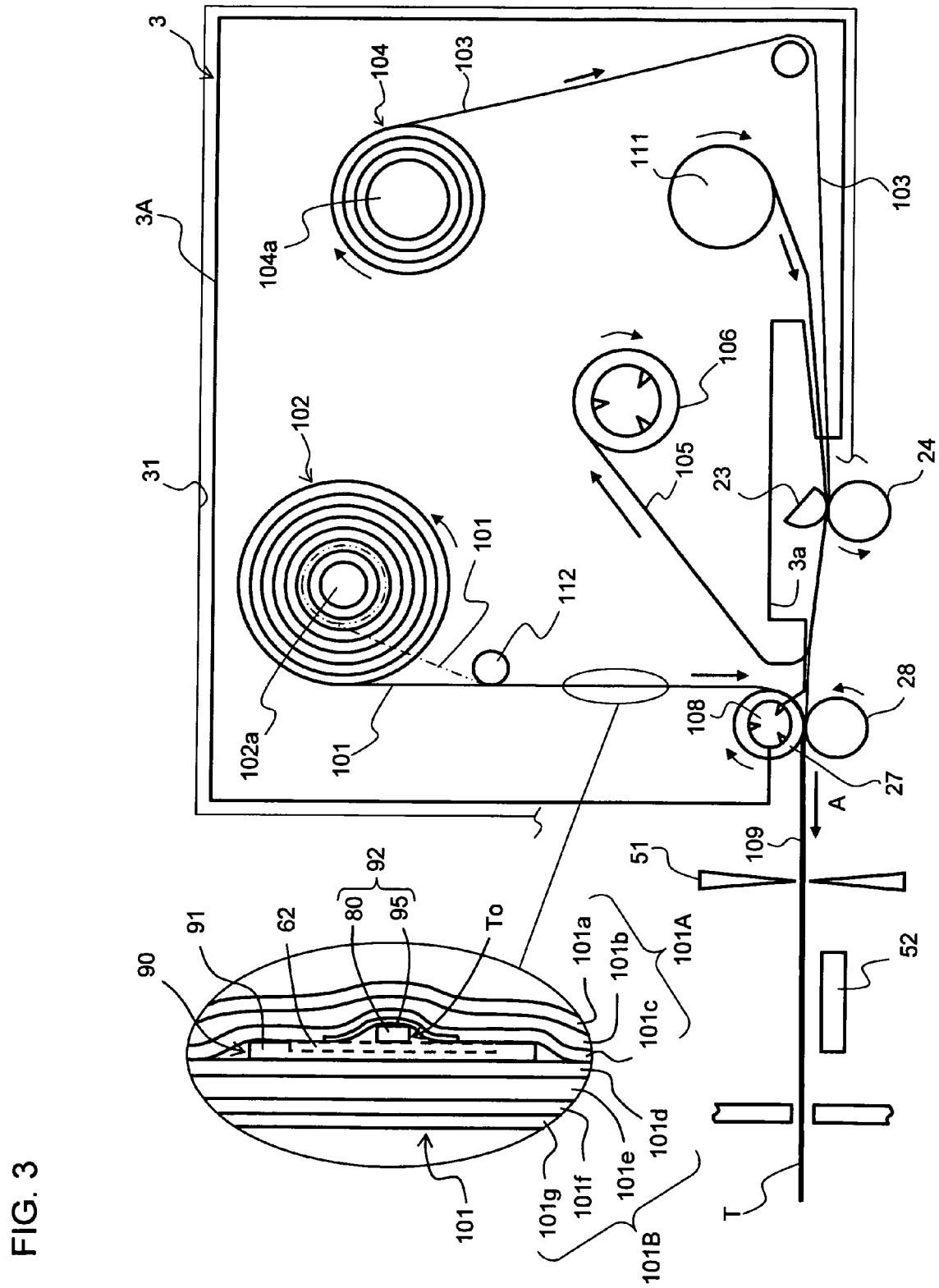
FIG. 3 is a diagram that schematically shows the configuration of the main parts of the cartridge holder of the apparatus main body, and the cartridge loaded thereto.

As shown in FIG. 3, the cartridge 3 is designed so that the orientation of the width direction of the tag label tape 109 with print discharged from the label discharging exit 7 is roughly vertical on the paper of the figure, and is stored in the cartridge holder 31. The cartridge 3 comprises a housing 3A, a first roll 102 (actually spiral in shape, but simply shown in a concentric shape in the figure for the sake of convenience), around which a strip-shaped tag tape 101 is wound, and which is disposed within the housing 3A, a second roll 104 (actually spiral in shape, but simply shown in a concentric shape in the figure for the sake of convenience), around which a transparent cover film 103 is wound, with approximately the same width as that of the tag tape 101, a ribbon supply side roll 111 that supplies an ink ribbon 105 (heat transfer ribbon, which is not required in a case of employing a thermal tape as the print-receiving tape), a ribbon take-up roller 106 that rewinds the ink ribbon 105 after the printing, a feeding roller 27 rotatably supported near a tape discharging part of the cartridge 3, and a guide roller 112 that functions as transport position regulating means.

The feeding roller 27 is that affixes the tag tape 101 and the cover film 103 to each other by applying pressure and feeding the tag label tape 109 with print thus formed in the direction of the arrow A (i.e. functioning as a pressure roller as well) in coordination with an opposing tape pressure roller 28.

The first roll 102 stores, in a manner such that it is wound around a reel member 102a, the tag tape 101, which has a structure in which a plurality of RFID tag main bodies 90 are serially formed at a predetermined interval along the longitudinal direction. The tag tape 101 comprises a seven-layer structure in this example (refer to the partially enlarged view in FIG. 3) in this example. That is, the tag tape 101 is designed with layers comprised of an adhesive layer 101a made of a suitable adhesive, a colored first base film 101b made of PET (polyethylene terephthalate) or the like, an adhesive layer 101c made of a suitable adhesive, an adhesive layer 101d made of a suitable adhesive, a second base film 101e made of PET (polyethylene terephthalate), an adhesive layer 101f made of a suitable adhesive, and a separation sheet 101g, which are layered from the side wrapped on the inside (the right side in FIG. 3) to the opposite side (the left side in FIG. 3).

The adhesive layer 101a for subsequently adhering the cover film 103 is formed on the front side (right side in FIG. 3) of the first base film 101b, and the adhesive layer 101c is provided on the back side (left side in FIG. 3) of the first base film 101b so as to contain an RFID tag main body 90 therein. These three layers are integrated into a single unit so as to form a first tape 101A. The adhesive layer 101d that is to be bonded with the back side (left side in FIG. 3) of the adhesive layer 101c of the first tape 101A is formed on the front side (right side in FIG. 3) of the second base film 101e with the RFID tag main body 90 positioned therebetween, and the separation sheet 101g is adhered by the adhesive layer 101f to the back side (left side in FIG. 3) of the second base film 101e. Of these layers, the four layers including the adhesive layer 101d, the second base film 101e, the adhesive layer 101f, and the separation sheet 101g are integrated into a single unit so as to form a second tape 101B.

The RFID tag main body 90 comprises an antenna base 91 made of resin formed into a sheet shape, a loop antenna 62 of a loop-coil shape provided so as to be exposed on the front side (right side of FIG. 3) of the antenna base 91, an IC circuit part 80 disposed on the front side (right side of FIG. 3) of the antenna base 91 and that stores information, and an IC holding body 92 that includes a holding member 95 that holds the IC circuit part 80 to the antenna base 91. The holding member 95 holds the IC circuit part 80 to the antenna base 91 and connects the loop antenna 62 and the IC circuit part 80 by covering the front side (right side of FIG. 3) of the IC circuit part 80. Furthermore, the loop antenna 62 that transmits and receives information and the IC circuit part 80 that stores information constitute an RFID circuit element To. Then, when the RFID tag main body 90 is viewed overall, the IC circuit part 80 formed into a roughly rectangular shape is disposed on the front surface of the front side (right side in FIG. 3) of the antenna base 91, and the holding member 95 covers the front side thereof (right side in FIG. 3), resulting in a configuration wherein the IC holding body 92 is provided so as to protrude to the first tape 101A side of the antenna base 91. (Details of the RFID tag main body 90 and the IC circuit part 80 will be described later.)

Figure 6A:
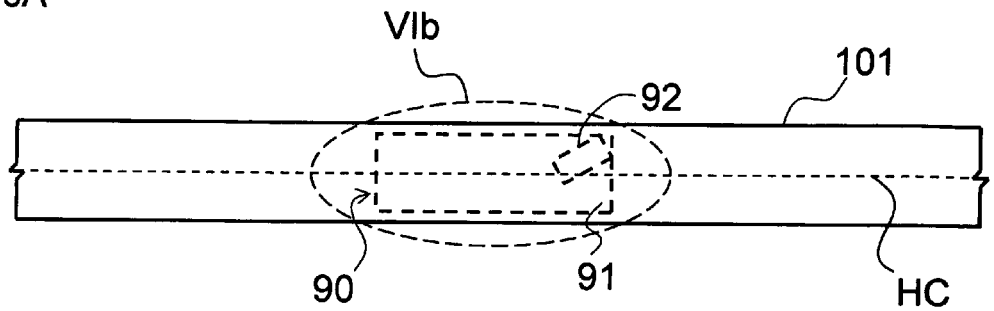
FIG. 6A to FIG. 6C show an example of the layout and configuration of the RFID tag main body of the tag tape.
Figure 6B:
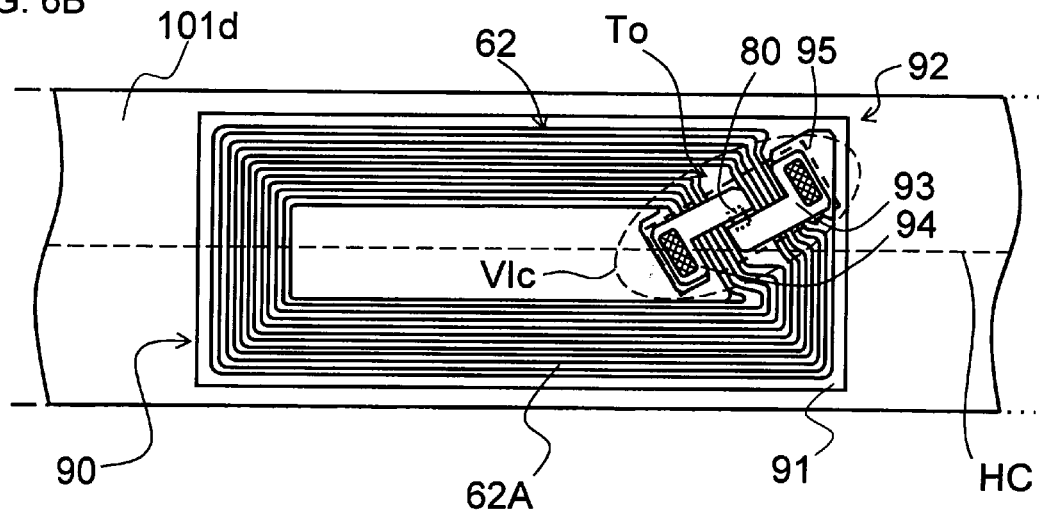
Figure 6C:
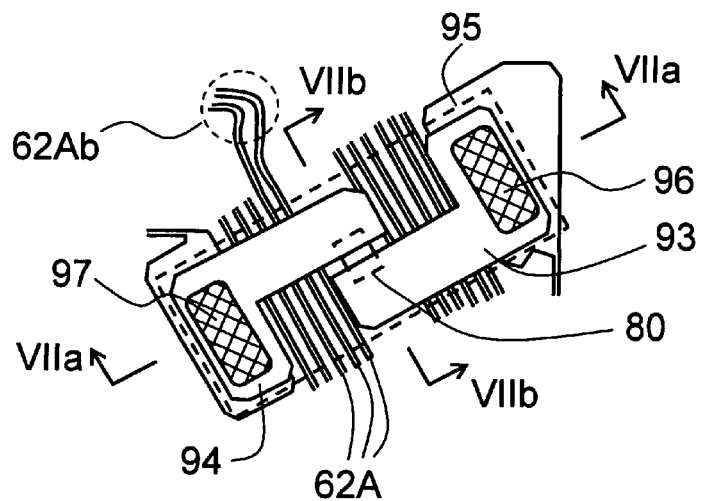

The separation sheet 101g is peeled off when the RFID label T (refer to FIG. 9 described later) eventually formed into a label-shape is to be affixed to an object such as a predetermined article, thereby making it possible to adhere the RFID label T to the article or the like by the adhesive layer 101f. Although not shown in FIG. 3, at the center in the tape width direction of the separation sheet 101g, the half-cut line HC (refer to FIG. 6 and the like) that cuts only the separation sheet 101g in the tape longitudinal direction is formed in a continuous straight line so that the separation sheet 101g protrudes upward and is easily peeled off from the RFID label T when the user bends the RFID label T along the half-cut line HC. The half-cut line HC does not necessarily need to be formed as a full cut in the thickness direction dimension of the separation sheet 101g, but may be formed as a partial cut in the thickness direction dimension of the separation sheet 101g.

On the other hand, the second roll 104 has the cover film 103 wound around a reel member 104a as shown in FIG. 3. The cover film 103 fed out from the second roll 104 is pressed against the ink ribbon 105 driven by the ribbon supply side roll 111 and the ribbon take-up roller 106, which are disposed inward from the back side of the cover film 103 (i.e., the side of the cover film 103 which is affixed to the tag tape 101), by the print head 23 (provided on the cartridge holder 31 side), such that the ink ribbon 105 contacts the back side of the cover film 103.

A cutout part 3a for exposing to the outside a part of the feeding path of the cover film 103 and the ink ribbon 105 is formed on the housing 3A of the cartridge 3 so that the print head 23 provided on the cartridge holder 31 side is pressed on the ink ribbon 105 and the cover film 103 when the cartridge 3 is loaded to the cartridge holder 31.

Further, a platen roller 24 for creating a pressing force against the cover film 103 and feeding the tape is provided in a position opposite the print head 23 on the cartridge holder 31 side. The cutter 51 (a scissors-type cutter in this example) is arranged on the cartridge holder 31, adjacent to the discharging exit of the cartridge 3. The cutter 51 is connected to a solenoid (not shown). This solenoid is energized by a solenoid driving circuit (not shown), thereby operating the cutter 51. With this arrangement, the tag tape 109 with print is cut at a predetermined length so as to form the RFID label T.

An apparatus antenna 52 provided on the tag label producing apparatus 1 performs the communication for information reading/writing with the RFID circuit element To disposed in the tag tape 101.

Figure 4:
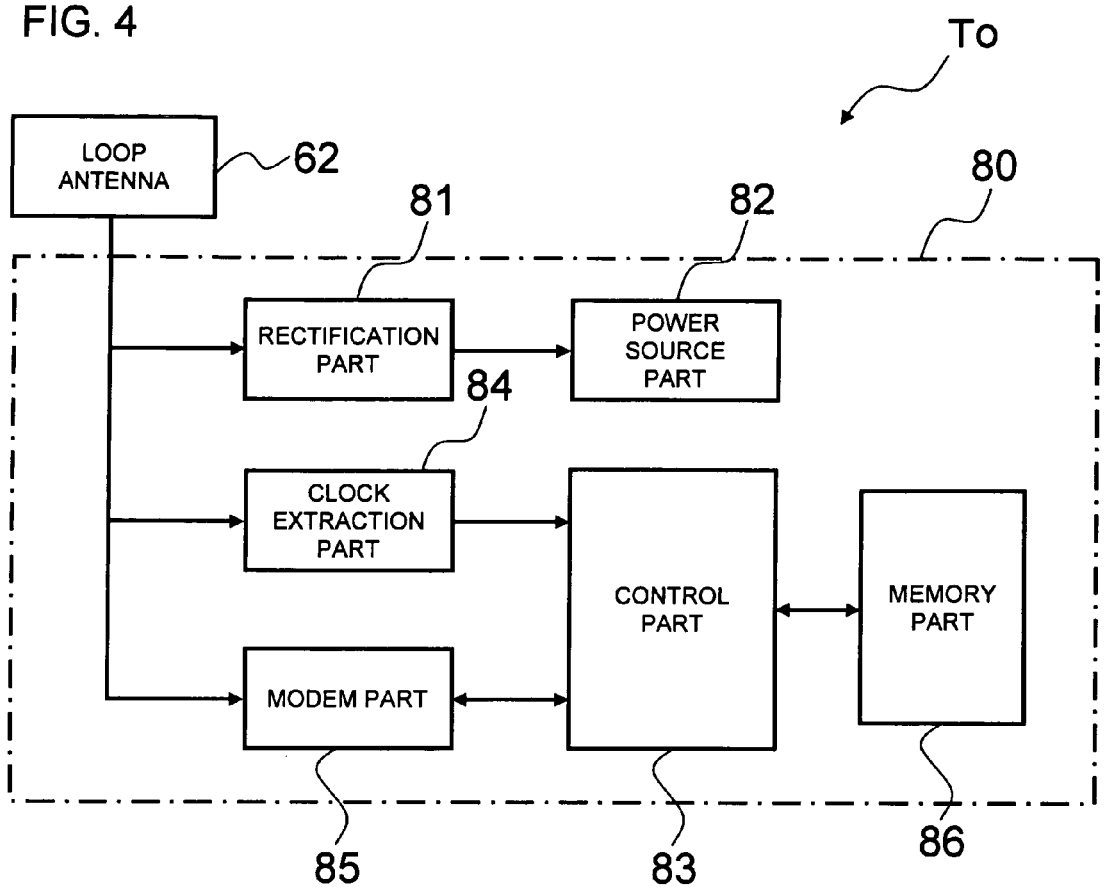
FIG. 4 is a functional block diagram which shows the functional configuration of an RFID circuit element.

As shown in FIG. 4, the RFID circuit element To comprises the apparatus antenna 52 of the tag label producing apparatus 1, the loop antenna 62 that transmits/receives signals in a non-contact manner by wireless communication or magnetic induction, and the IC circuit part 80 connected to the loop antenna 62, as described above.

The IC circuit part 80 comprises a rectification part 81 that rectifies the interrogation wave received via the loop antenna 62, a power source part 82 that stores the energy of the interrogation wave thus rectified by the rectification part 81 as a driving power source, a clock extraction part 84 that extracts a clock signal from the interrogation wave thus received from the loop antenna 62 and supply the clock signal thus extracted to a control part 83, a memory part 86 that stores a predetermined information signal, a modem part 85 connected to the loop antenna 62, and the control part 83 for controlling the operation of the RFID circuit element To via the memory part 86, the clock extraction part 84, the modem part 85, etc.

The modem part 85 demodulates interrogation waves from the apparatus antenna 52 of the tag label producing apparatus 1 received from the loop antenna 62, modulates a reply signal from the control part 83, and replies with a response wave (signal including a tag ID) from the loop antenna 62.

The clock extraction part 84 extracts the clock component from the received signal, and supplies the clock corresponding to the frequency wave of the clock component thus extracted to the control part 83.

The control part 83 executes basic control, such as interpreting a received signal demodulated by the modem part 85, generating a reply signal based on the information signal stored in the memory part 86, and returning the reply signal from the loop antenna 62 via the modem part 85.

Figure 5:
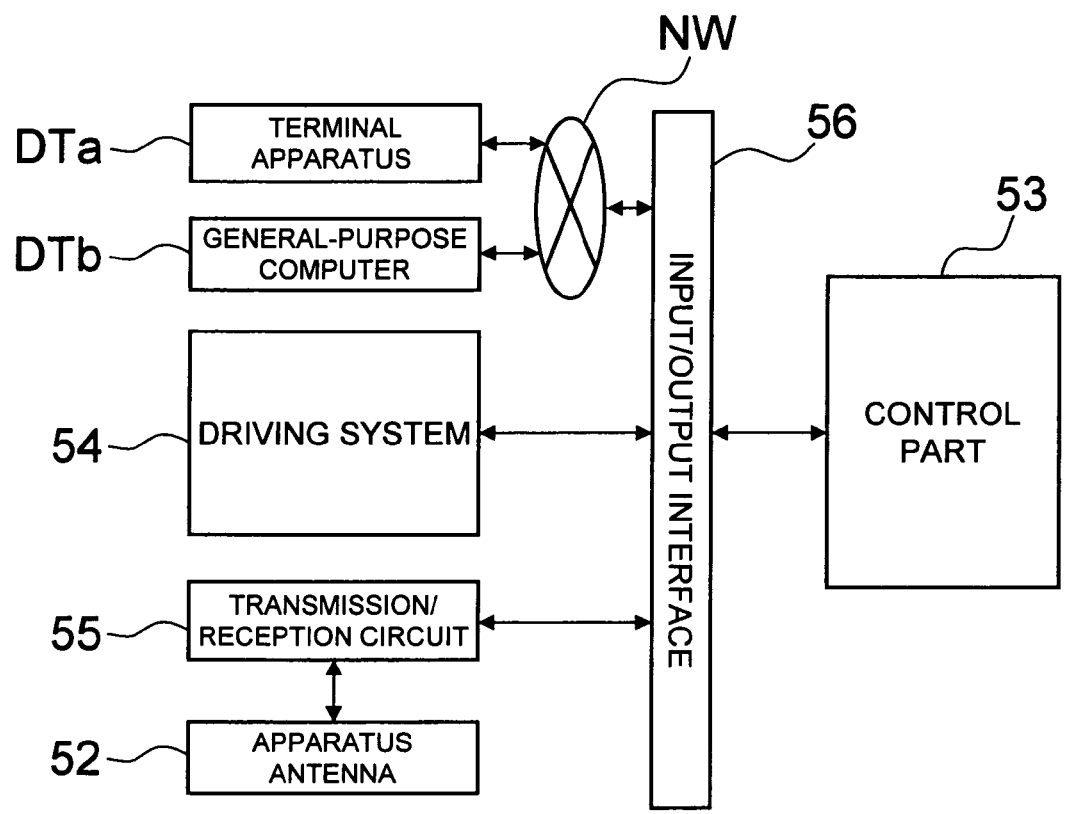
FIG. 5 is a functional block diagram illustrating the functional configuration of a control system of the tag label producing apparatus.

A control system of the tag label producing apparatus 1 in the embodiment is shown in FIG. 5.

In FIG. 5, the tag label producing apparatus 1 is provided with a control part 53 comprising a microprocessor, etc., for example. The control part 53 is connected to the communication line NW which is connected to the aforementioned terminal apparatus DTa, and the general-purpose computer DTb via an input/output interface 56.

A driving system 54 comprising a roller driving circuit that drives the feeding roller 27, etc., of the cartridge holder 31, a print-head driving circuit that drives the print head 23, a solenoid driving circuit that drives the solenoid, and the like, and a transmission/reception circuit 55 connected to the apparatus antenna 52 are connected to the input/output interface 56.

An example of the layout and configuration of the RFID tag main body of the tag tape is shown in FIG. 6A to FIG. 6C, and FIG. 7A to FIG. 7B. As shown in the FIGS. 6A-6C and 7A-7B, the tag tape 101 comprises a plurality of RFID tag main bodies 90 disposed at a predetermined interval in the longitudinal direction thereof (only one shown in the figure). Each of the RFID tag main bodies 90 comprises the antenna base 91, the loop antenna 62, and the IC holding body 92, which includes the IC circuit part 80 and the holding member 95. In this example, an antenna pattern 62A of the loop antenna 62 similarly formed in a roughly rectangular shape is disposed on the front side (the upper side in the FIG. 7) of the sheet-shaped antenna base 91 formed in a roughly rectangular shape and made of a suitable synthetic resin, and the IC holding body 92 comprises a first connection land 93 connected to the end part on the radial outside of the loop-coil shape of the antenna pattern 62A and a second connection land 94 connected to the other end part on radial inside.

The first connection land 93 and the second connection land 94 are sheet-shaped conducting members respectively formed into a roughly L-shape, and the respective shorter side sections are caulked from the front and back surfaces to the end part of the antenna pattern 62A and the antenna base 91 so that each is fixed to crimping parts 96 and 97. Then, each of the longer side sections are separated by a slight distance and arranged in parallel, and the IC circuit part 80 is provided on the antenna base 91 side of the longer side sections of the two connection lands 93 and 94 so as to overlap at a position that extends over the longer side sections. Then, the respective shorter side sections of each of the connection lands 93 and 94 are connected to the end part of the antenna pattern 62A at the crimping parts 96 and 97, and the respective longer side sections are connected to the IC circuit part 80 at the overlapping section. With this arrangement, the IC circuit part 80 is electrically connected to both end parts of the antenna pattern 62A of the loop antenna 62 via each of the connection lands 93 and 94, and energized.

Further, the antenna pattern 62A of the loop antenna 62 comprises a bending part 62Ab that bends near the IC circuit part 80 in a planar view (view opposite the front surface or back surface) of the RFID label T, so as to circumvent the IC circuit part 80. Then, the holding member 95 made of thin resin covers the front surface of the disposed area of the two connection lands 93 and 94 that include the IC circuit part 80. The IC circuit part 80 is held to the front surface of the antenna base 91 by the holding member 95 and each of the connection lands 93 and 94. That is, the holding member 95, the IC circuit part 80, and the two connection lands 93 and 94 constitute the IC holding body 92.

Then, as described above, the half-cut line HC of a continuous straight shape is formed in the tape longitudinal direction at the tape width center of the separation sheet 101g and, in this example, the second connection land 94 on the radial inner side of the antenna pattern 62A is provided in a position that overlaps with the half-cut line HC in a planar view.

Figure 8:
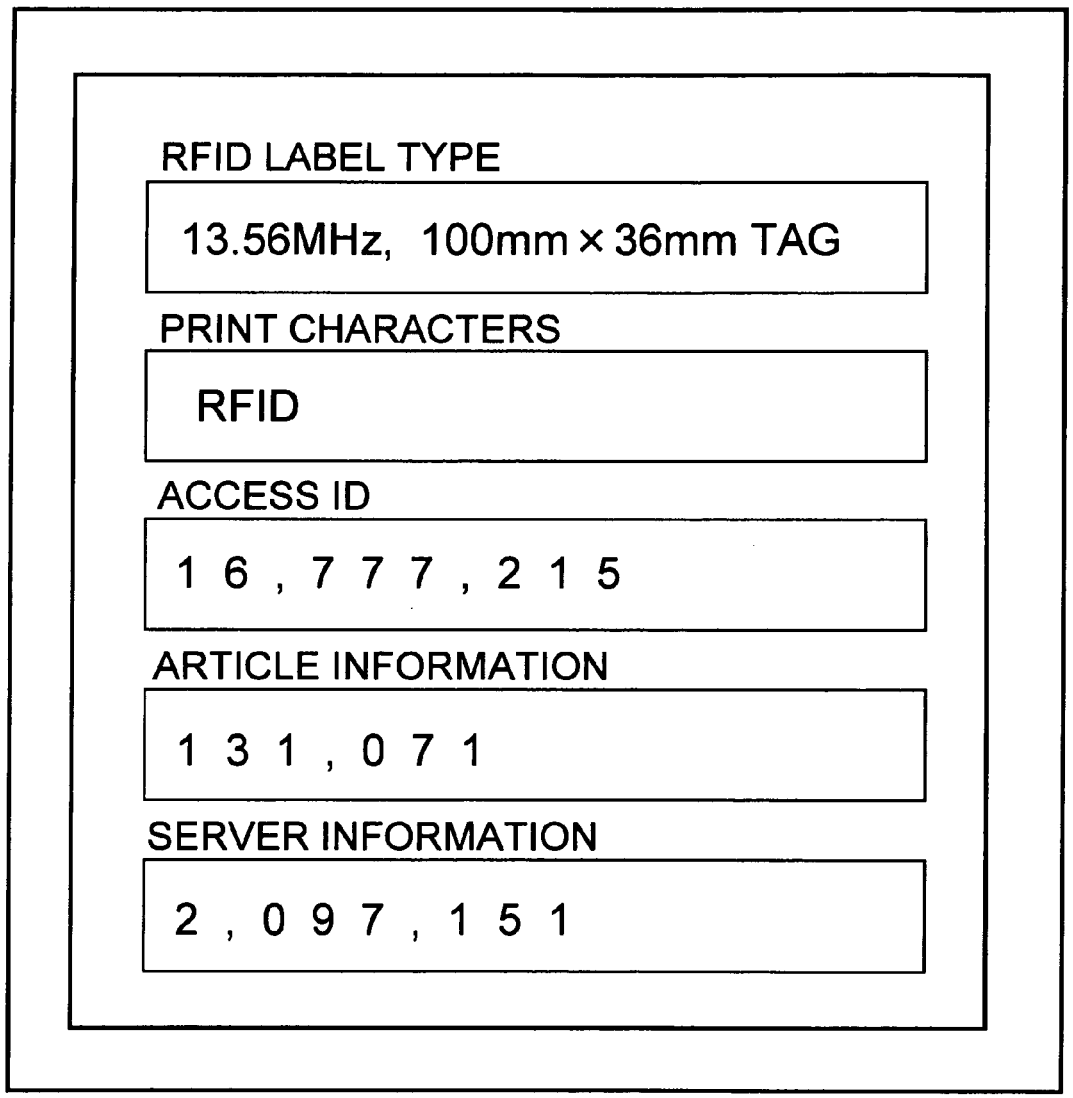
FIG. 8 is a diagram showing a display example of the display screen of the terminal apparatus during RFID label production.

An example of a display on a display screen of the terminal apparatus DTa is shown in FIG. 8, when the RFID label T is produced. In this example, the display includes information such as the type of RFID label T (access frequency and tag label dimensions), the print characters printed by the print head 23, the access ID which is identification information unique to the RFID circuit element To of the RFID label T, the address of the article information stored in the information server IS of FIG. 1, and the storage destination address of the corresponding information in the route server RS of FIG. 1.

An example of the configuration of the RFID label T produced from the tag tape is shown in FIG. 9.

In the FIGS. 9A to 9D, the RFID label T is formed by cutting the eight-layer structure (nine-layer structure when including the RFID tag main body 90) wherein the cover film 103 is bonded to the tag tape 101 of the seven-layer structure at a predetermined or desired length as described above, and then printing is performed on the back surface of the cover film 103 thereof so that the print characters R (the characters "RFID" in the example shown) extend substantially across the entire tape width direction.

The RFID tag main body 90 is positioned between the first tape 101A and the second tape 101B in the tape thickness direction, and the IC holding body 92 is provided so as to protrude on the first tape 101A side from the antenna base 91. In the example shown, the IC holding body 92 that includes the IC circuit part 80 is disposed on the upper side of the tape with direction (that is, the upper side of the characters "RFID" in the example shown) with the print characters R opposed thereto, and on one angle part of the roughly rectangular-shaped loop antenna 62, and the second connection land 94 on the radial inner side of the antenna pattern 62A in a planar view is provided in a position that overlaps with the half-cut line HC formed in the tape longitudinal direction at the center of the tape width direction of the separation sheet 101g. A peel-off display part M that imparts the peel-off mode of the separation sheet 101g to the user is displayed on the separation sheet 101g. (The peel-off display part M will be described in detail in embodiment 3 described later.)

Here, when the user affixes the RFID label T of the above-described configuration to an article, the user bends RFID label T along the half-cut line HC, thereby separating the separation sheet 101g into two sections along the half-cut line HC and raising the corner section (or side section) at the separated location of the separation sheet 101g from the adhesive layer 101f, making it possible to easily lift and peel off the separation sheet 101g. The bend along the half-cut line HC at this time is generally made with the half-cut line HC established as a peak (that is, with the separation sheet 101g side as a mountain fold). When the RFID label T is bent along the half-cut line HC of the separation sheet 101g side in this manner, a bending force acts on the second connection land 94 that comprises the IC holding body 92 and is provided at a position that overlaps with the half-cut line HC as previously described.

To clearly indicate the positional relationship between each member in the figure, the IC circuit part 80 is enlarged, and only the antenna base 91 and each of the connection lands 93 and 94 are additionally shown.

Figure 10A:
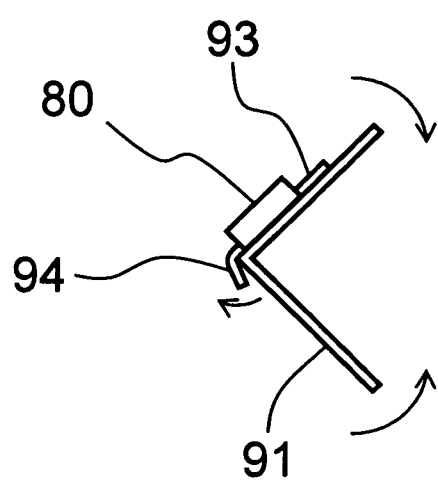
FIG. 10A shows the state of the RFID tag main body when a bend that establishes the half-cut line as a valley (that is, establishes the separation sheet side as a valley fold) is made.

The state of the RFID tag main body when the RFID label is bent is shown in FIG. 10. First, as shown in FIG. 10A, when a bend that establishes the half-cut line HC as a valley (that is, that establishes the separation sheet 101g side as a valley fold) is made, the surface of the installation side of the IC holding body 92 forms a mountain fold with respect to the antenna base 91 on the RFID tag main body 90, possibly causing the external force from the mountain fold to act as a pulling force on the crimping part 97 of the connection land 94 and peel the connection land 94 from the antenna base 91 (or the antenna pattern 62A), cutting the circuit and impairing the communication function of the RFID tag main body 90.

Figure 10B:
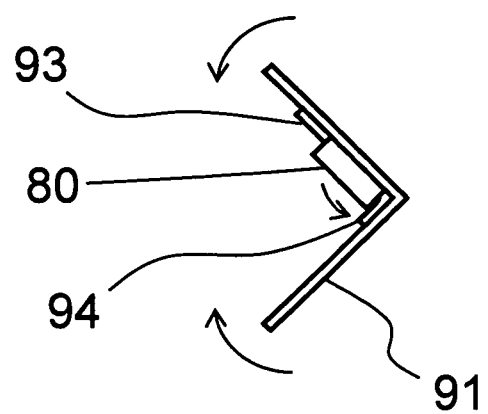
FIG. 10B shows the state of the RFID tag main body when a bend that establishes the half-cut line as a peak (that is, establishes the separation sheet side as a mountain fold) is made.

On the other hand, when a bend that establishes the half-cut line HC as a peak (that is, establishes the separation sheet 101g as a mountain fold) is made as shown in FIG. 10B, the surface opposite the installation side of the IC holding body 92 forms a mountain fold with respect to the antenna base 91. With this arrangement, even when the external force from the mountain fold acts as a compressing force on the crimping part 97 of the connection land 94, the compressing force can be absorbed by the bend of the connection land 94, making it possible to maintain the connection of the connection land 94 with the antenna base 91 and the antenna pattern 62A as well as the communication function of the RFID tag main body 90.

Then, the tag tape 101 of this embodiment is designed so that the IC holding body 92, as shown in the aforementioned FIG. 3 and FIG. 9, is disposed on the first tape 101A side of the antenna base 91, that is, the IC holding body 92 is disposed on the side opposite the second tape 101B wherein the half-cut line HC is formed. With this arrangement, when the RFID label T is bent into a mountain fold so that the half-cut line HC of the separation sheet 101g forms a peak, as shown in FIG. 10B, the second connection land 94 positioned so as to overlap with the half-cut line HC maintains connection with the antenna base 91 and the antenna pattern 62, thereby maintaining the communication function of the RFID tag main body 90.

In the tag tape 101 of embodiment 1 configured as described above, the IC holding body 92 is disposed on the first tape 101A side (the side opposite the second tape 101B) of the antenna base 91 so that, even when a mountain fold that establishes the half-cut line HC provided on the second tape 101B side as a peak is made, the external force from the mountain fold is prevented from acting in a direction that peals off the IC holding body 92 from the antenna base 91. As a result, the communication function is not impaired and the user-friendliness at the time of label affixing is improved.

Particularly, in the present embodiment, the half-cut line HC of the separation sheet 101g extends in the tape longitudinal direction at the center of the tape width direction, thereby enabling the user to position the separation sheet 101g upward, make a mountain fold in the tape width direction so as to establish the half-cut line HC as a peak, and easily lift and peel off the separation sheet 101g. Furthermore, with a mountain fold, because the dimensions in both directions from the peak established as the boundary are equal, the handleability by both hands of the user is improved, making it possible to easily and reliably peel off the separation sheet 101g.

Further, particularly in the present embodiment, the IC holding member 92 is provided in a position that overlaps with the half-cut line HC in a planar view. In such a case, when the user makes a mountain fold with the RFID label T, establishing the half-cut line HC as a peak, the external force at the time the mountain fold is created reliably acts on the IC holding body 92 and, when the IC holding body 92 is disposed on the second tape 101B side of the antenna base 91, the external force from the mountain fold acts in the direction in which the IC holding body 92 peels off from the antenna base 91, resulting in the high possibility of impairment of the communication function. In consequence, when the IC holding body 92 is disposed on the first tape 101A side of the antenna base 91 in the same manner as in the present embodiment in such a case, the arrangement results in the particularly remarkable effect of preventing the external force from the mountain fold from acting in the direction in which peel-off occurs.

Further, particularly in the present embodiment, the structure established connects the IC circuit part 80 and the antenna pattern 62A via the first and second connection lands 93 and 94, thereby resulting in a higher degree of freedom during construction than in a case where the IC circuit part 80 and antenna pattern 62A are directly joined, improving productivity.

Further, particularly in the present embodiment, the second connection land 94 of the IC holding body 92 is provided in a position that overlaps with the half-cut line HC of the separation sheet 101g in a planar view, thereby making it possible to prevent the external force from the mountain fold from acting in the direction in which the second connection land 94 is peeled off from the antenna base 91 and the antenna pattern 62A. As a result, the communication function is not impaired and the user-friendliness at the time of label affixing is improved.

Further, particularly in the present embodiment, the IC circuit part 80 is provided on the antenna base 91 side of the first and second connection lands 93 and 94 connected to the antenna pattern 62A provided on the antenna base 91, thereby making it possible to reduce the height of the IC circuit part 80 from the antenna base 91 (compared to a case where the IC circuit part 80 is superimposed on the side opposite the antenna base 91). With this arrangement, the protruding height of the IC circuit part 80 from the antenna base 91 is suppressed, thereby making it possible to reduce the dimension in the tape thickness direction of the overall RFID tag main body 90. As a result, the occurrence of wrinkles in the first tape 101A or the second tape 101B can be suppressed by the difference in the thickness direction dimension between the sections where the RFID tag main body 90 exists and the sections where the RFID tag main body 90 does not exist in the tag tape 101.

Further, particularly in the present embodiment, the nearby antenna pattern 62A positioned on the antenna base 91 side is made to circumvent the IC circuit part 80, thereby making it possible to prevent a short circuit between the IC circuit part 80 and the antenna pattern 62A and to reliably suppress the protruding height of the IC circuit part 80 from the antenna base 91.

Note that various modifications may be made according to the present embodiment without departing from the spirit and scope of the disclosure, in addition to the above. Descriptions will be made below regarding such modifications.

(1-1) When the Half-Cut Line is Provided in the Tape Width Direction

Figure 11A:
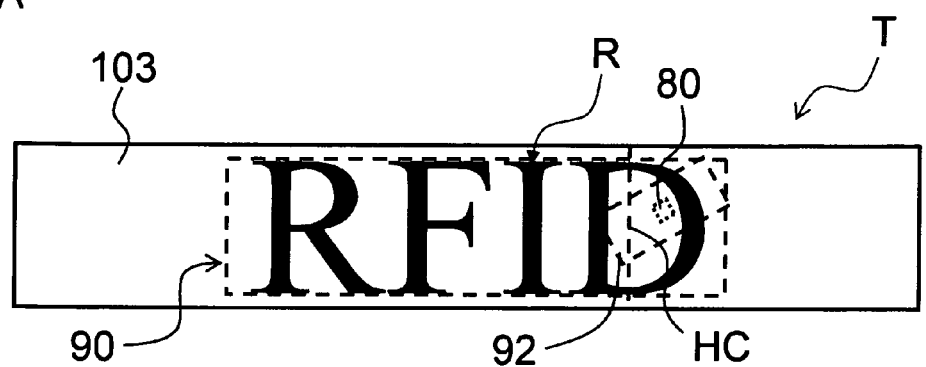
FIG. 11A shows the front surface of the RFID label.
Figure 11B:
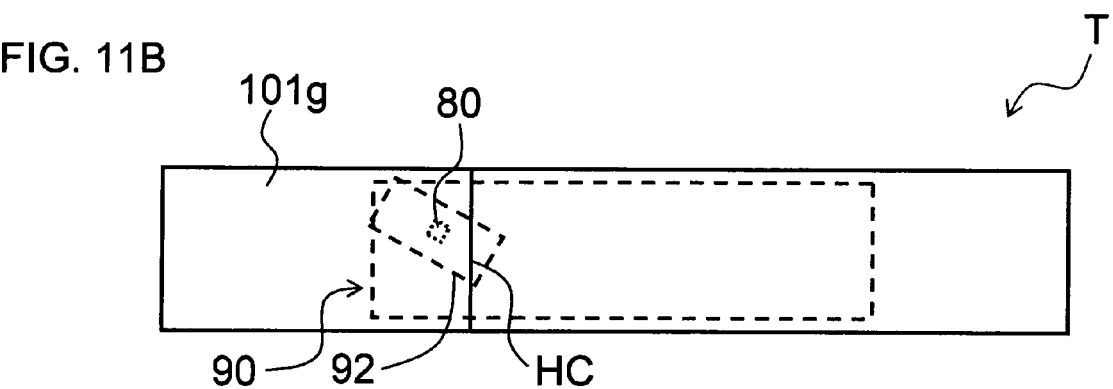
FIG. 11B shows the back surface of the RFID label.

While the half-cut line HC for cutting the thickness direction dimension at least in part is provided on the separation sheet 101g of the tag tape 101 in the tape longitudinal direction in the aforementioned embodiment 1, the half-cut line HC may also be provided in the tape width direction. An example of the configuration of the RFID label T produced from the tag tape 101 of the present modification is shown in FIG. 11. As shown in FIG. 11, the half-cut line HC is continuously extended in the tape width direction on the separation sheet 101g. The IC holding body 92 is disposed in a position that overlaps with the half-cut line HC.

With such a half-cut line HC established in the width direction as well, when the RFID label T is folded into a mountain fold along the half-cut line HC, no adverse effect results from the external force on the IC holding body 92 even when the IC holding body 92 overlaps with the half-cut line HC, thereby making it possible to lift and easily peel off the separation sheet 101g. As a result, similar advantages as those of the aforementioned embodiment 1, such as improvement of user-friendliness at the time of label affixing without impairment of the communication function, are achieved.

(1-2) When the Half-Cut Line is Provided as a Perforated Line

While the half-cut line HC is established as a solid continuous straight line (that is, a single cut in the surface direction of the separation sheet 101g) in the above-described embodiment 1, the present disclosure is not limited thereto and an intermittent half-cut line HC may be formed by performing cutting in a plurality of locations in the surface direction of the separation sheet 101g. In the present modification, an example is given where the half-cut line HC is provided as a perforated line of a plurality of cuts.

Figure 12A:
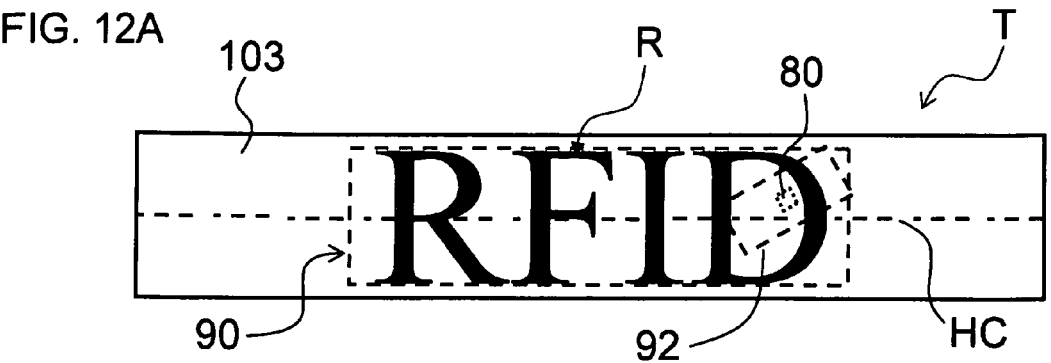
FIG. 12A shows the front surface of the RFID label.
Figure 12B:
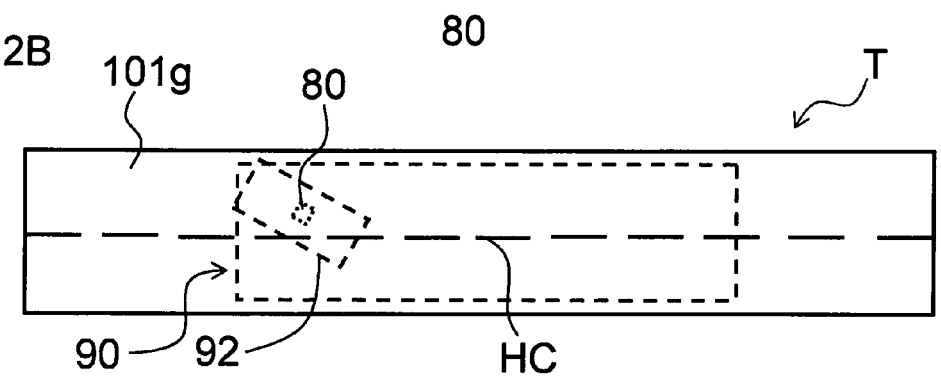
FIG. 12B shows the back surface of the RFID label.

An example of the configuration of the RFID label T produced from the tag tape 101 having the half-cut line HC of the present modification is shown in FIG. 12. As shown in FIG. 12, the half-cut line HC extends as a perforated line in the tape longitudinal direction at the center of the tape width direction of the separation sheet 101g. The IC holding body 92 is disposed in a position that overlaps with the half-cut line HC.

With such a perforated half-cut line HC as well, when the RFID label T is folded into a mountain fold along the half-cut line HC, no adverse effect results from the external force on the IC holding body 92 even when the IC holding body 92 overlaps with the half-cut line HC, thereby making it possible to lift and easily peel off the separation sheet 101g. As a result, similar advantages as those of the aforementioned embodiment 1, such as improvement of user-friendliness at the time of label affixing without impairment of the communication function, are achieved.

Figure 13A:
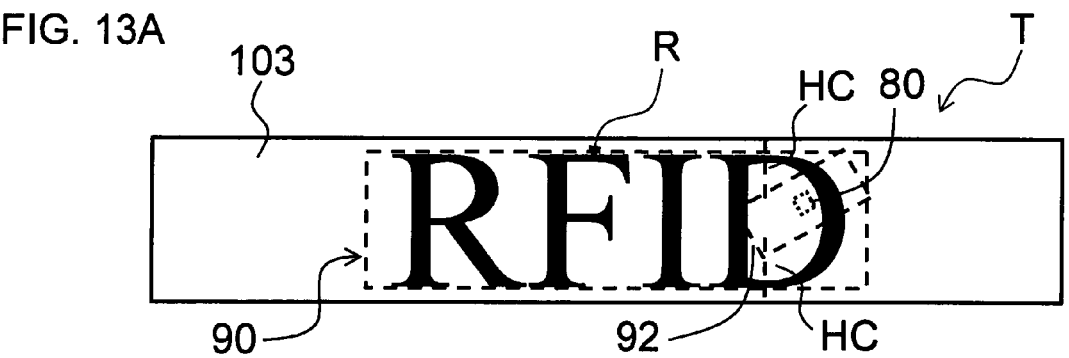
FIG. 13A shows the front surface of the RFID label.
Figure 13B:
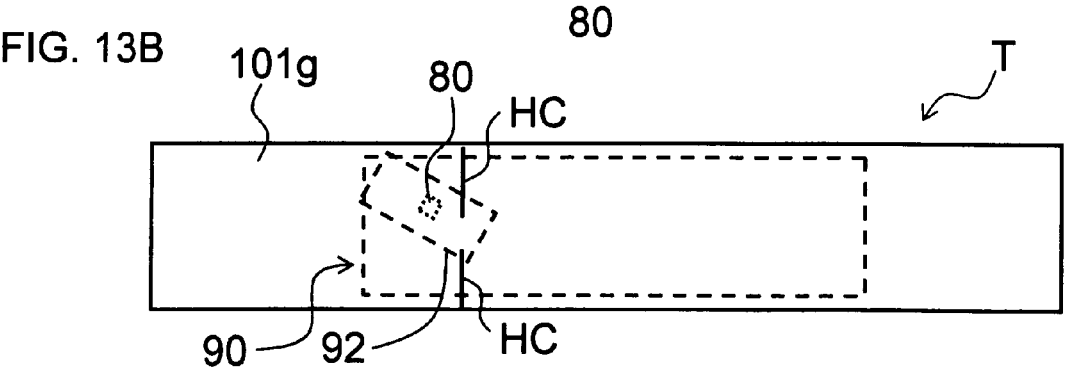
FIG. 13B shows the back surface of the RFID label.

(1-3) When the Half-Cut Line is Provided as a Perforated Line in the Tape Width Direction The present modification is an example where the intermittent perforated half-cut line HC described in the above (1-2) is provided in the tape width direction. An example of the configuration of the RFID label T produced from the tag tape 101 having the half-cut line HC of the present modification is shown in FIG. 13. As shown in FIG. 13, the half-cut line HC extends as a perforated line in the tape width direction of the separation sheet 101g. In this example, the half-cut line HC is provided in a position further inside in the tape longitudinal direction than the IC circuit part 80, and the IC holding body 92 is disposed in a position that overlaps with the half-cut line HC in a planar view.

With such a perforated half-cut line HC established in the tape width direction as well, when the RFID label T is folded into a mountain fold along the half-cut line HC, no adverse effect results from the external force on the IC holding body 92 even when the IC holding body 92 overlaps with the half-cut line HC, thereby making it possible to lift and easily peel off the separation sheet 101g. As a result, similar advantages as those of the aforementioned embodiment 1, such as improvement of user-friendliness at the time of label affixing without impairment of the communication function, are achieved.

(1-4) When the Half-Cut Line is Provided in an L-Shape

While the half-cut line HC for peeling off the separation sheet is provided in a straight line in the aforementioned embodiment 1 and modifications (1-1) to (1-3), the half-cut line may be formed into any shape as long as a handle for peeling off the separation sheet 101g is formed. In this modification, an example is given where the half-cut line HC is provided in an L-shape.

Figure 14A:
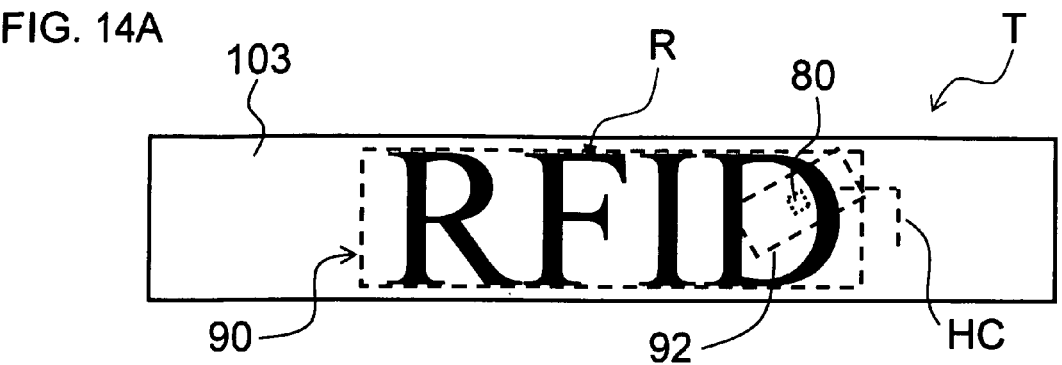
FIG. 14A shows the front surface of the RFID label.
Figure 14B:
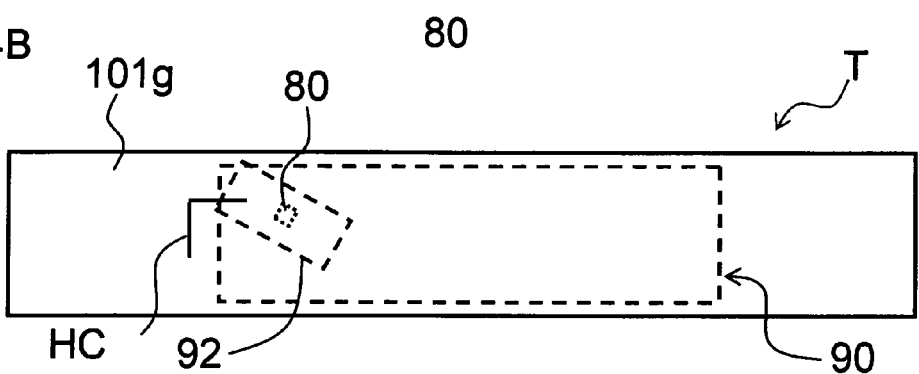
FIG. 14B shows the back surface of the RFID label.

An example of the configuration of the RFID label T produced from the tag tape 101 having the half-cut line HC of the present modification is shown in FIG. 14. As shown in FIG. 14, the half-cut line HC is provided in an L-shape at a position that overlaps with the position of the IC holding body 92 of the separation sheet 101. While the L-shaped half-cut line HC in the example shown in the figure appears inverted, any form is acceptable.

With such an L-shaped half-cut line HC as well, when the RFID label T is folded into a mountain fold along the half-cut line HC, similar advantages as those of embodiment 1, such as improvement of user-friendliness at the time of label affixing without impairment of the communication function, are achieved.

(1-5) When the Half-Cut Line is Provided in a Circular Arc Shape

Figure 15A:
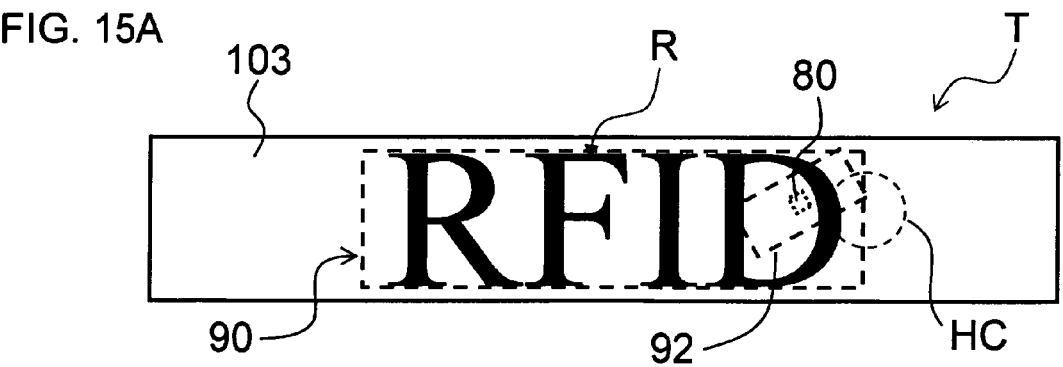
FIG. 15A shows the front surface of the RFID label.
Figure 15B:
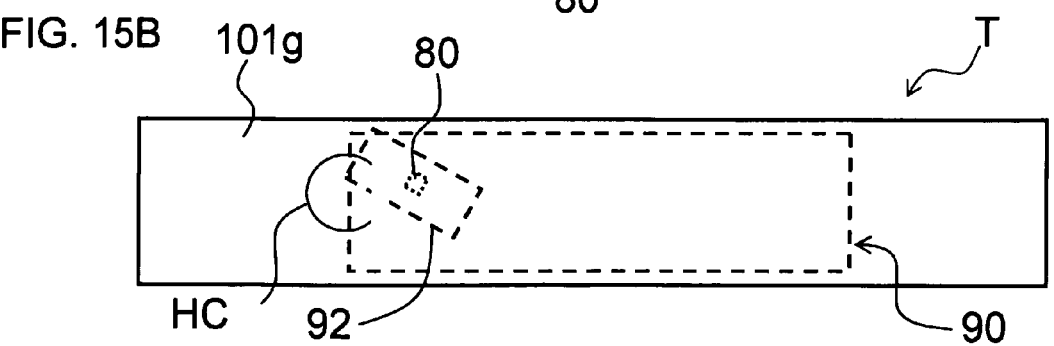
FIG. 15B shows the back surface of the RFID label.

The present modification is an example of a differently shaped half-cut line HC that forms an above-described handle for peeling off the separation sheet 101g. An example of the configuration of the RFID label T produced from the tag tape 101 having the half-cut line HC of the present modification is shown in FIG. 15. As shown in FIG. 15, the half-cut line HC is provided in a circular arc shape at a position that overlaps with the position of the IC holding body 92 of the separation sheet 101. While the half-cut line HC is provided so that the opening of the circular arc faces the direction of the IC circuit part 80 in the example shown, the half-cut line HC of the circular arc shape may be established in any form.

With such a circular arc shaped half-cut line HC as well, when the RFID label T is folded into a mountain fold along the half-cut line HC even when the IC holding body 92 overlaps with the half-cut line HC, similar advantages as those in embodiment 1, such as improvement of the user-friendliness at the time of label affixing without impairment of the communication function, are achieved.

(1-6) When the Half-Cut Line is Provided in a Ω-Shape

Figure 16A:
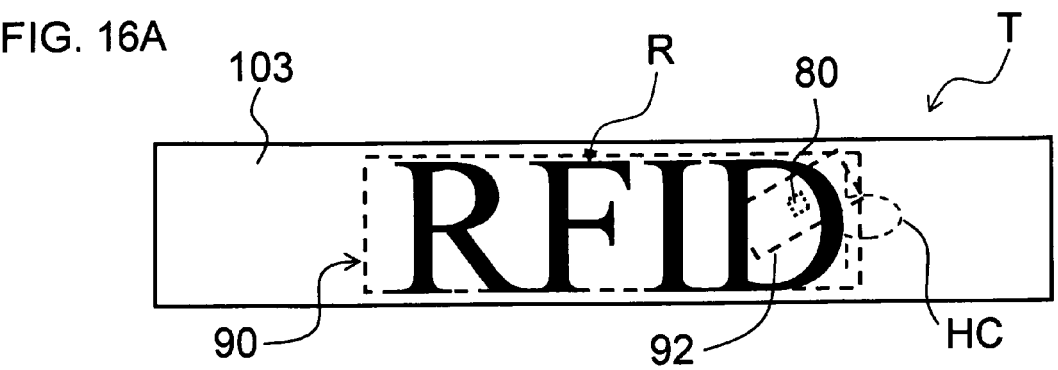
FIG. 16A shows the front surface of the RFID label.
Figure 16B:
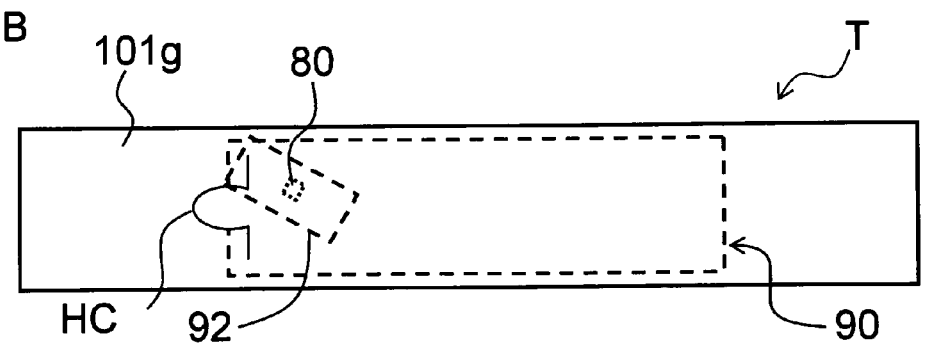
FIG. 16B shows the back surface of the RFID label.

The present modification is an example of a differently shaped half-cut line HC that forms an above-described handle for peeling off the separation sheet 101g. An example of the configuration of the RFID label T produced from the tag tape 101 having the half-cut line HC of the present modification is shown in FIG. 16. As shown in FIG. 16, the half-cut line HC is provided in a Ω-shape at a position that overlaps with the position of the IC holding body 92 of the separation sheet 101. While the half-cut line HC is provided so that the legs of the Ω-shape face the direction of the IC circuit part 80 in the example shown, the half-cut line HC of the Ω-shape may be established in any form.

With such a Ω-shaped half-cut line HC as well, when the RFID label T is folded into a mountain fold along the half-cut line HC even when the IC holding body 92 overlaps with the half-cut line HC, similar advantages as those in embodiment 1, such as improvement of the user-friendliness at the time of label affixing without impairment of the communication function, are achieved.

(1-7) When the Half-Cut Line is Provided in a U-Shape

Figure 17A:
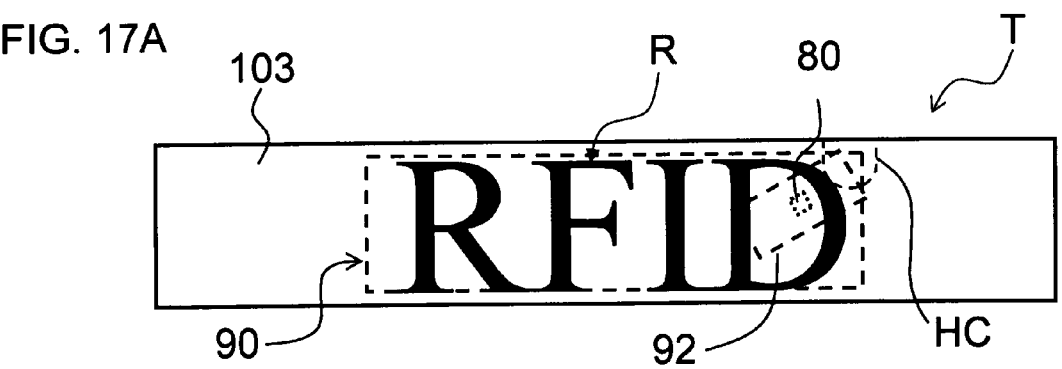
FIG. 17A shows the front surface of the RFID label.
Figure 17B:
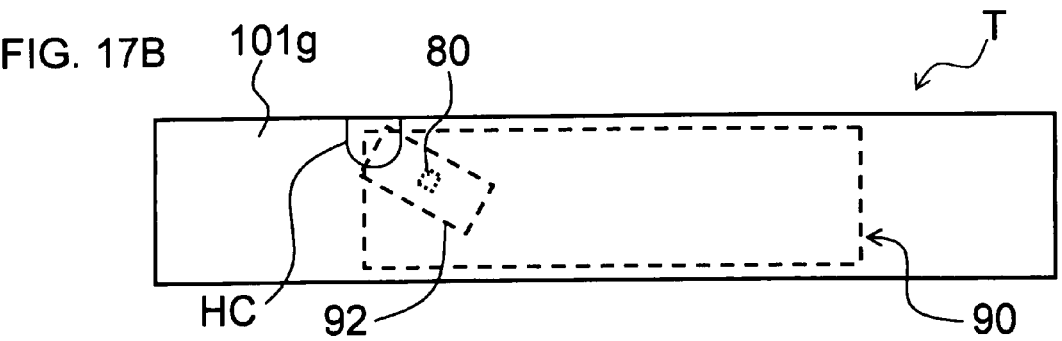
FIG. 17B shows the back surface of the RFID label.

The present modification is an example of a differently shaped half-cut line HC that forms an above-described handle for peeling off the separation sheet 101g. An example of the configuration of the RFID label T produced from the tag tape 101 having the half-cut line HC of the present modification is shown in FIG. 17. As shown in FIG. 17, the half-cut line HC is provided in a U-shape at a position that overlaps with the position of the IC holding body 92 of the separation sheet 101. While the half-cut line HC is provided so that the opening of the U-shape is positioned on the longer side of one side (upper side in the figure) in the tape width direction, the U-shaped half-cut line HC may be established in any form.

With such a U-shaped half-cut line HC as well, when the RFID label T is folded into a mountain fold along the half-cut line HC even when the IC holding body 92 overlaps with the half-cut line HC, similar advantages as those of embodiment 1, such as improvement of the user-friendliness at the time of label affixing without impairment of the communication function, are achieved.

(1-8) When the Half-Cut Line is Provided in a V-Shape

Figure 18A:
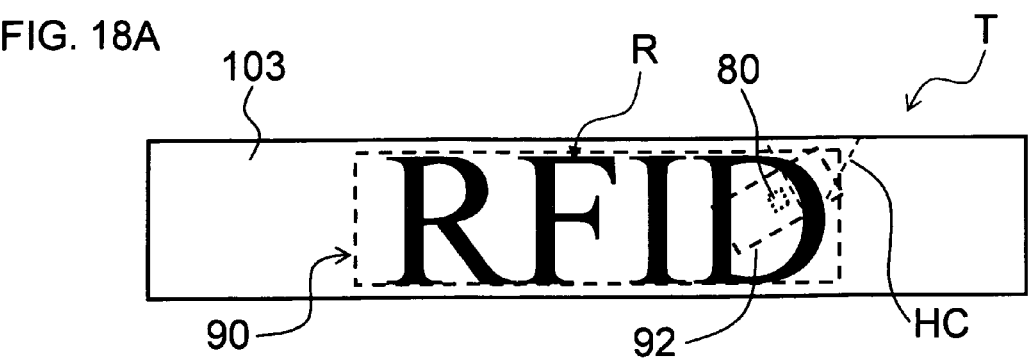
FIG. 18A shows the front surface of the RFID label.
Figure 18B:
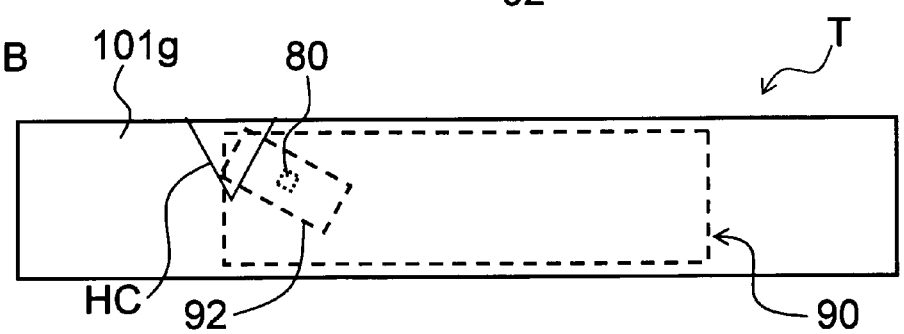
FIG. 18B shows the back surface of the RFID label.

The present modification is an example of a differently shaped half-cut line HC that forms an above-described handle for peeling off the separation sheet 101g. An example of the configuration of the RFID label T produced from the tag tape 101 having the half-cut line HC of the present modification is shown in FIG. 18. As shown in FIG. 18, the half-cut line HC is provided in a V-shape at a position that overlaps with the position of the IC holding body 92 of the separation sheet 101. While the half-cut line HC is provided so that the opening of the V-shape is positioned on the longer side of one side (upper side in the figure) in the tape width direction, the V-shaped half-cut line HC may be established in any form.

With such a V-shaped half-cut line HC as well, when the RFID label T is folded into a mountain fold along the half-cut line HC even when the IC holding body 92 overlaps with the half-cut line HC, similar advantages as those of embodiment 1, such as improvement of the user-friendliness at the time of label affixing without impairment of the communication function, are achieved.

(1-9) When the Half-Cut Line is Provided in a Diagonal Slit Shape

Figure 19A:
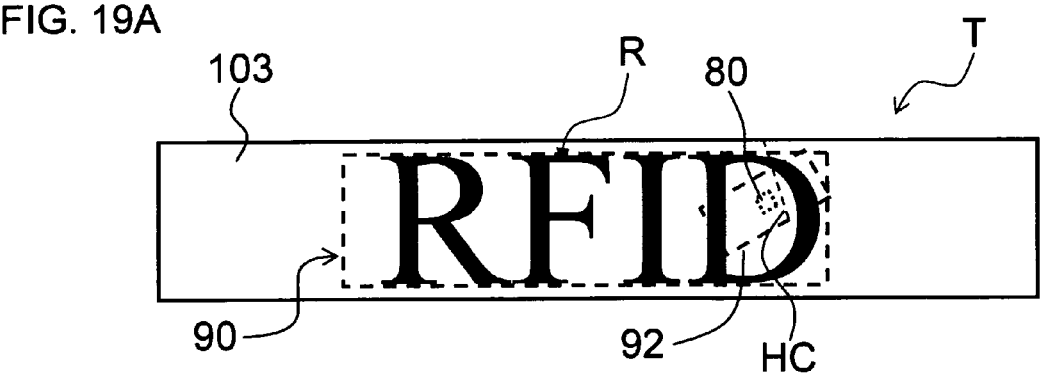
FIG. 19A shows the front surface of the RFID label.
Figure 19B:
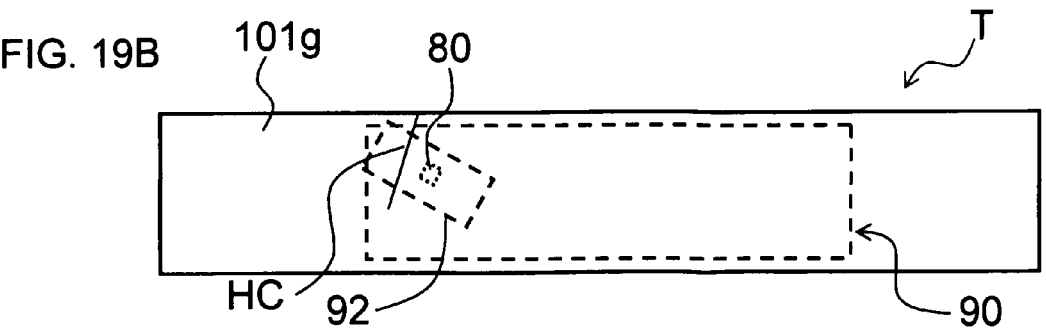
FIG. 19B shows the back surface of the RFID label.

The present modification is an example of a differently shaped half-cut line HC that forms an above-described handle for peeling off the separation sheet 101g. An example of the configuration of the RFID label T produced from the tag tape 101 having the half-cut line HC of the present modification is shown in FIG. 19. As shown in FIG. 19, the half-cut line HC is provided in a diagonal slit shape at a position that overlaps with the position of the IC holding body 92 of the separation sheet 101. In this example, while the diagonal slit shape that makes up the half-cut line HC is provided at an angle toward the center direction of the separation sheet 101g so as to cut across the IC holding body 92 from one side in the width direction of the separation sheet 101g, the diagonal slit-shaped line HC may be established in any form.

With such a diagonal slit-shaped half-cut line HC as well, when the RFID label T is folded into a mountain fold along the half-cut line HC even when the IC holding body 92 overlaps with the half-cut line HC, similar advantages as those of embodiment 1, such as improvement of the user-friendliness at the time of label affixing without impairment of the communication function, are achieved.

Figure 20A:
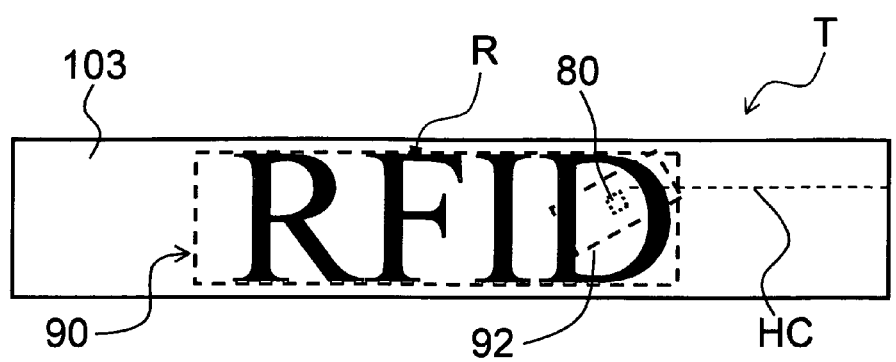
FIG. 20A shows the front surface of the RFID label.
Figure 20B:
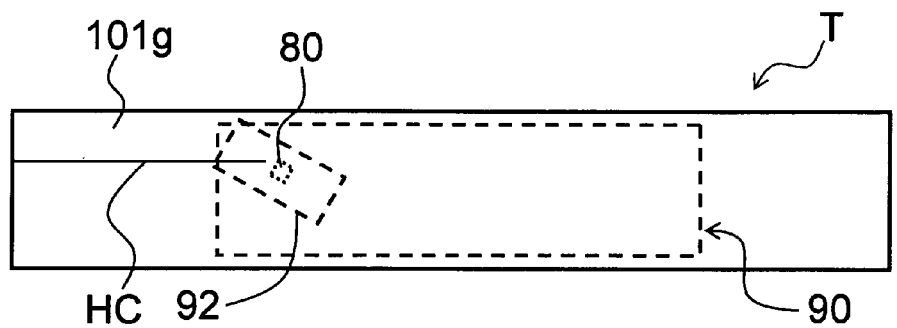
FIG. 20B shows the back surface of the RFID label.

(1-10) When the Half-Cut Line is Provided in a Half-Line Shape in the Tape Longitudinal Direction The present modification is an example of a differently shaped half-cut line HC that forms an above-described handle for peeling off the separation sheet 101g. An example of the configuration of the RFID label T produced from the tag tape 101 having the half-cut line HC of the present modification is shown in FIG. 20. As shown in FIG. 20, the half-cut line HC extends as a half-line in the tape longitudinal direction from the shorter side near the IC holding body 92 of one side in the tape longitudinal direction of the separation sheet 101g. In this example, the half-cut line HC is positioned on one side (in this figure, the upper side) of the tape width direction, and the IC holding body 92 is disposed in a position that overlaps with one end of the half-cut line HC in a planar view.

With such a half-line shaped half-cut line HC in the tape longitudinal direction as well, when the RFID label T is folded into a mountain fold along the half-cut line HC even when the IC holding body 92 overlaps with the half-cut line HC, similar advantages as those of embodiment 1, such as improvement of the user-friendliness at the time of label affixing without impairment of the communication function, are achieved.

Furthermore, although not particularly shown, the half-cut line HC of the half-line shape may be provided in a position that overlaps with the IC holding body 92 in a planar view so that it follows along the tape width direction as shown in the aforementioned FIG. 11, FIG. 13, etc. In this case as well, similar advantages to those of embodiment 1 can be achieved.

Subsequently, description will be made below regarding an embodiment 2 of the present disclosure. In the aforementioned embodiment 1, the IC holding body 92 of the tag tape 101 is provided so as to protrude on the first tape 101A side of the antenna base 91, resulting in a configuration in which folding the separation sheet 101g into a mountain fold so as to establish the half-cut line HC as the peak, even when the disposed position of the IC holding body 92 overlaps with the half-cut line HC provided in the separation sheet 101a in a planar view, prevents the external force from the fold from acting in the direction in which the IC holding body 92 peels from the antenna base 91. Conversely, in embodiment 2, the half-cut line HC is provided on the separation sheet 101g of the second tape 101B in a position that does not overlap with the position of the IC holding body 92 in a planar view to ensure that the IC holding body 92 is not adversely affected by the external force from the bend.

An example of the configuration of the RFID label T to be produced from the tag tape 101 of embodiment 2 is shown in FIG. 21.

Figure 21A:
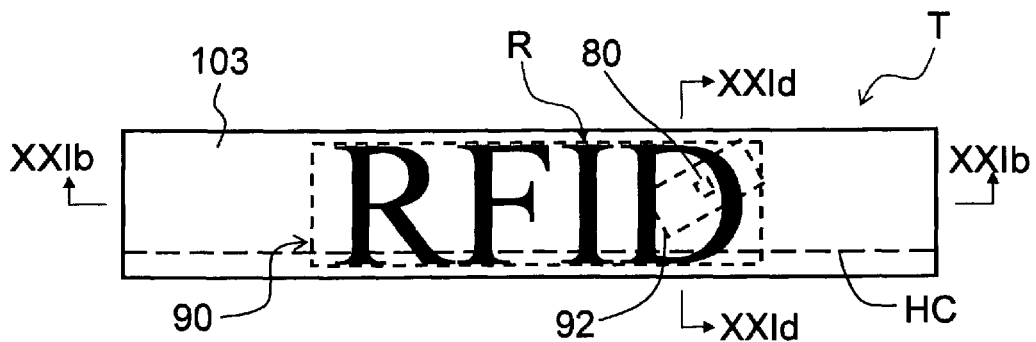
FIG. 21A shows the front surface.
Figure 21B:
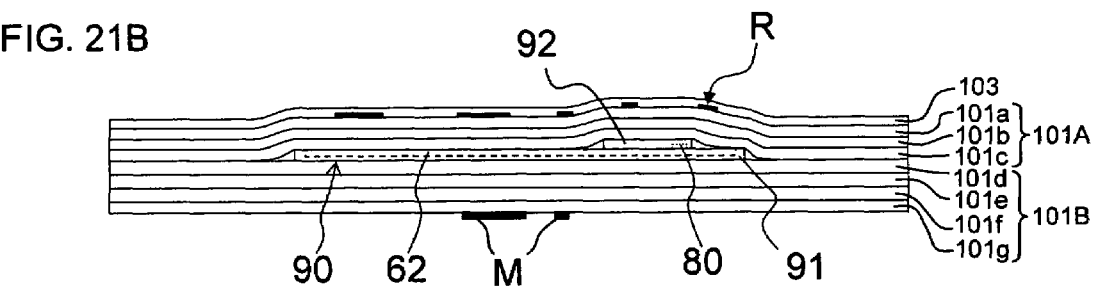
FIG. 21B shows a cross-sectional view of the cross-section XXIb-XXIb of FIG. 21A.
Figure 21C:
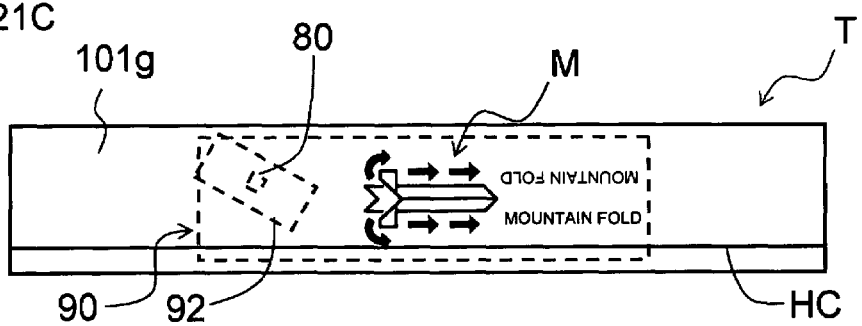
FIG. 21C shows the back surface.
Figure 21D:
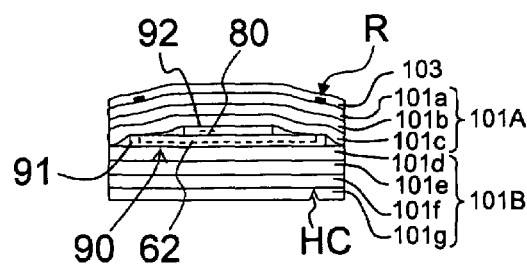
FIG. 21D shows a cross-sectional view of the cross-section XXId-XXId of FIG. 21A.
Figure 22A:
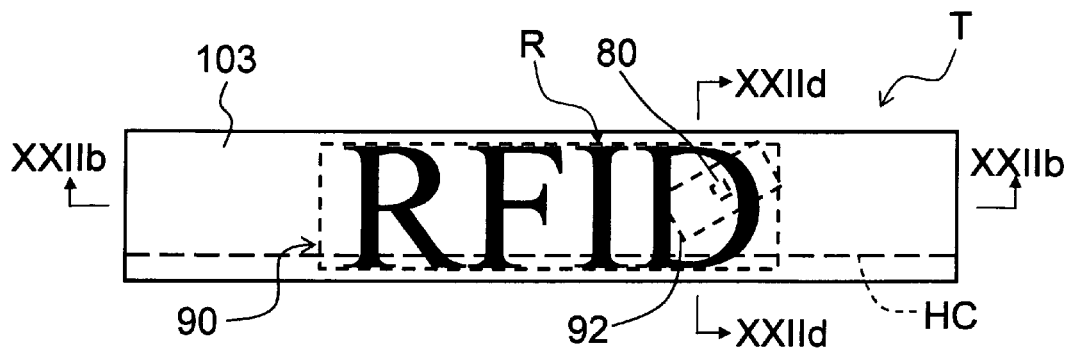
FIG. 22A to FIG. 22D correspond to FIG. 9A to FIG. 9D.
Figure 22B:
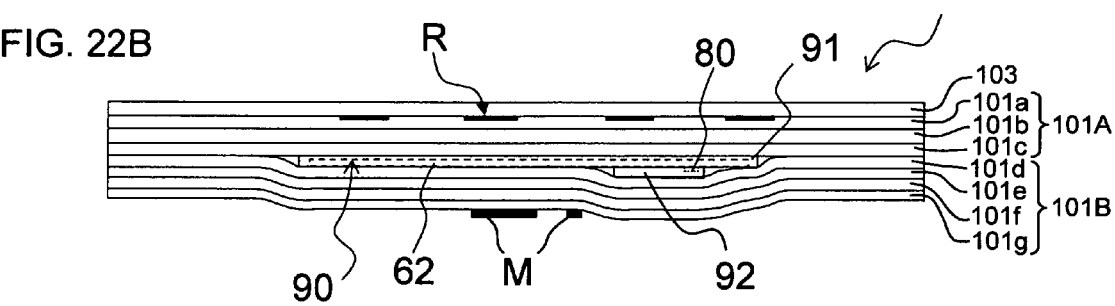
Figure 22C:
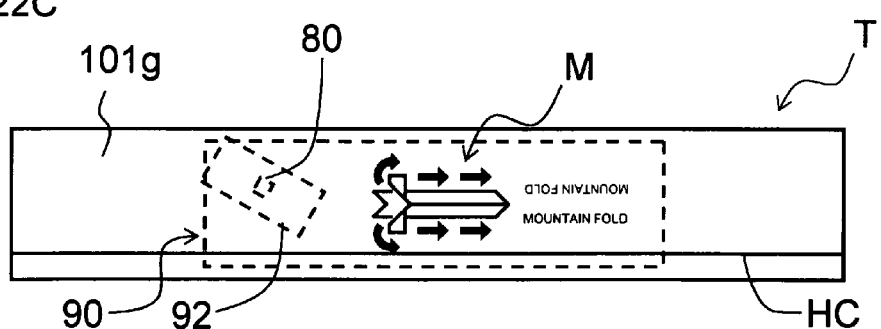
Figure 22D:
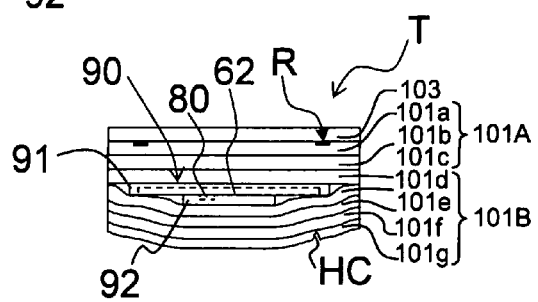

As shown in FIG. 21A and FIG. 21C, a straight half-cut line HC that continuously extends in the tape longitudinal direction on one side in the tape width direction is provided on the separation sheet 101g so as to not overlap with the position of the IC holding body 92 in a planar view. In this example, the (radial inner section of the antenna pattern 62A of the) IC holding body 92 in a planar view is disposed in a separate position on the other side (upper side in the figure) of the half-cut line HC in the tape width direction. Note that the other components of the RFID label T of embodiment 2 have the same configuration as that of embodiment 1 shown in FIG. 9A to FIG. 9D, the parts identical to those in FIG. 9A to FIG. 9D are denoted using the same reference numerals as those of FIG. 21A to FIG. 21D; the detailed descriptions thereof will be omitted. The IC holding body 92 is provided so as to protrude on the first tape 101A side of the antenna base 91.

In embodiment 2 configured as described above, the tag tape 101, similar to the aforementioned embodiment 1, comprises a layered structure of the first tape 101A, the RFID tag main body 90, and the second tape 101B, and the RFID label T is produced using this tag tape 101. When the user uses the produced RFID label T, the user peels off the separation sheet 101g provided on the second tape 101B by hand, and then affixes the RFID label T to the object to be affixed by the exposed adhesive layer 101f. At this time, the half-cut line HC is provided on the separation sheet 101g to make it easier for the user to peel off the separation sheet 101g from the adhesive layer 101f. With this arrangement, the user can easily peel off the separation sheet 101g by creating a mountain fold with the RFID label T facing downward, the separation sheet 100g facing upward, and the half-cut line HC vicinity as the peak, and lifting the separation sheet 101g from the half-cut line HC vicinity. As a result, the user-friendliness at the time of label affixing is improved.

On the other hand, to achieve the communication function of the RFID tag, the IC circuit part 80 and the loop antenna 62 are required. In embodiment 2 as well, similar to the aforementioned embodiment 1, the IC circuit part 80 is held to the antenna base 91 by the holding member 95 of the IC holding body 92, and is electrically connected to the loop antenna 62 provided on the antenna base 91. Yet, in a case where this IC holding body 92 exists in a location that overlaps with the half-cut line HC in a planar view, when the user creates a mountain fold near the half-cut line HC, the external force at the time of folding acts on the IC holding body 92 as well. In such a case, some of the component elements of the IC holding body 92 may become damaged, impairing the communication function. Here, in embodiment 2, the half-cut line HC is disposed so as to not overlap with the IC holding body 92 in a planar view, thereby making it possible to prevent the external force from the mountain-fold from acting on the IC holding body 92. As a result, the communication function is not impaired and the user-friendliness at the time of label affixing is improved.

Further, particularly in the present embodiment, the IC holding body 92 is provided so as to protrude on the first tape 101A side of the antenna base 91. With this arrangement, it is possible to prevent the external force from the mountain fold of the RFID label T near the half-cut line HC from acting in the direction in which the IC holding body 92 is peeled from the antenna base 91 (or in the direction where some of the component elements of the IC holding body 92 are peeled from other component elements positioned on the antenna base 91 side). As a result, impairment of the communication function is more reliably prevented.

Note that various modifications may be made according to the present embodiment without departing from the spirit and scope of the disclosure, in addition to the above. Description will be made below regarding such modifications.

(2-1) When the IC Holding Body is Provided so as to Protrude on the Second Tape Side While the IC holding body 92 is provided so as to protrude on the first tape 101A side of the antenna base 91 in embodiment 2 as described above, the position of the IC holding body 92 does not overlap in a planar view with the half-cut line HC, thereby making it possible to fold the RFID label T along the half-cut line HC while preventing the external force from the fold from acting on the IC holding body 92. In consequence, since the external force from the fold is prevented from acting in the direction in which the IC holding body 92 is peeled from the antenna base 91, the IC holding body 92 does not necessarily need to be provided so as to protrude on the first tape 101A side of the antenna base 91 in embodiment 2 as was the case in embodiment 1. Here, in the present modification, the configuration is designed so that the IC holding body 92 is provided so as to protrude on the second tape 101B side.

An example of the configuration of the RFID label T produced from the tag tape 101 of the present modification is shown in FIG. 22.

The RFID tag main body 90 is positioned between the first tape 101A and the second tape 101B in the tape thickness direction, and the IC holding body 92 is provided so as to protrude on the second tape 101B side from the antenna base 91. Note that all other components of the present modification are the same as those of embodiment 2, the parts identical to those of FIG. 21A to FIG. 21D are denoted using the same reference numerals in FIG. 22A to FIG. 22D, and detailed descriptions thereof will be omitted.

Similar to the aforementioned embodiment 2, the half-cut line HC extends in the tape longitudinal direction in a position (lower side of FIG. 22A and FIG. 22C) on one tape width direction side on the separation sheet 101g, and the IC holding body 92 is disposed in a position on the other tape width direction side that does not overlap with the half-cut line HC in a planar view. In such a case as well, because the IC holding body 92 is disposed in a position that does not overlap in a planar view with the half-cut line HC, even when the RFID label T is folded into a mountain fold along the half-cut line HC, it is possible to prevent the external force from the fold from acting on the IC holding body 92.

(2-2) When the Half-Cut Line is Provided in the Tape Width Direction

Figure 23A:
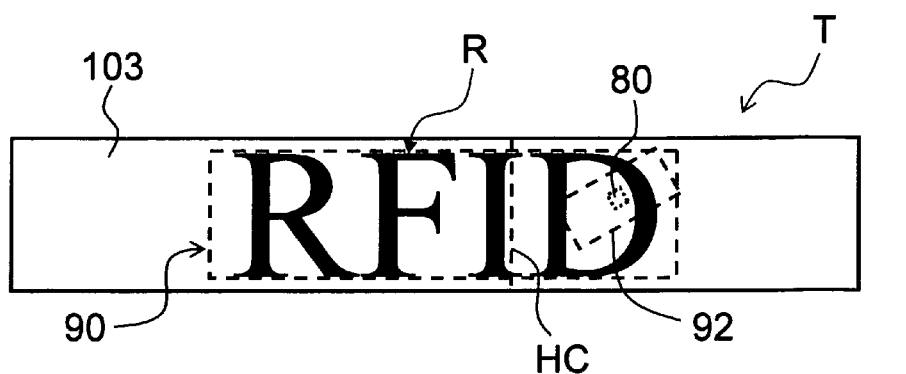
FIG. 23A shows the front surface of the RFID label.
Figure 23B:
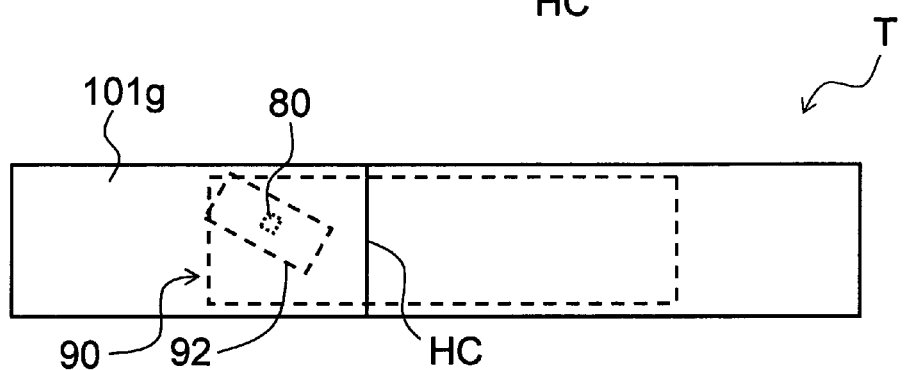
FIG. 23B shows the back surface of the RFID label.

In this modification, the half-cut line HC is provided in the tape width direction. An example of the configuration of the RFID label T produced from the tag tape 101 of the present modification is shown in FIG. 23. As shown in FIG. 23, the half-cut line HC continuously extends in a straight line in the tape width direction in a position further on the longitudinal direction inner side than the IC holding body 92, on the separation sheet 101g. The IC holding body 92 is provided in a position shifted to one tape longitudinal direction side (right side in FIG. 23A, left side in FIG. 23B) of the half-cut line HC in a planar view. Furthermore, the IC holding body 92 may be configured so as to protrude on the first tape 101A side in the same manner as the above embodiment 2, or to protrude on the second tape 101B side as in the modification (2-1) shown in FIG. 22 [the same holds true in the following modifications (2-3) to (2-21) of embodiment 2].

With such a half-cut line HC in the tape width direction as well, because the IC holding body 92 is disposed in a position that does not overlap with the half-cut line HC, even when the RFID label T is folded into a mountain fold along the half-cut line HC, it is possible to prevent the external force from the fold from acting on the IC holding body 92.

(2-3) When the IC Holding Body is Disposed on One Side in the Tape Width Direction While a configuration wherein the half-cut line HC is formed in a position shifted from the IC holding body 92 that is disposed in the corner of one longitudinal direction side of the antenna base 91 so as to not overlap with the IC holding body 92 in a planar view was expressed in the above embodiment 2, the present disclosure is not limited thereto. That is, the IC holding body 92 may be shifted from the half-cut line HC formed at the tape width direction center so as to not overlap with the half-cut line HC. This modification is an example wherein the IC holding body 92 is shifted to one tape width direction side of the antenna base 91.

Figure 24:
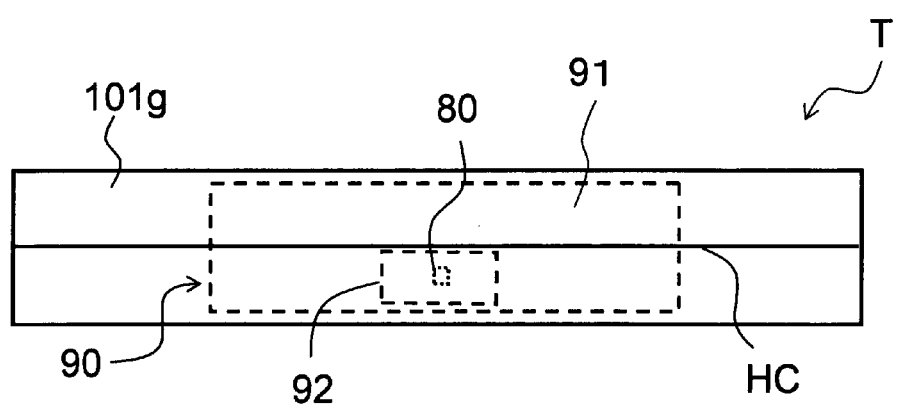
FIG. 24 is a diagram showing an example of the configuration of the RFID label in a case where the IC holding body is disposed on one side of the tape width direction.

An example of the configuration of the RFID label T produced from the tag tape 101 of the present modification is shown in FIG. 24. As shown in FIG. 24, the half-cut line HC extends on the separation sheet 101g in the tape longitudinal direction at the center of the tape width direction, and the IC holding body 92 is provided in a position that is shifted toward one tape width direction side (lower side in the figure) of the half-cut line HC, at the tape longitudinal center of the antenna base 91. With this arrangement, the IC holding body 92 is disposed so as to not overlap with the half-cut line HC.

With the IC holding body 92 shifted toward one tape width direction side as described above, a configuration wherein the IC holding body 92 does not overlap with the half-cut line HC in a planar view can be achieved. As a result, even when the RFID label T is folded into a mountain fold along the half-cut line HC, it is possible to prevent the external force from the fold from acting on the IC holding body 92.

(2-4) When the Half-Cut Line is Provided in the Tape Width Direction

Figure 25:
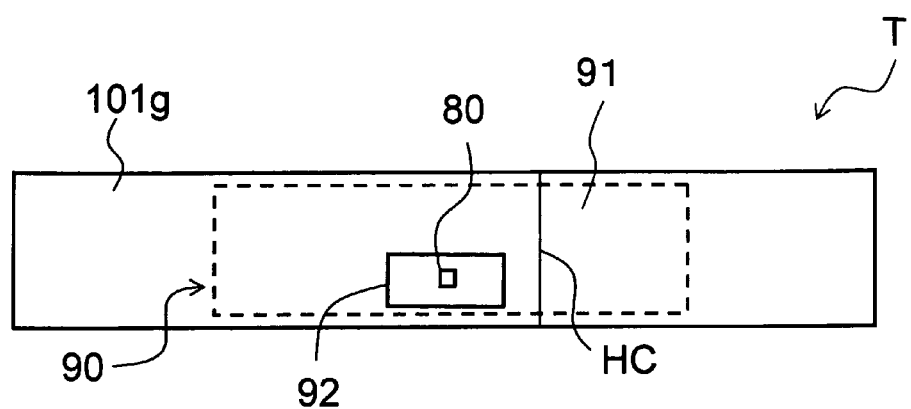
FIG. 25 is a diagram showing an example of the configuration of the RFID label in a case where the half-cut line is provided in the tape width direction.

The RFID label T achieved from the tag tape 101 of the present modification is shown in FIG. 25. In this modification, the half-cut line HC extends in the tape width direction in a position on one longitudinal direction side of the disposed position of the IC holding body 92. The configuration of all other components of the modification is the same as that in the above modification (2-3).

In this case as well, because the IC holding body 92 is disposed in a position that does not overlap with the half-cut line HC, even when the RFID label T is folded into a mountain fold along the half-cut line HC, it is possible to prevent the external force from the fold from acting on the IC holding body 92.

Figure 26:
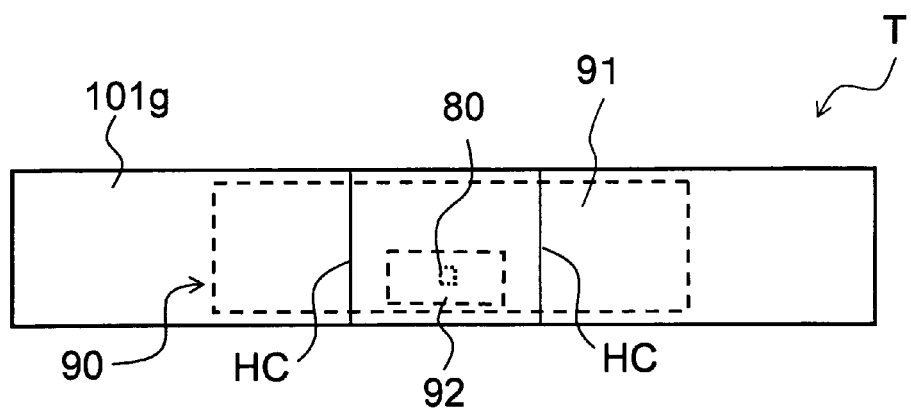
FIG. 26 is a diagram showing an example of the configuration of the RFID label in a case where a plurality of half-cut lines is provided in the tape width direction.

(2-5) When a Plurality of Half-Cut Lines is Provided in the Tape Width Direction While only one half-cut line HC is provided in the above embodiment 2, a plurality of half-cut lines HC may be formed. In this modification, a plurality of half-cut lines HC is provided in the tape width direction. The RFID label T achieved from the tag tape 101 of the present modification is shown in FIG. 26. In this modification, each of the half-cut lines HC extends in the tape width direction in positions on both longitudinal direction sides of the disposed position of the IC holding body 92 of the separation sheet 101g. The configuration of all other components of the modification is the same as that in the above modification (2-3).

In this case as well, because the IC holding body 92 is disposed in a position that does not overlap with the half-cut lines HC, even when the RFID label T is folded into a mountain fold along the half-cut line HC, it is possible to prevent the external force from the fold from acting on the IC holding body 92.

(2-6) When the Half-Cut Line is Provided in a Half-Line Shape

Figure 27A:
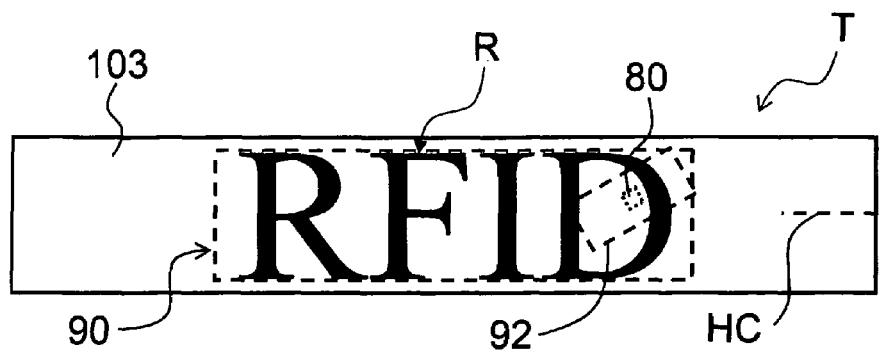
FIG. 27 is a diagram showing an example of the configuration of the RFID label in a case where the half-cut line is provided in a half-line shape.
Figure 27B:
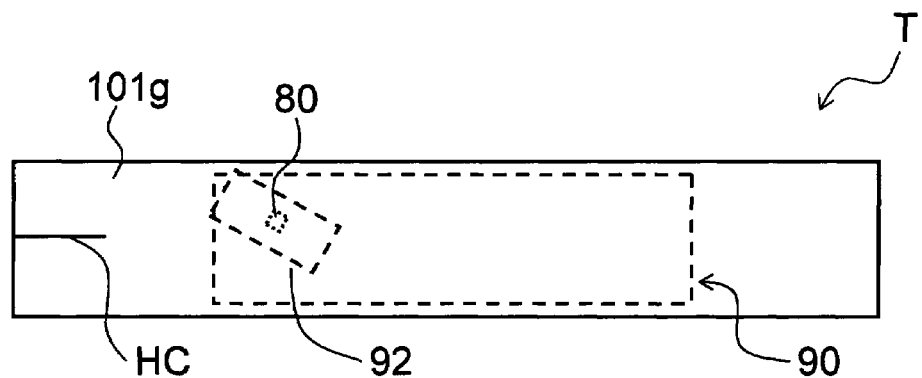

An example of the configuration of the RFID label T produced from the tag tape of the present modification is shown in FIG. 27. As shown in FIG. 27, the IC holding body 92 is disposed at the corner of one tape longitudinal direction side of the antenna base 91. The half-cut line HC is provided in a half-line shape in the tape longitudinal direction from the shorter side of the side near the IC holding body 92 of the tape longitudinal direction, at the center of the tape width direction of the separation sheet 101a, and extends to a position in front of the IC holding body 92 without overlapping.

In this case as well, because the IC holding body 92 is disposed in a position that does not overlap with the half-cut line HC, even when the RFID label T is folded into a mountain fold along the half-cut line HC, it is possible to prevent the external force from the fold from acting on the IC holding body 92.

Furthermore, although not particularly shown, the above-described half-line shaped half-cut line HC may also be provided along the tape width direction in a position that does not overlap with the IC holding body 92 in a planar view. In this case as well, similar advantages to those described above can be achieved.

(2-7) When the Half-Cut Line is Provided in a Circular Arc Shape

Figure 28A:
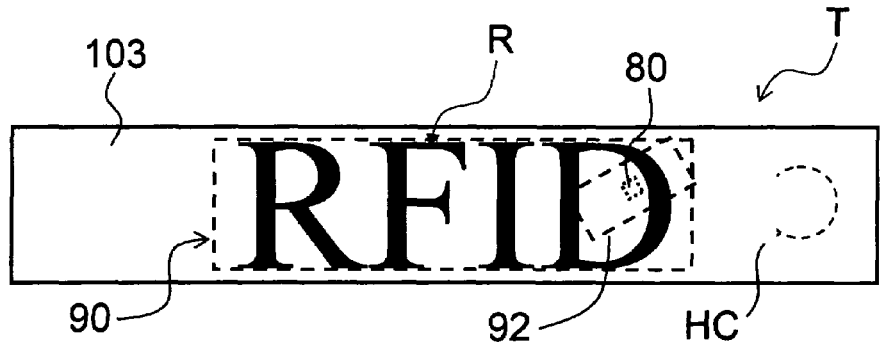
FIG. 28A shows the front surface of the RFID label.
Figure 28B:
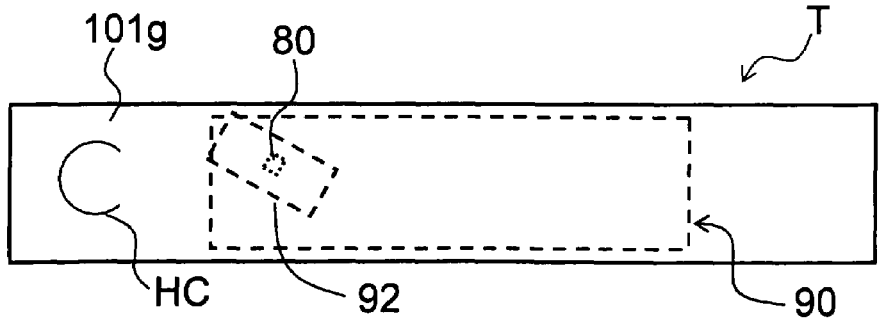
FIG. 28B shows the back surface of the RFID label.

An example of the configuration of the RFID label T produced from the tag tape 101 having the half-cut line HC of the present modification is shown in FIG. 28. As shown in FIG. 28, the half-cut line HC is provided in a circular arc shape in a position shifted further on the outer tape longitudinal direction side than the position of the IC holding body 92 of the separation sheet 101g. The configuration of all other components is the same as that of embodiment 2. While the half-cut line HC is provided so that the opening of the circular arc faces the direction of the IC circuit part 80 in the example shown, the half-cut line HC of the circular arc shape may be established in any form.

In this case as well, because the IC holding body 92 is disposed in a position that does not overlap with the half-cut line HC, even when the RFID label T is folded into a mountain fold along the half-cut line HC, it is possible to prevent the external force from the fold from acting on the IC holding body 92.

(2-8) When the Half-Cut Line is Provided in a Ω-Shape

Figure 29A:
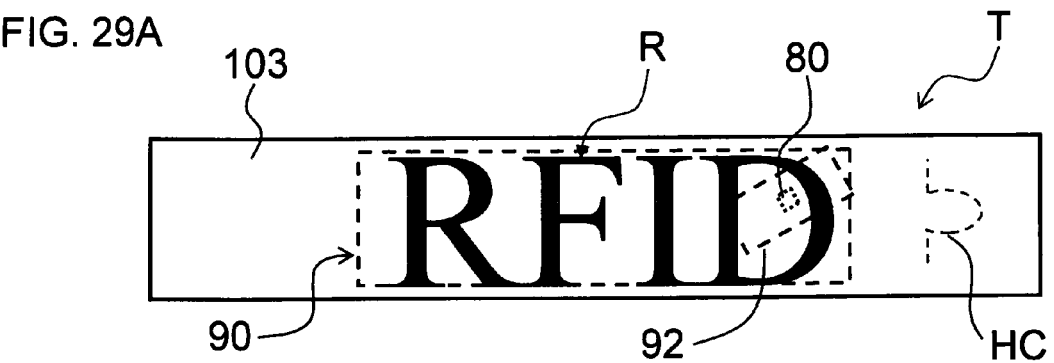
FIG. 29A shows the front surface of the RFID label.
Figure 29B:
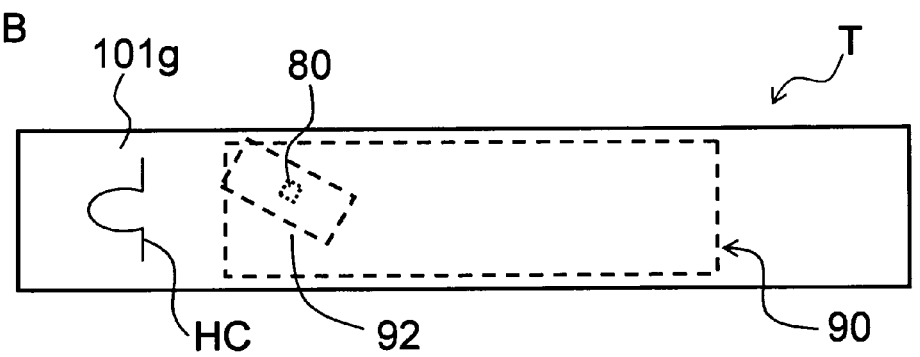
FIG. 29B shows the back surface of the RFID label.

An example of the configuration of the RFID label T produced from the tag tape 101 having the half-cut line HC of the present modification is shown in FIG. 29. As shown in FIG. 29, the half-cut line HC is provided in a Ω-shape in a position further on one tape longitudinal direction side than the position of the IC holding body 92 of the separation sheet 101. The configuration of all other components is the same as that of embodiment 2. The IC holding body 92 is disposed in a position that does not overlap with the half-cut line HC. While the half-cut line HC is provided so that the legs of the Ω-shape face the direction of the IC holding body 92 in the example shown, the half-cut line HC of the Ω-shape may be established in any form.

In this case as well, because the IC holding body 92 is disposed in a position that does not overlap with the half-cut line HC, even when the RFID label T is folded into a mountain fold along the half-cut line HC, it is possible to prevent the external force from the fold from acting on the IC holding body 92.

(2-9) When the Half-Cut Line is Provided in an L-Shape

Figure 30A:
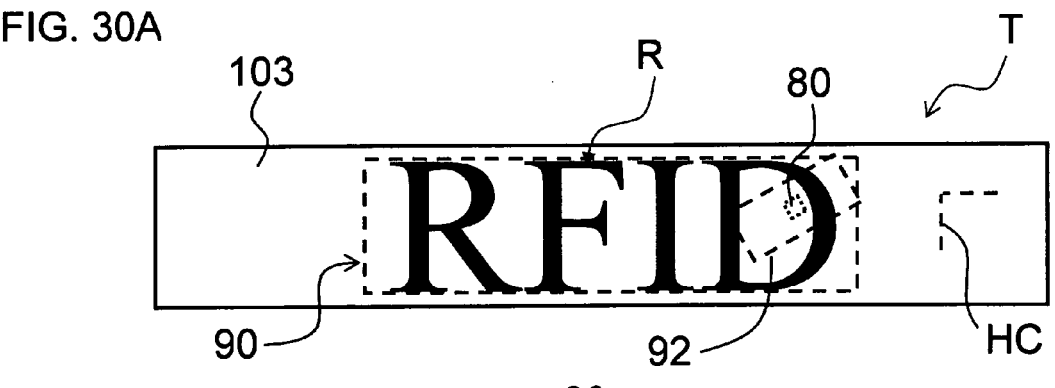
FIG. 30A shows the front surface of the RFID label.
Figure 30B:
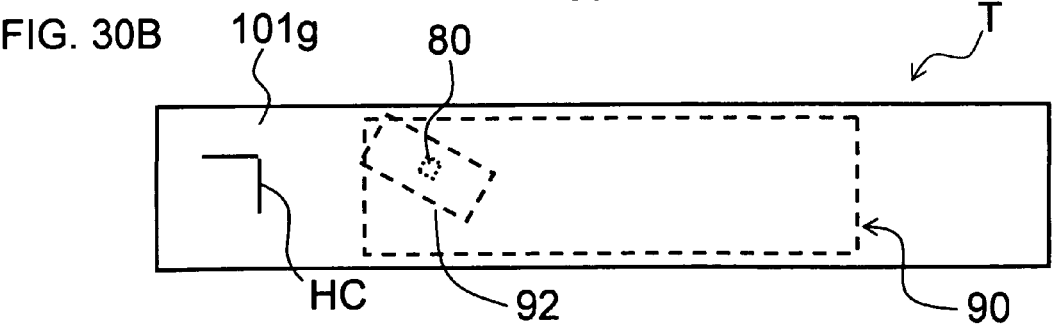
FIG. 30B shows the back surface of the RFID label.

An example of the configuration of the RFID label T produced from the tag tape 101 having the half-cut line HC of the present modification is shown in FIG. 30. The half-cut line HC is provided in an L-shape in a position further shifted to one tape longitudinal direction side than the disposed position of the IC holding body 92 of the separation sheet 101. The configuration of all other components is the same as that of embodiment 2. The IC holding body 92 is disposed in a position that does not overlap with the half-cut line HC. Furthermore, while the L-shape constituting the half-cut line HC is in an inverted position, the L-shaped half-cut line HC may be provided in any form.

In this case as well, because the IC holding body 92 is disposed in a position that does not overlap with the half-cut line HC, even when the RFID label T is folded into a mountain fold along the half-cut line HC, it is possible to prevent the external force from the fold from acting on the IC holding body 92.

(2-10) When the Half-Cut Line is Provided in a U-Shape

An example of the configuration of the RFID label T produced from the tag tape 101 having the half-cut line HC of the present modification is shown in FIG. 31. As shown in FIG. 31, the half-cut line HC is provided in a U-shape on one tape width direction side (upper side in the figure) at the center of the tape longitudinal direction of the separation sheet 101. The configuration of all other components is the same as that of embodiment 2. The IC holding body 92 is disposed in a position that does not overlap with the half-cut line HC. While the half-cut line HC is provided so that the opening of the U-shape is positioned on the longer side of one tape width direction side in this example, the U-shaped half-cut line HC may be established in any form.

In this case as well, because the IC holding body 92 is disposed in a position that does not overlap with the half-cut line HC, even when the RFID label T is folded into a mountain fold along the half-cut line HC, it is possible to prevent the external force from the fold from acting on the IC holding body 92.

(2-11) When the Half-Cut Line is Provided in a V-Shape

An example of the configuration of the RFID label T produced from the tag tape having the half-cut line HC of the present modification is shown in FIG. 32. As shown in FIG. 32, the half-cut line HC is provided in a V-shape on one tape width direction side (upper side in the figure) at the center of the tape longitudinal direction of the separation sheet 101. The configuration of all other components is the same as that of embodiment 2. The IC holding body 92 is disposed in a position that does not overlap with the half-cut line HC. While the half-cut line HC is provided so that the opening of the V-shape is positioned on the longer side of one tape width direction side in this example, the V-shaped half-cut line HC may be established in any form.

In this case as well, because the IC holding body 92 is disposed in a position that does not overlap with the half-cut line HC, even when the RFID label T is folded into a mountain fold along the half-cut line HC, it is possible to prevent the external force from the fold from acting on the IC holding body 92.

(2-12) When the Half-Cut Line is Provided in a Diagonal Slit Shape

Figure 33A:
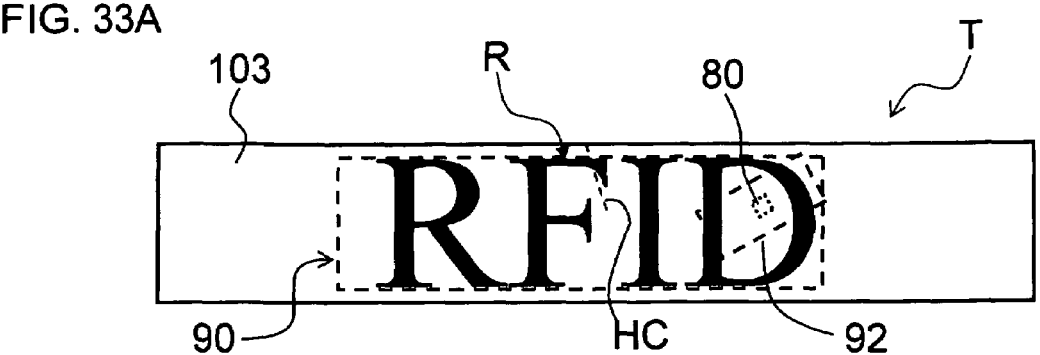
FIG. 33A shows the front surface of the RFID label.
Figure 33B:
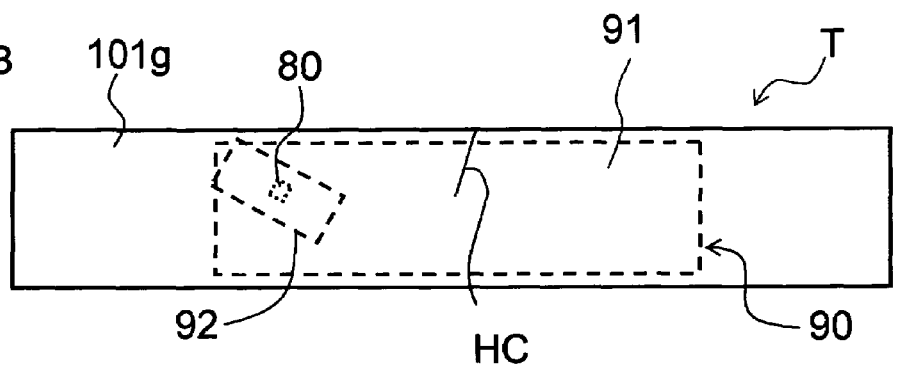
FIG. 33B shows the back surface of the RFID label.

An example of the configuration of the RFID label T produced from the tag tape 101 having the half-cut line HC of the present modification is shown in FIG. 33. As shown in FIG. 33, the half-cut line HC is provided in a diagonal-slit shape on one tape width direction side (upper side in the figure) at the center of the tape longitudinal direction of the separation sheet 101. The configuration of all other components is the same as that of embodiment 2. The IC holding body 92 is disposed in a position that does not overlap with the half-cut line HC. Furthermore, the diagonal of the diagonal-slit shaped half-cut line HC may be established in any form.

In this case as well, because the IC holding body 92 is disposed in a position that does not overlap with the half-cut line HC, even when the RFID label T is folded into a mountain fold along the half-cut line HC, it is possible to prevent the external force from the fold from acting on the IC holding body 92.

Figure 34A:
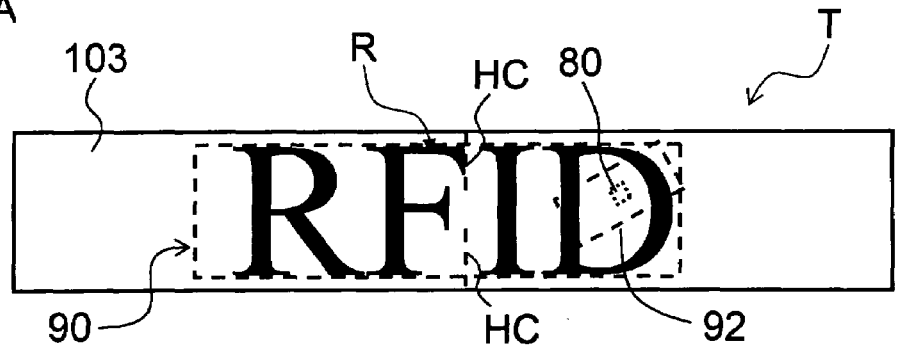
FIG. 34A shows the front surface of the RFID label.
Figure 34B:
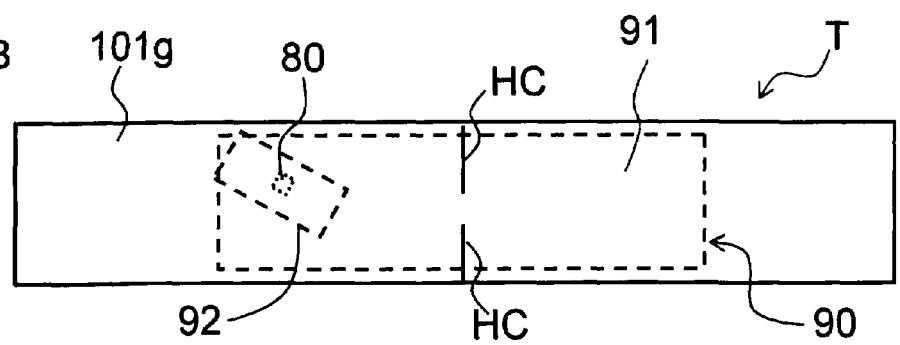
FIG. 34B shows the back surface of the RFID label.

(2-13) When the Half-Cut Line is Provided as a Perforated Line in the Width Direction An example of the configuration of the RFID label T produced from the tag tape 101 having the half-cut line HC of the present modification is shown in FIG. 34. As shown in FIG. 34, the half-cut line HC is provided as a perforated line in the tape width direction at the center of the tape longitudinal direction of the separation sheet 101. The configuration of all other components is the same as that of embodiment 2. The IC holding body 92 is disposed in a position that does not overlap with the half-cut line HC.

In this case as well, because the IC holding body 92 is disposed in a position that does not overlap with the half-cut line HC, even when the RFID label T is folded into a mountain fold along the half-cut line HC, it is possible to prevent the external force from the fold from acting on the IC holding body 92.

Figure 35:
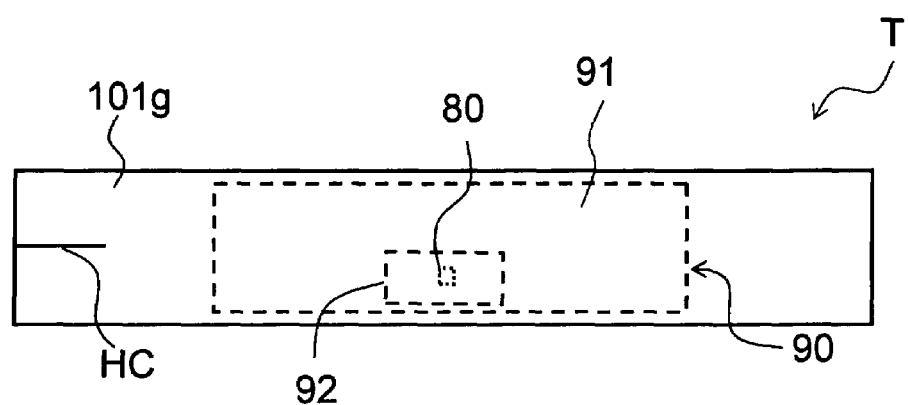
FIG. 35 is a diagram showing an example of the configuration of the RFID label in a case where the IC holding body is disposed on one side of the tape width direction, and the half-cut line is provided in a half-line shape in the longitudinal direction.

(2-14) When the Half-Cut Line is Provided in a Half-Line Shape in the Longitudinal Direction The RFID label T achieved from the tag tape 101 of the present modification is shown in FIG. 35. As shown in FIG. 35, the IC holding body 92 is disposed on one tape width direction side of the antenna base 91. The half-cut line HC is provided in a short half-line shape in the tape longitudinal direction, from the shorter side of one tape longitudinal direction sides, at the center of the tape width direction of the separation sheet 101*g*. The configuration of all other components is the same as that of FIG. 24, etc. The IC holding body 92 is disposed in a position that does not overlap with the half-cut line HC.

In this case as well, because the IC holding body 92 is disposed in a position that does not overlap with the half-cut line HC, even when the RFID label T is folded into a mountain fold along the half-cut line HC, it is possible to prevent the external force from the fold from acting on the IC holding body 92.

Furthermore, although not particularly shown, the above-described half-line shaped half-cut line HC may also be provided along the tape width direction in a position that does not overlap with the IC holding body 92 in a planar view. In this case as well, similar advantages to those described above can be achieved.

(2-15) When the Half-Cut Line is Provided in a Circular Arc Shape

Figure 36:
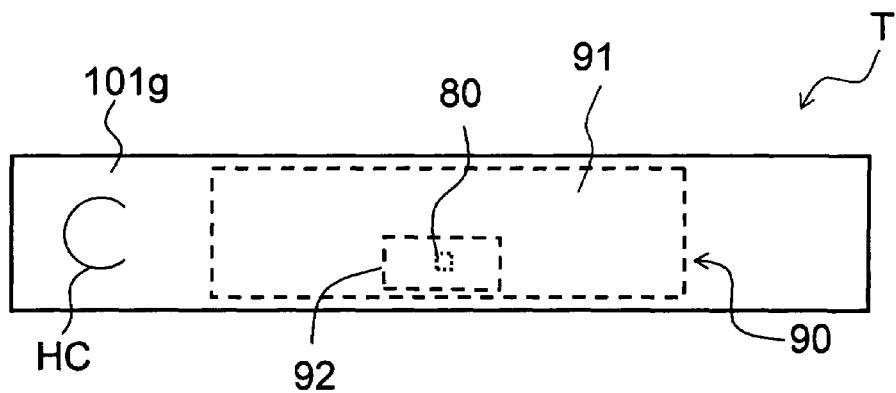
FIG. 36 is a diagram showing an example of the configuration of the RFID label in a case where the IC holding body is disposed on one side of the tape width direction, and the half-cut line is provided in a circular-arc shape.

The RFID label T achieved from the tag tape 101 of the present modification is shown in FIG. 36. As shown in FIG. 36, the half-cut line HC is provided in a circular arc shape on one tape longitudinal direction side of the separation sheet 101*g*. The configuration of all other components is the same as that of FIG. 24, etc. The IC holding body 92 is disposed in a position that does not overlap with the half-cut line HC.

In this case as well, because the IC holding body 92 is disposed in a position that does not overlap with the half-cut line HC, even when the RFID label T is folded into a mountain fold along the half-cut line HC, it is possible to prevent the external force from the fold from acting on the IC holding body 92.

(2-16) When the Half-Cut Line is Provided in a Ω-Shape

Figure 37:
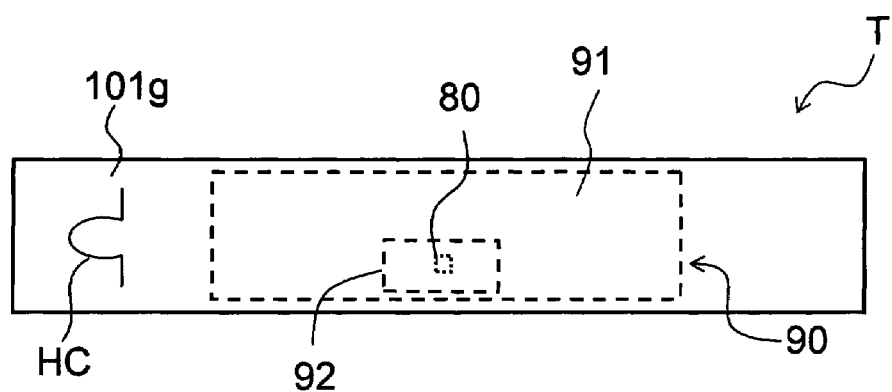
FIG. 37 is a diagram showing an example of the configuration of the RFID label in a case where the IC holding body is disposed on one side of the tape width direction, and the half-cut line is provided in a Ω-shape.

The RFID label T achieved from the tag tape 101 of the present modification is shown in FIG. 37. As shown in FIG. 37, the half-cut line HC is provided in a Ω-shape on one tape longitudinal direction side of the separation sheet 101*g*. The configuration of all other components is the same as that of FIG. 24, etc. The IC holding body 92 is disposed in a position that does not overlap with the half-cut line HC.

In this case as well, because the IC holding body 92 is disposed in a position that does not overlap with the half-cut line HC, even when the RFID label T is folded into a mountain fold along the half-cut line HC, it is possible to prevent the external force from the fold from acting on the IC holding body 92.

(2-17) When the Half-Cut Line is Provided in an L-Shape

Figure 38:
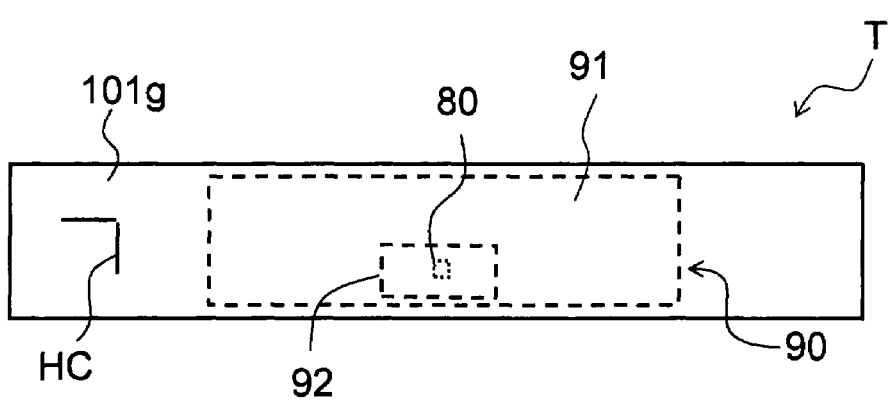
FIG. 38 is a diagram showing an example of the configuration of the RFID label in a case where the IC holding body is disposed on one side of the tape width direction, and the half-cut line is provided in an L-shape.

The RFID label T achieved from the tag tape 101 of the present modification is shown in FIG. 38. As shown in FIG. 38, the half-cut line HC is provided in an L-shape on one tape longitudinal direction side of the separation sheet 101*g*. The configuration of all other components is the same as that of FIG. 24, etc. The IC holding body 92 is disposed in a position that does not overlap with the half-cut line HC.

In this case as well, because the IC holding body 92 is disposed in a position that does not overlap with the half-cut line HC, even when the RFID label T is folded into a mountain fold along the half-cut line HC, it is possible to prevent the external force from the fold from acting on the IC holding body 92.

(2-18) When the Half-Cut Line is Provided in a U-Shape

Figure 39:
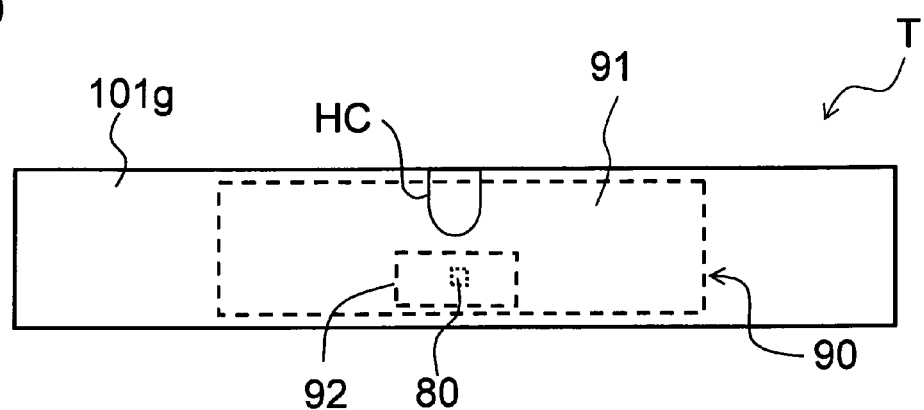
FIG. 39 is a diagram showing an example of the configuration of the RFID label in a case where the IC holding body is disposed on one side of the tape width direction, and the half-cut line is provided in a U-shape.

The RFID label T achieved from the tag tape 101 of the present modification is shown in FIG. 39. As shown in FIG. 39, the half-cut line HC is provided in a U-shape on one tape width direction side (upper side in the figure) at the center of the tape longitudinal direction of the separation sheet 101*g*. The configuration of all other components is the same as that of FIG. 24, etc. The IC holding body 92 is disposed in a position that does not overlap with the half-cut line HC.

In this case as well, because the IC holding body 92 is disposed in a position that does not overlap with the half-cut line HC, even when the RFID label T is folded into a mountain fold along the half-cut line HC, it is possible to prevent the external force from the fold from acting on the IC holding body 92.

(2-19) When the Half-Cut Line is Provided in a V-Shape

Figure 40:
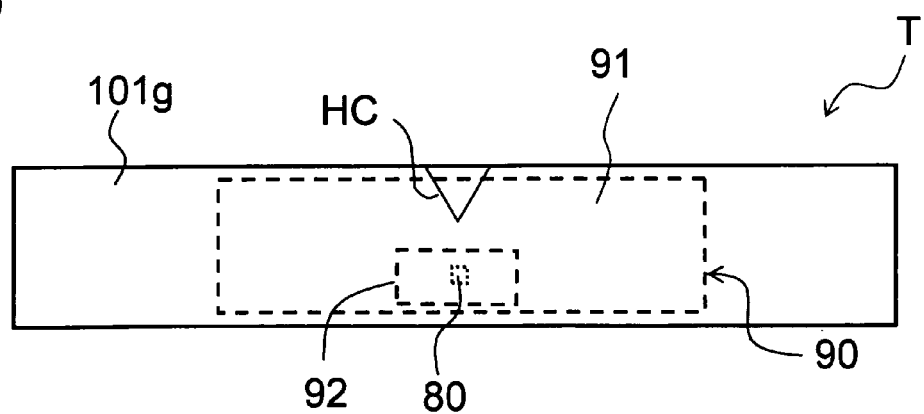
FIG. 40 is a diagram showing an example of the configuration of the RFID label in a case where the IC holding body is disposed on one side of the tape width direction, and the half-cut line is provided in a V-shape.

The RFID label T achieved from the tag tape 101 of the present modification is shown in FIG. 40. As shown in FIG. 40, the half-cut line HC is provided in a V-shape on one tape width direction side (upper side in the figure) at the center of the tape longitudinal direction of the separation sheet 101*g*. The configuration of all other components is the same as that of FIG. 24, etc. The IC holding body 92 is disposed in a position that does not overlap with the half-cut line HC.

In this case as well, because the IC holding body 92 is disposed in a position that does not overlap with the half-cut line HC, even when the RFID label T is folded into a mountain fold along the half-cut line HC, it is possible to prevent the external force from the fold from acting on the IC holding body 92.

(2-20) When the Half-Cut Line is Provided in a Diagonal Slit Shape

Figure 41:
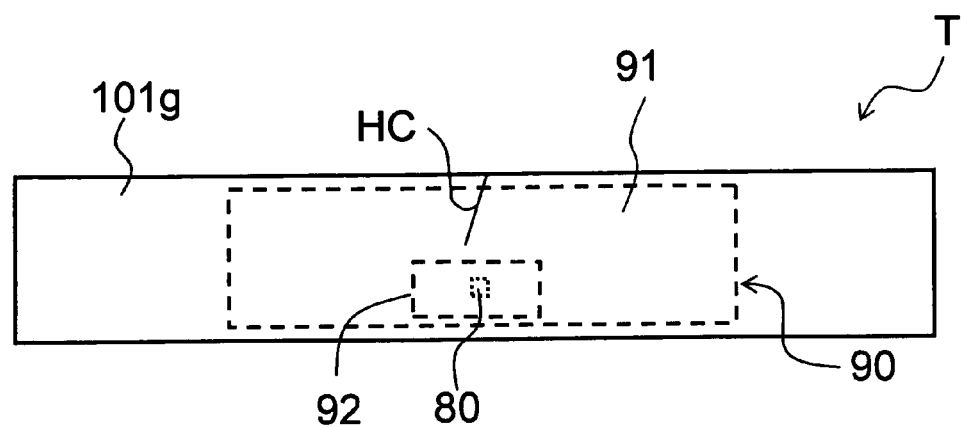
FIG. 41 is a diagram showing an example of the configuration of the RFID label in a case where the IC holding body is disposed on one side of the tape width direction, and the half-cut line is provided in a diagonal slit shape.

The RFID label T achieved from the tag tape 101 of the present modification is shown in FIG. 41. As shown in FIG. 41, the half-cut line HC is provided in a diagonal-slit shape on one tape width direction side (upper side in the figure) at the center of the tape longitudinal direction of the separation sheet 101. The configuration of all other components is the same as that of FIG. 24, etc. The IC holding body 92 is disposed in a position that does not overlap with the half-cut line HC. Furthermore, the diagonal of the diagonal-slit shaped half-cut line HC may be established in any form in addition to that shown in the figure.

In this case as well, because the IC holding body 92 is disposed in a position that does not overlap with the half-cut line HC, even when the RFID label T is folded into a mountain fold along the half-cut line HC, it is possible to prevent the external force from the fold from acting on the IC holding body 92.

Figure 42:
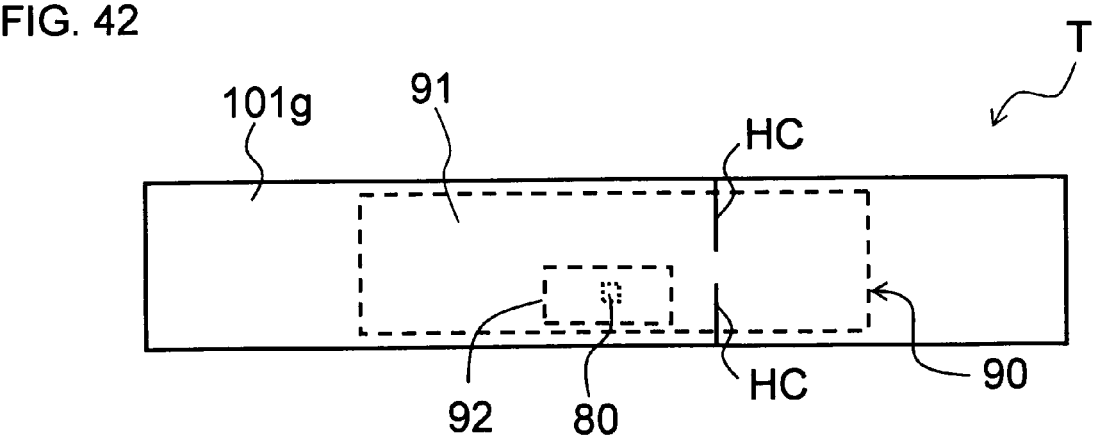
FIG. 42 is a diagram showing an example of the configuration of the RFID label in a case where the IC holding body is disposed on one side of the tape width direction, and the half-cut line is provided in a perforated line shape in the width direction.
Figure 43A:
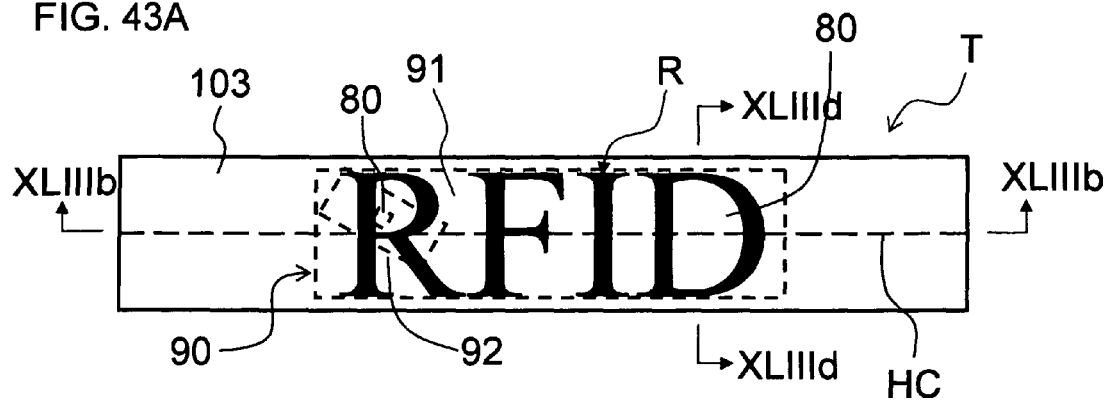
FIG. 43A shows the front surface.
Figure 43B:
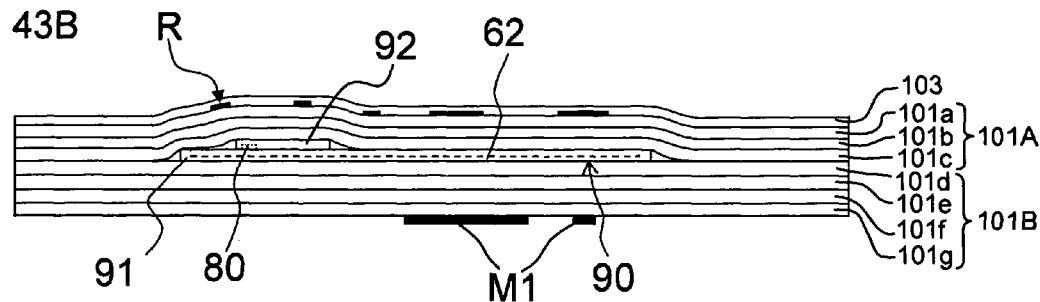
FIG. 43B shows a cross-sectional view of the cross-section XLIIIb-XLIIIb of FIG. 43A.
Figure 43C:
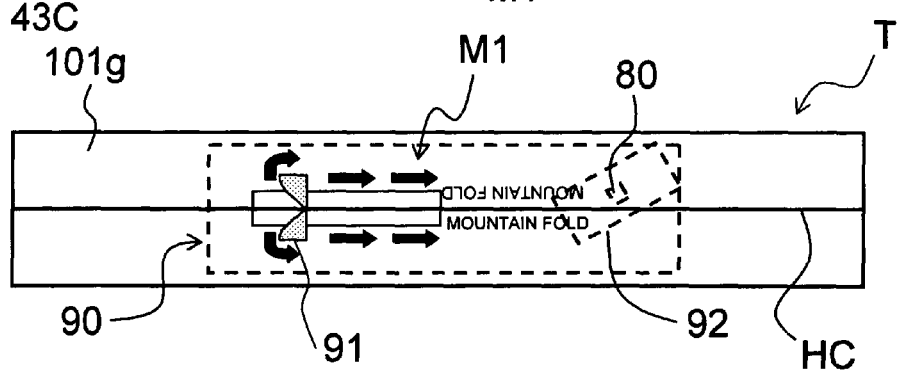
FIG. 43C shows the back surface.
Figure 43D:
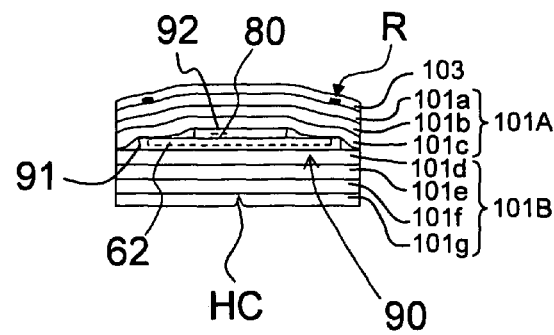
FIG. 43D shows a cross-sectional view of the cross-section XLIIId-XLIIId of FIG. 43A.

(2-21) When the Half-Cut Line is Provided as a Perforated Line in the Width Direction The RFID label T achieved from the tag tape 101 of the present modification is shown in FIG. 42. As shown in FIG. 42, the half-cut line HC extends as a perforated line in the tape width direction, further on the tape longitudinal direction side than the disposed position of the IC holding body 92 of the separation sheet 101*g*. The configuration of all other components is the same as that of FIG. 24, etc.

In this case as well, because the IC holding body 92 is disposed in a position that does not overlap with the half-cut line HC, even when the RFID label T is folded into a mountain fold along the half-cut line HC, it is possible to prevent the external force from the fold from acting on the IC holding body 92.

Furthermore, although not particularly shown, the above-described perforated half-cut line HC may be provided along the tape longitudinal direction at the center of the tape width direction, in a position that does not overlap with the IC holding body 92 in a planar view. In this case as well, similar advantages to those described above can be achieved.

Subsequently, description will be made below regarding an embodiment 3 of the present disclosure. In embodiment 3, a peel-off display part is provided on the separation sheet 101*g* of the tag tape 101 so as to impart to the user the separation sheet peel-off mode, and thus ensure that the user peels off the separation sheet 101*g* in a manner that avoids any adverse effect from an external force on the IC holding body 92.

Figure 9A:
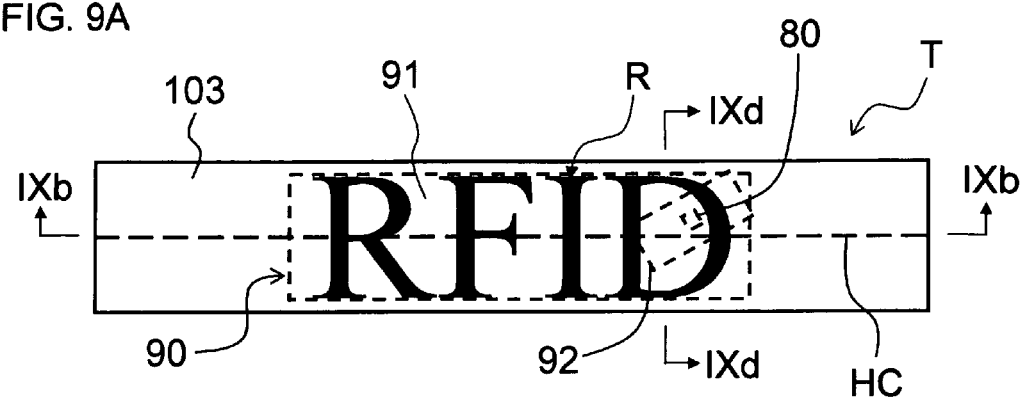
FIG. 9A to FIG. 9D show an example of the configuration of the RFID label to be produced from the tag tape.
Figure 9B:
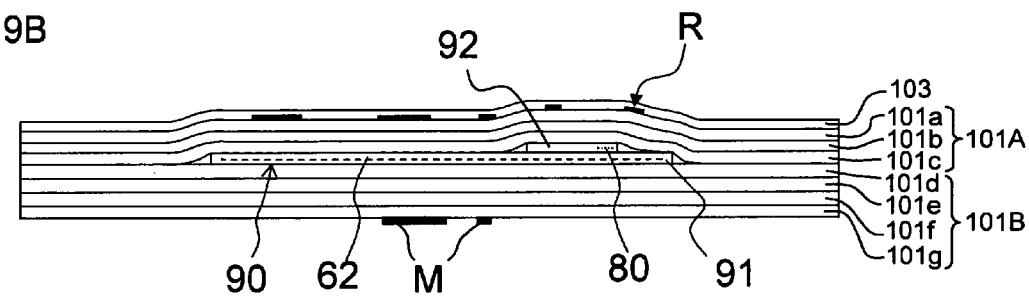
Figure 9C:
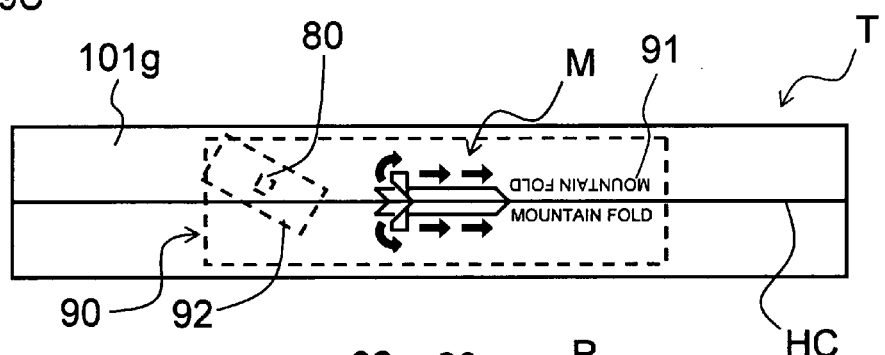
Figure 9D:
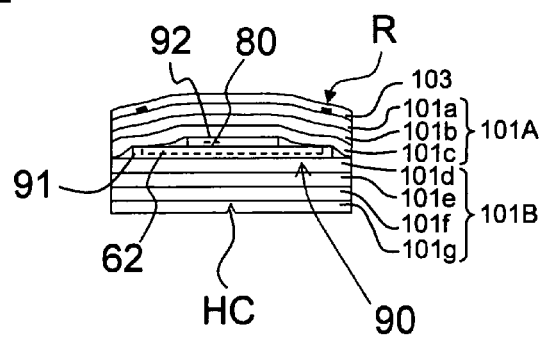

An example of the configuration of the RFID label T produced from the tag tape 101 of embodiment 3 is shown in FIG. 43. As shown in FIG. 43, in embodiment 3, the layout of the IC holding body 92 differs from that in embodiment 1. That is, the points disposed in the upper left position of the antenna base 91 when the RFID label T is viewed from the front surface side (FIG. 43A) and the upper right position when the RFID label T is viewed from the back surface side (FIG. 43C)

in embodiment 3 are disposed in the upper right position of the antenna base 91 when the RFID label is viewed from the front surface side (FIG. 9A) and the upper left position of the antenna base 91 when the RFID label T is viewed from the back surface side in embodiment 1. Note that the layered structure of the RFID label T of embodiment 3 is the same as that of embodiment 1 shown in FIG. 9A to FIG. 9D, the parts identical to those in FIG. 9A to FIG. 9A are denoted using the same reference numerals in FIG. 43A to FIG. 43D, and detailed descriptions thereof will be omitted.

While the example in FIG. 43 shows an illustrative scenario where the IC holding body 92 is provided so as to protrude on the first tape 101A side of the antenna base 91, the IC holding body 92 does not necessary have to be provided on the first tape 101A side in the embodiment, but may be provided so as to protrude on the second tape 101B side of the antenna base 91 as well.

The half-cut line HC is formed in the tape longitudinal direction at the center of the tape width direction on the separation sheet 101g, and the IC holding body 92 is disposed in a position that overlaps with the half-cut line HC. A peel-off display part M1 for imparting to the user the correct peel-off mode of the separation sheet 101g is displayed at the center in the tape longitudinal direction, on the front surface of the separation sheet 101g. The peel-off mode indicated by the peel-off display part M1 is a method that will not result in the possibility of the external force from peel-off adversely affecting component elements of the IC holding body 92 (for example, a method that maintains connection with the antenna base 91 of the IC circuit part 80).

The peel-off display part M1 comprises an image that includes an explanation display instructing the user to make a mountain fold along the half-cut line HC, and an arrow display indicating the direction of peel-off from the half-cut line HC. According to the peel-off display part M1 of the present example, instructions are displayed that make it possible to peel off the separation sheet 101g from the half-cut line HC starting from the side positioned away from the IC holding part 92 (the left side in FIG. 43C) and proceeding toward the opposite direction (rightward in FIG. 43C), without adversely affecting the IC holding body 92. With this arrangement, the guide provided on the peel-off display part M1 enables the user to peel off the separation sheet 101g using a correct peel-off mode that will not result in impairment of the communication function of the RFID tag main body 90.

Figure 44:
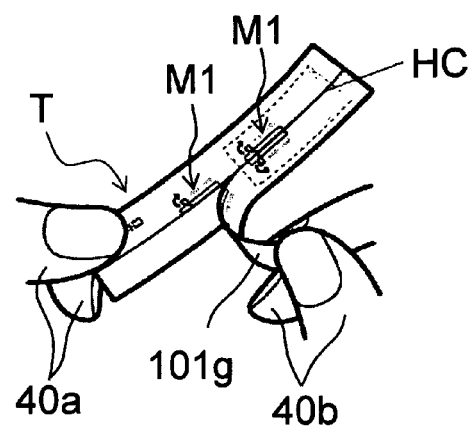
FIG. 44 is an explanatory diagram for explaining one example of a peel-off mode of the separation sheet in accordance with the displayed contents of the peel-off display part.

An example of a peel-off mode of the separation sheet 101g in accordance with the displayed contents of the above peel-off display part M1 is shown in FIG. 44. While the peel-off display part M1 is displayed in two locations along the label longitudinal direction on the separation sheet 101g of the RFID label T of FIG. 44, the method is the same in a case where only one or three or more peel-off display parts M1 are provided.

First, in accordance with the display on the peel-off display part M1, the user positions the separation sheet 101g facing upward, grabs hold of one end (the left end in the figure) of the RFID label T using fingers 40a of one hand and fingers 40b of the other hand and, in that position, folds the RFID label T into a mountain fold along the half-cut line HC so as to raise and separate the separation sheet 101g into two. Then, the user pulls one separated piece (lower piece in the figure) of the raised separation sheet 101g toward the other end (right end in the figure), thereby peeling off the separation sheet 101g to the other end while separating the separation sheet 101g into two along the half-cut line HC. The user then peels off the other separated piece (upper piece in the figure) of the separation sheet 101g so as to peel off the separation sheet 101g from the RFID label T in its entirety. With this arrangement, it is possible to peel off the separation sheet 101g from the RFID label T without adversely affecting the IC holding body 92, thereby improving the user-friendliness at the time of label affixing without impairment of the communication function.

In embodiment 3 configured as described above, the tag tape 101, similar to the aforementioned embodiments, comprises a layered structure of the first tape 101A, the RFID tag main body 90, and the second tape 101B, and the RFID label T is produced using this tag tape 101. When the user uses the produced RFID label T, the user peels off the separation sheet 101g provided on the second tape 101B by hand, and then affixes the RFID label T to the object to be affixed by the exposed adhesive layer 101f.

On the other hand, to achieve the communication function of the RFID tag, the IC circuit part 80 and the loop antenna 62 are required. In embodiment 3 as well, similar to the aforementioned embodiments, the IC circuit part 80 is held to the antenna base 91 by the holding member 95 of the IC holding body 92, and is electrically connected to the loop antenna 62 provided on the antenna base 91. Note that when the user peels off the separation sheet 101g as described above, the peel-off mode (peel-off location, peel-off direction, etc.) causes an external force to be applied to the IC holding body 92 as well, resulting in the possibility that some of the components of the IC holding body 92 may become damaged, thereby impairing the communication function. In embodiment 3, however, the peel-off display part M1 is provided on the separation sheet 101g so as to impart to the user the peel-off mode. With this arrangement, it is possible to guide the user in such a manner that ensures that a wrong peel-off mode that results in adverse effects from an external force will not be employed. As a result, the user can efficiently peel off the separation sheet 101g and affix the RFID label T while preventing the communication function of the RFID tag from becoming impaired. As a result, the user-friendliness at the time of label affixing is improved.

Further, particularly in the present embodiment, the peel-off mode indicated by the peel-off display part M1 includes an arrow display that indicates the peel-off direction from the half-cut line HC that is to be instructed to the user. With the peel-off mode indicated by arrows in this manner, the user can visually easily understand the correct peel-off mode (a method that does not cause an external force to adversely affect the IC holding body) at a glance.

Note that various modifications may be made according to the present embodiment without departing from the spirit and scope of the disclosure, in addition to the above. Description will be made below regarding such modifications.

Figure 45A:
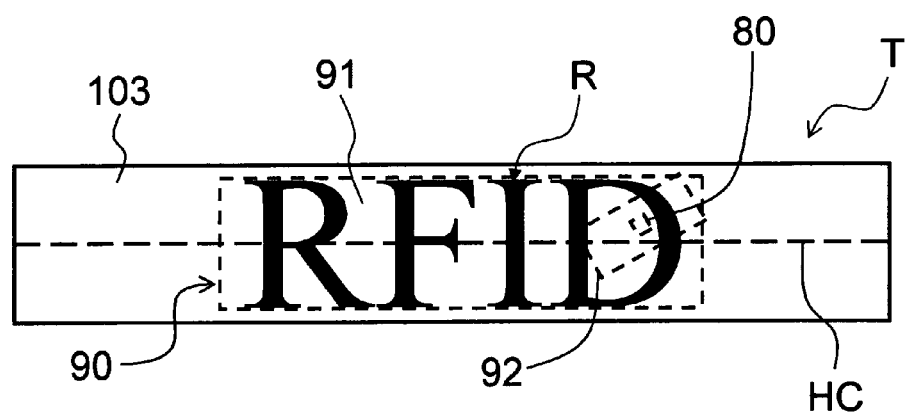
FIG. 45A shows the front surface of the RFID label.
Figure 45B:
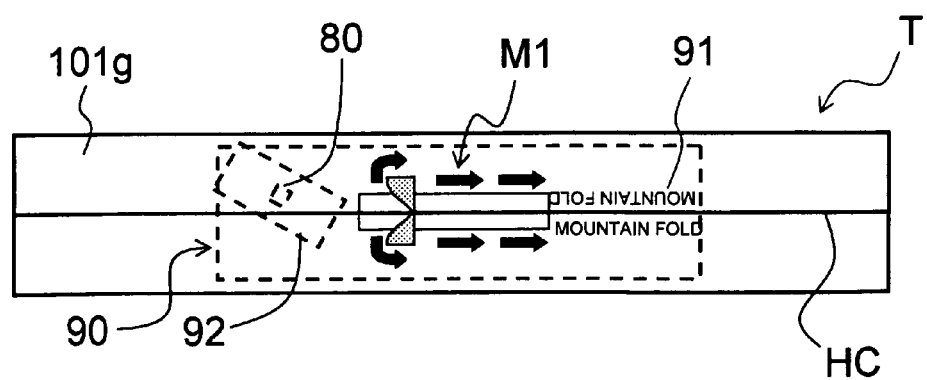
FIG. 45B shows the back surface of the RFID label.

(3-1) When the Peel-Off Display Part Provides Instructions for Peel-Off from the Side Near the IC Holding Body An example of the configuration of the RFID label T produced from the tag tape 101 having the peel-off display part M1 of the present modification is shown in FIG. 45. In the present modification, the IC holding body 92 is disposed in a position (FIG. 45A) above and to the right of the antenna base 91 when the RFID label T is viewed from the front surface side, and in a position (FIG. 45B) above and to the left of the antenna base 91 when the RFID label T is viewed from the back surface side. The half-cut line HC extends in the tape longitudinal direction at the center of the tape width direction of the separation sheet 101g and, similar to the above embodiment 3, the peel-off display part M1 is displayed at the center of the longitudinal direction of the front surface of the separation sheet 101g. Further, in the present embodiment, although not particularly shown, the IC holding body 92 is provided so as to protrude on the first tape 101A side of the antenna base 91.

The peel-off mode instructed by the peel-off display part M1 of the present modification shows that peel-off from the half-cut line HC of the separation sheet 101g begins from the side near the IC holding body 92 (the left side of the RFID label T in FIG. 45) and proceeds toward the side away from the IC holding body 92 (rightward in FIG. 45), opposite that in embodiment 3.

In the present modification having such a configuration, the IC holding body 92 is disposed so as to protrude on the first tape 101A side of the antenna base 91, as described above, resulting in relatively minimal peel-off effect on the IC holding body 92, even when the separation sheet 101g is peeled off from the side near to the side away from the IC holding body 92. Thus, according to the present modification as well, it is possible for the user to efficiently peel off the separation sheet 101g while preventing impairment of the communication function of the RFID tag by viewing the peel-off display part M1.

(3-2) When a Peel-Off Display Part Comprising Text is Provided

Figure 46:
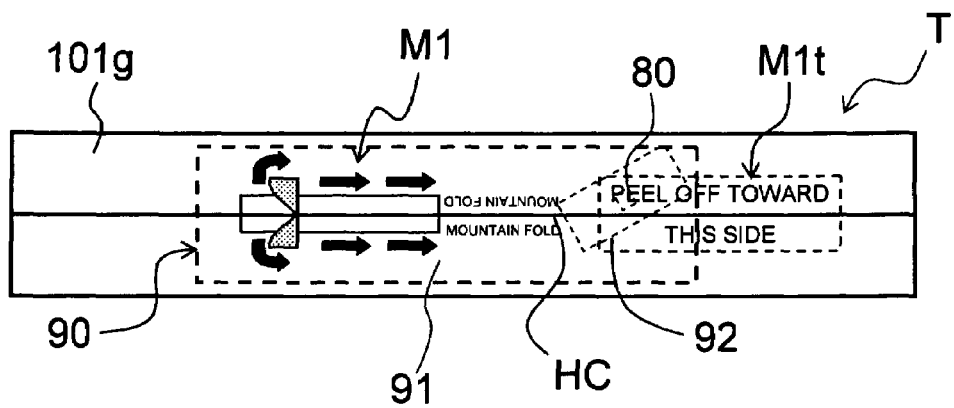
FIG. 46 is a diagram showing an example of the configuration of the RFID label in a case where a peel-off display part comprising text is provided.

An example of the configuration of the RFID label T produced from the tag tape 101 of the present modification is shown in FIG. 46. As shown in FIG. 46. in the present modification, a peel-off display part M1t comprising text such as "Peel off toward this side" is displayed on the front surface of the separation sheet 101g in addition to the peel-off display part M1 (hereinafter, referred to as "peel-off display part M1 including an image" as necessary) similar to that of the above embodiment 3. The configuration of all other components of the modification is the same as that of embodiment 3.

In the present modification, the peel-off mode displayed by the peel-off display parts M1 and M1t includes a text display that indicates the peel-off direction from the half-cut line HC to be instructed to the user. When the peel-off mode is indicated by text in this manner, the user can reliably understand in detail the correct peel-off mode (a method that does not cause an external force to adversely affect the IC holding body).

Figure 47:
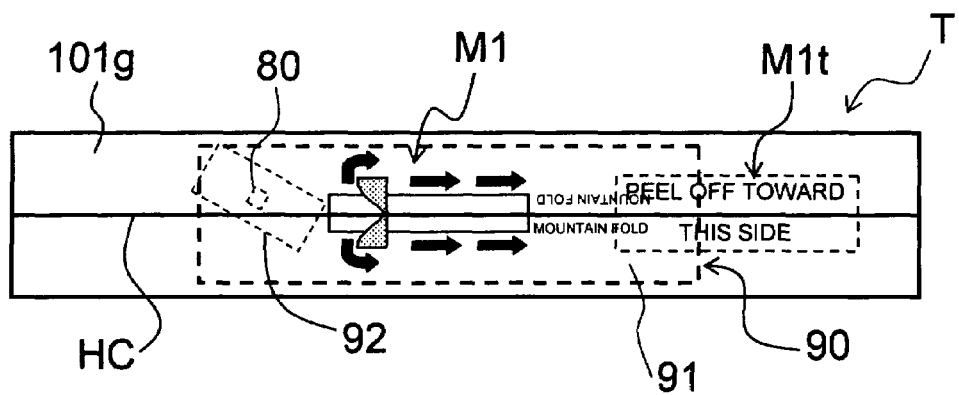
FIG. 47 is a diagram illustrating one example of the configuration of the RFID label in a case where the peel-off display part comprising text imparts peel-off from the side near the IC holding body.

(3-3) When the Peel-Off Display Part Comprising Text Provides Instructions for Peel-Off from the Side Near the IC Holding Body An example of the configuration of the RFID label T produced from the tag tape 101 of the present modification is shown in FIG. 47. In the present modification, similar to the modification (3-1) shown in FIG. 45, the IC holding body 92 is disposed in a position above and to the left of the antenna base 91 when the RFID label T is viewed from the back surface side. On the front surface of the separation sheet 101g, the peel-off display part M1 comprising an image is displayed on the side near the IC holding body 92, and the peel-off display part M1t comprising text is displayed on the side away from the IC holding body 92. These peel-off display parts M1 and M1t impart to the user peel-off in a direction starting from the side near the IC holding body 92. Further, in the present embodiment, although not particularly shown, the IC holding body 92 is provided so as to protrude on the first tape 101A side of the antenna base 91.

When the IC holding body 92 is disposed so as to protrude on the first tape 101A side of the antenna base 91 as described in the above modification (3-1), the peel-off effect on the IC holding body 92 is relatively minimal even when the separation sheet 101g is peeled off from the side near to the side away from the IC holding body 92. With this arrangement, the user can efficiently peel off the separation sheet 101g while preventing impairment of the communication function of the RFID tag by viewing the peel-off display parts M1 and M1t.

(3-4) When the Peel-Off Display Part Displays a Prohibited Peel-Off Mode

Figure 48:
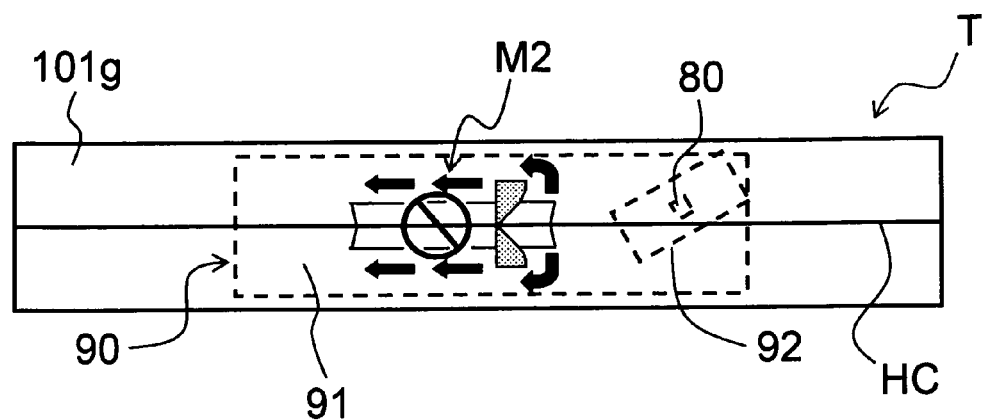
FIG. 48 is a diagram showing an example of the configuration of the RFID label in a case where the peel-off display part shows a prohibited peel-off mode.

An example of the configuration of the RFID label T produced from the tag tape 101 of the present modification is shown in FIG. 48. Although not particularly shown, the IC holding body 92 of the present modification is disposed on the second tape 101B side of the antenna base 91, protruding toward the separation sheet 101 side. Then, a peel-off display part M2 for prohibiting the user from using a wrong peel-off mode of the separation sheet 101g is displayed at the center in the tape longitudinal direction, on the front surface of the separation sheet 101g. The wrong peel-off mode displayed by the peel-off display part M2 is a peel-off mode wherein the external force from peel-off adversely affects the component elements of the IC holding body 92 (for example, a method that does not maintain connection with the antenna base 91 of the IC circuit part 80). The configuration of all other components of the modification is the same as that of embodiment 3.

The above peel-off display part M2 comprises an image that includes an arrow indicating the prohibited peel-off direction. When the IC holding body 92 protrudes on the second tape 101B side (the separation sheet 101g side), peel-off may adversely affect the IC holding body 92 when performed from the side near the IC holding body 92 (the right side in FIG. 48). Since peel-off from the half-cut line HC of the separation sheet 101g adversely affects the IC holding body 92 when started from the side near and continued toward the side away from the IC holding body 92 (the left side in FIG. 48), the peel-off display part M2 in the example prohibits the user from using the wrong peel-off mode. With this arrangement, the user can recognize the wrong peel-off mode by viewing the peel-off display part M2, making it possible to peel off the separation sheet 101g using a correct peel-off mode that does not result in impairment of the communication function of the RFID tag main body 90.

Figure 49:
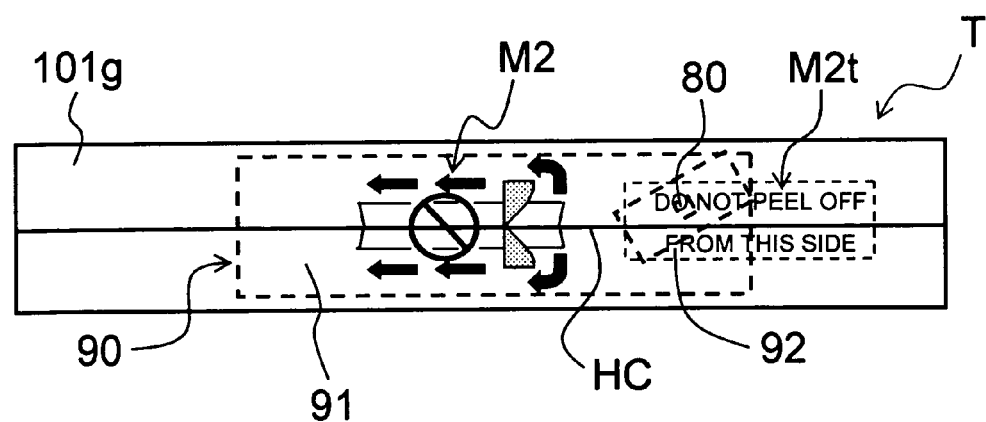
FIG. 49 is a diagram showing an example of the configuration of the RFID label in a case where the peel-off display part comprising text shows a prohibited peel-off mode.

(3-4) When a Peel-Off Display Part Comprising Text Displays a Prohibited Peel-Off Mode An example of the configuration of the RFID label T produced from the tag tape 101 of the present modification is shown in FIG. 49. In the present modification, on the front surface of the separation sheet 101g, the peel-off display part M2 indicating the wrong peel-off mode (hereinafter referred to as "peel-off display part M2 comprising an image" as necessary) is displayed on the side near the IC holding body 92, and a peel-off display part M2t comprising text is displayed on the side away from the IC holding body 92. These peel-off display parts M2 and M2t prohibit peel-off from the side near the IC holding body 92. The configuration of all other components of the present modification is the same as that of modification (3-4) shown in FIG. 48.

According to the modification, the wrong peel-off mode is indicated by text on the peel-off display part M2t, thereby making it possible for the user to reliably understand in detail the wrong peel-off mode (a method whereby external force adversely affects the IC holding body) and, as a result, peel off the separation sheet 101g using the correct peel-off mode that does not result in impairment of the communication function of the RFID tag main body 90.

Figure 50:
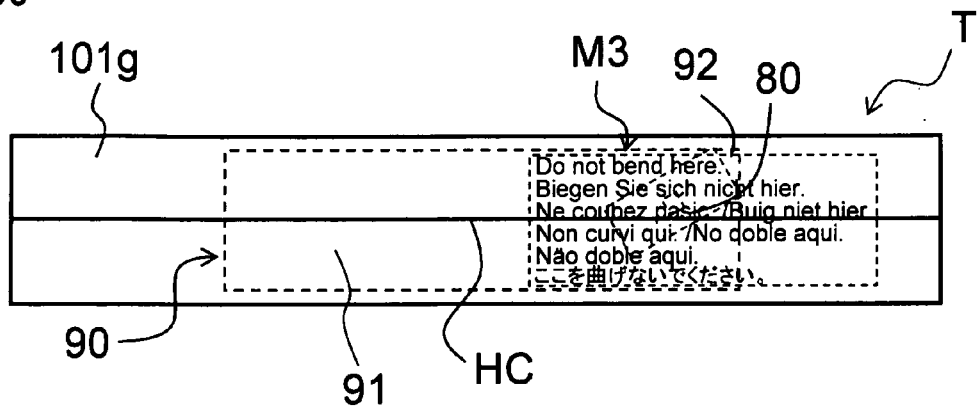
FIG. 50 is a diagram showing an example of the configuration of the RFID label in a case where a peel-off display part comprising text is provided at the position of the IC circuit part.

(3-6) When a Peel-Off Display Part Comprising Text is Provided at the Position of the IC Circuit Part An example of the configuration of the RFID label T produced from the tag tape 101 of the present modification is shown in FIG. 50. In the present modification, a peel-off display part M3 comprising text having the meaning "Do not bend here" in multiple languages including Japanese is provided as a user prohibited peel-off mode at a position that overlaps with the IC circuit part 80 in a planar view, on the front surface of the separation sheet 101g.

With this arrangement, the user can visually recognize the position of the IC circuit part 80 and be guided with respect to the correct peel-off mode. As a result, the user can visually recognize the position of the IC circuit part 80 by viewing the peel-off display part M3, bend the RFID label T along the half-cut line HC at a position that avoids the area indicated by the peel-off display part M3, and peel off the separation sheet 101g without causing an external force to act on the IC holding body 92. Thus, the user can peel off the separation sheet 101g using a correct peel-off mode that does not result in impairment of the communication function of the RFID tag main body 90.

(3-7) When the Position of the IC Circuit Part is Indicated by Text

Figure 51:
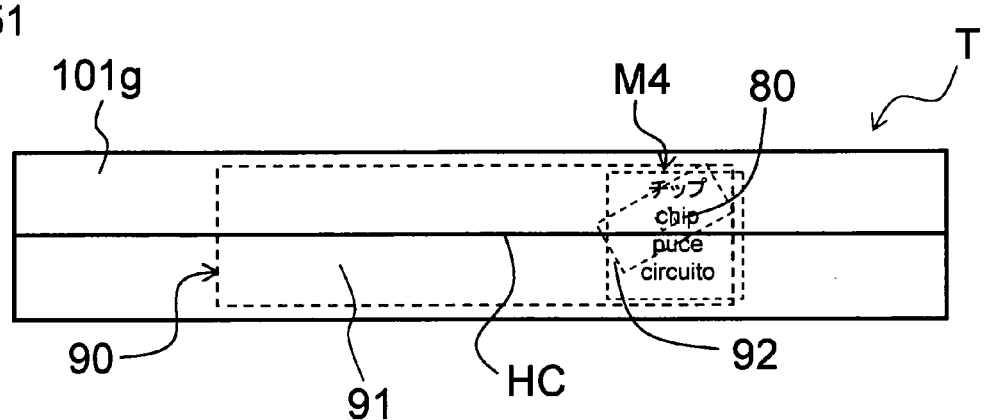
FIG. 51 is a diagram showing an example of the configuration of the RFID label in a case where the position of the IC circuit part is indicated by text.

An example of the configuration of the RFID label T produced from the tag tape 101 of the present modification is shown in FIG. 51. In the present modification, an IC circuit display part M4 comprising text having the meaning "Chip" in multiple languages, including Japanese, is provided at a position that overlaps with the IC circuit part 80 of the IC holding body 92 in a planar view, on the front surface of the separation sheet 101g, so as to indicate the position of the IC circuit part 80 by text.

With this arrangement, the user can visually recognize the position of the IC circuit part 80 and be guided with respect to the correct peel-off mode. As a result, the user can visually recognize the position of the IC circuit part 80 by viewing the IC circuit display part M4 comprising text, bend the RFID label T along the half-cut line HC at a position that avoids the area indicated by the IC circuit display part M4, and peel off the separation sheet 101g without causing an external force to act on the IC holding body 92. Thus, the user can peel off the separation sheet 101g using a correct peel-off mode that does not result in impairment of the communication function of the RFID tag main body 90.

(3-8) When the Position of the IC Circuit Part is Indicated by an Image

Figure 52:
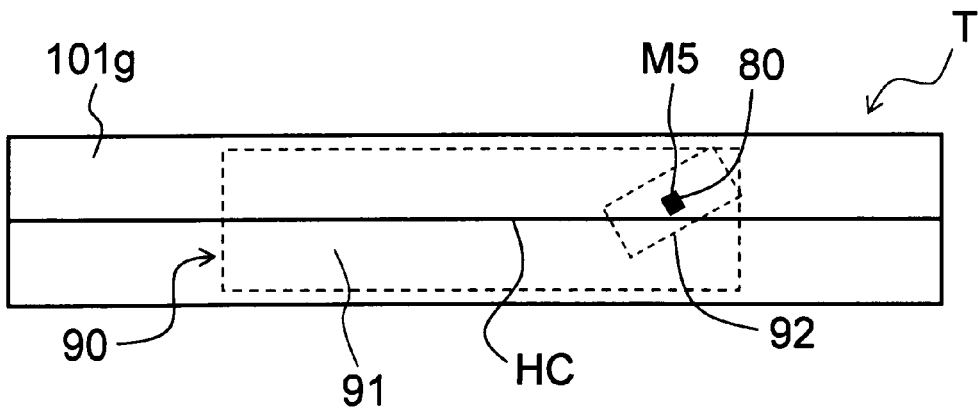
FIG. 52 is a diagram showing an example of the configuration of the RFID label in a case where the position of the IC circuit part is indicated by an image.

An example of the configuration of the RFID label T produced from the tag tape 101 of the present modification is shown in FIG. 52. In the present modification, an IC circuit display part M5 comprising an image corresponding to the IC circuit part 80 is provided at a position that overlaps with the IC circuit part 80 of the IC holding body 92 in a planar view, on the front surface of the separation sheet 101g, so as to indicate the position of the IC circuit part 80 by an image.

With this arrangement, the user can visually recognize the position of the IC circuit part 80 and be guided with respect to the correct peel-off mode. As a result, the user can visually recognize the position of the IC circuit part 80 by viewing the IC circuit display part M5 comprising an image, bend the RFID label T along the half-cut line HC at a position that avoids the area around the IC circuit display part M5, and peel off the separation sheet 101g without causing an external force to act on the IC holding body 92. Thus, the user can peel off the separation sheet 101g using a correct peel-off mode that does not result in impairment of the communication function of the RFID tag main body 90.

(3-9) When a Plurality of Types of Peel-Off Display Parts are Provided

Figure 53:
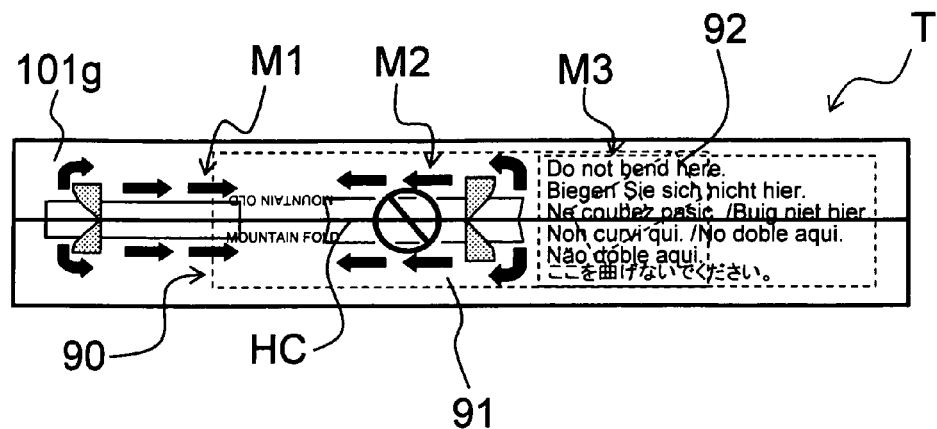
FIG. 53 is a diagram showing an example of the configuration of the RFID label in a case where a plurality of types of the peel-off display part is provided.

The RFID label T produced from the tag tape 101 of the present modification. In the present modification is shown in FIG. 53. As shown in FIG. 53, the peel-off display part M1 of the peel-off mode that comprises an image, the peel-off display part M2 of the peel-off mode that comprises an image, and the peel-off display part M3 of the peel-off mode that comprises text are sequentially provided on the front surface of the separation sheet 101g along the tape longitudinal direction.

In this manner, in the present modification, the peel-off display parts M1 to M3 of a plurality of different types are provided on the separation sheet 101g, thereby providing an increased variation of peel-off mode guiding means to the user.

Furthermore, although not particularly shown, the peel-off display parts M1 to M3 may be repeatedly disposed as a set at a predetermined interval on the separation sheet 101g. In such a case, the peel-off display parts of a plurality of types may be easily formed in the manufacturing stage of the second tape 101B side of the tag tape 101 by executing printing repeatedly using one proof.

Figure 54:
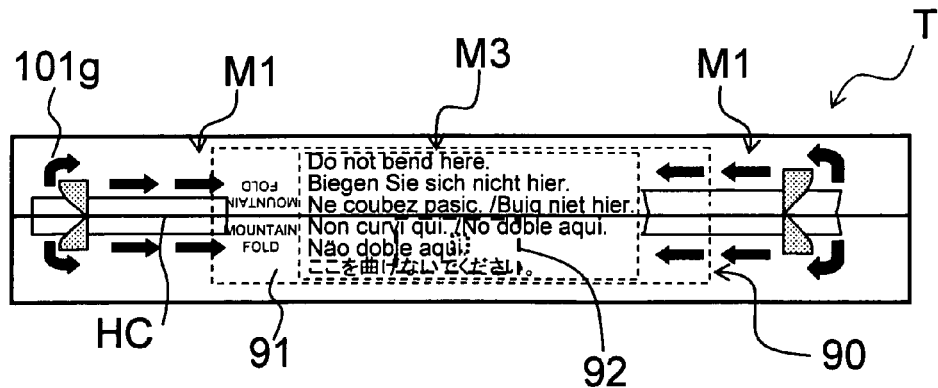
FIG. 54 is a diagram showing an example of the configuration of the RFID label in a case where the IC holding body is disposed on one side of the tape width direction, and a plurality of types of the peel-off display part is provided.

(3-10) When a Plurality of Types of Peel-Off Display Parts is Displayed on an RFID Label Having a Different IC Holding Body Layout An example of the configuration of the RFID label T produced from the tag tape 101 of the present modification is shown in FIG. 54. In the present modification, the IC holding body 92 is disposed toward one tape width direction side (lower side in the figure) at the center of the tape longitudinal direction. On the front surface of the separation sheet 101g, the peel-off display part M1 of the peel-off mode that comprises an image on both sides in the tape longitudinal direction, and the peel-off display part M3 of the peel-off mode that comprises text at the center of the longitudinal direction are displayed in series along the tape longitudinal direction. That is, in the modification, since the IC holding body 92 is disposed at the center of the tape longitudinal direction, resulting in a relatively minimal peel-off effect on the IC holding body 92 even when the separation sheet 101g is peeled from either end side of the tape longitudinal direction of the RFID label T, such a display method is used.

In this modification as well, the peel-off display parts M1 and M3 of a plurality of different types are provided on the separation sheet 101g, thereby achieving similar advantages as above, such as providing an increased variation of peel-off mode guiding means to the user.

(3-11) Half-Cut Line Variations

While only a case where the half-cut line HC that continually extends along the tape longitudinal direction is provided on the separation sheet 101g of the tag tape 101 is described in the above embodiment 3, the present disclosure is not limited thereto. As described in the aforementioned embodiment 1 and embodiment 2, the half-cut line HC may be provided in the tape width direction or in a non-continuous half-line or perforated line shape in embodiment 3 as well. Furthermore, the half-cut line HC may be provided in the aforementioned circular arc shape, Ω-shape, L-shape, V-shape or diagonal slit shape as a handle for peeling off the separation sheet 101g.

(4) Other

While the above-described embodiments 1 and 3 have been described in connection with an illustrative scenario in which the present disclosure is applied to a case where the produced RFID label T is of a so-called laminated type in which the printing cover film 103 is bonded to the tag tape 101, the present disclosure is not limited thereto. For example, the present disclosure may also be applied to a case where the produced RFID label T is of a so-called non-laminated type in which printing is performed directly on the front surface of the tag tape without any bonding performed thereto.

Figure 55:
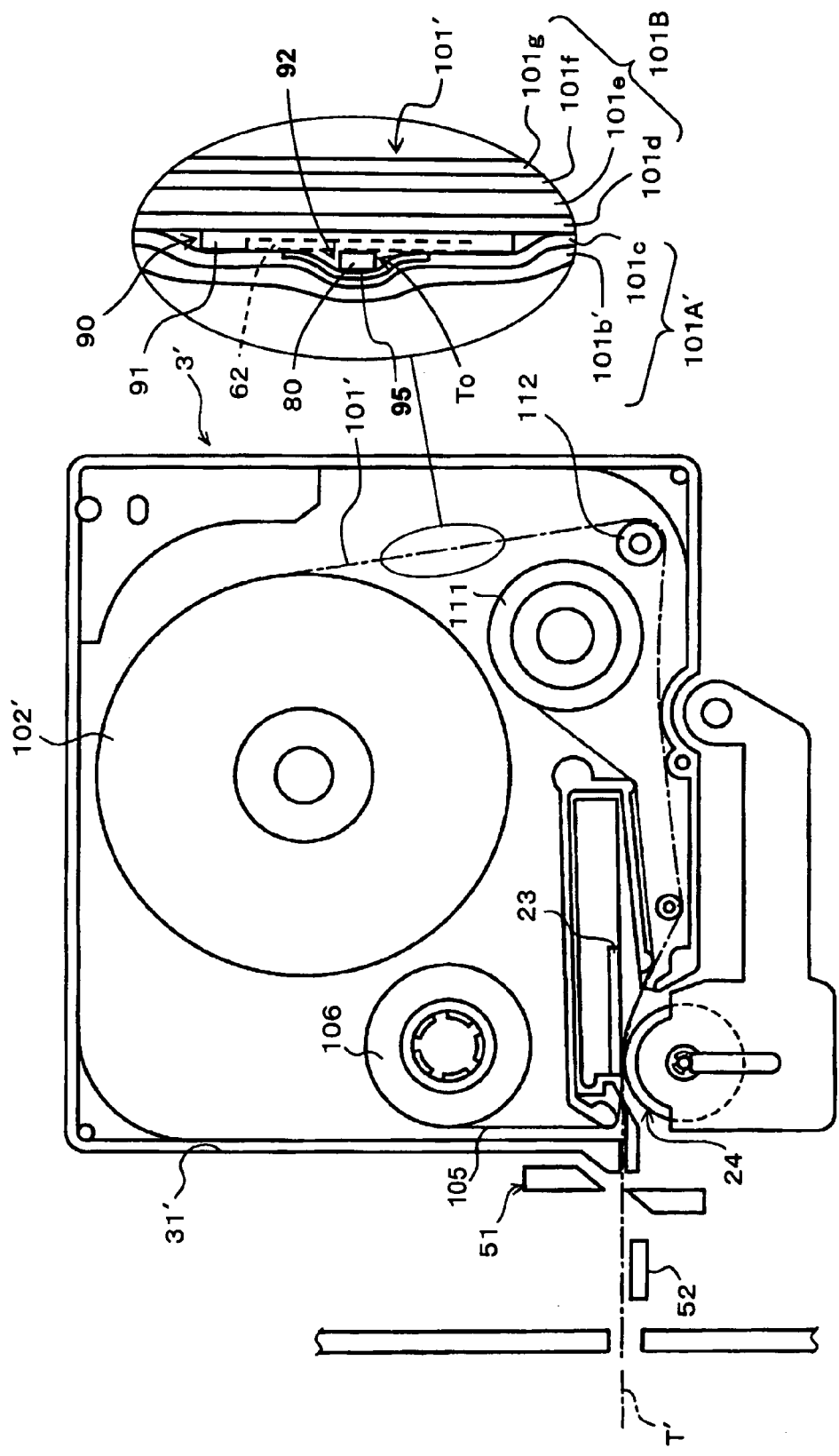
FIG. 55 is a diagram schematically showing the configuration of the cartridge holder mounted to the tag label producing apparatus that produces non-laminated-type RFID labels, and the main parts of the cartridge mounted thereto.

An example of the configuration of the main sections of a cartridge holder 31' of a tag label producing apparatus (not shown) that produces an RFID label T' of the above non-laminated type is shown in FIG. 55. This figure corresponds to FIG. 3 of the aforementioned embodiment 1. Note that the parts identical to those in FIG. 3 are denoted using the same reference numerals, and descriptions thereof will be suitably omitted.

The tag label producing apparatus that produces this non-laminated type RFID label T' prints print from the print head 23 using the ink ribbon 105 on the front surface (left side in FIG. 55) of a first base film 101b' (in this case, a transfer layer comprising a transfer material capable of forming print by heat transfer from the ink ribbon) of a tag tape 101' of a six-layer structure fed out from a first roll 102', and cuts the tag tape 101' so as to produce the RFID label T'. In this case, the two layers of the first base film 101b' and the adhesive layer 101c that contains the RFID tag main body 90 are integrated into a single unit, constituting a first tape 101A'. With this non-laminated type RFID label T' of the present modification produced in this manner, the same advantages as those of the above embodiments 1 and 3 are achieved.

While the above has been described in connection with an illustrative scenario of the non-laminated type in which the first base film 101b is the transfer layer, the present disclosure is not limited thereto. The first base film 101b' may be an image-receiving layer comprising an image-receiving material capable of forming print by applying ink, or a thermosensitive layer comprising a heat-sensitizing agent that produces color when heated.

Further, in the above, an example was given of printing, and writing and reading RFID tag information to the tag tape 101 that is in motion, but this is not a limitation. It is also possible to print or read and write by first stopping the tag tape 101, etc., at a predetermined position (and it is also possible to hold the tag tape 101, etc., at a predetermined feeding guide for reading and writing).

Further, while the above has been described in connection with an illustrative scenario in which the printed tag label tape 109 with print, which has accessed (performed reading/writing with) the RFID circuit element To, is cut by the cutter 51 so as to form the RFID label T, the present disclosure is not limited thereto. That is, in a case where a label mount (a so-called die cut label) separated in advance to a predetermined size corresponding to the label is continuously disposed on the tape fed out from the roll, the present disclosure may also be applied to a case where the label is not cut by the cutter 51 but rather the label mount (a label mount containing the accessed RFID circuit element To on which corresponding printing has been performed) only is peeled from the tape after the tape has been discharged from the discharging exit 7 so as to form the RFID label T.

Further, while in the above RFID tag information reading/writing is performed with the IC circuit part 80 of the RFID circuit element To and printing is performed using the print head 23 in order to identify that RFID circuit element To, such printing does not necessarily need to be performed; the present disclosure may be applied to a case where only RFID information reading/writing is executed.

Furthermore, while the above has been described in connection with an illustrative scenario where the tag tape 101 is wound around a reel member 102a so as to form a first roll 102, and the first roll 102 is disposed within the cartridge 3, and hence the tag tape 101 is fed out from the cartridge 7, the present disclosure is not limited thereto. For example, an arrangement can be made as follows. Namely, a long-length or rectangular tape or sheet (including tape cut to a suitable length after being supplied from a roll) in which at least one RFID circuit element To is disposed is stacked (laid flat and layered into a tray shape, for example) in a predetermined housing part so as to form a cartridge. The cartridge is then mounted to the cartridge holder provided to the tag label producing apparatus 1. Then, the tape or sheet is supplied or fed from the housing part, and printing or writing is performed so as to produce the RFID label T.

Furthermore, a configuration wherein the above-described roll is directly removably loaded to the tag label producing apparatus 1 side, or a configuration wherein a long, flat paper-shaped or strip-shaped tape or sheet is moved one piece at a time from outside the tag label producing apparatus 1 by a predetermined feeder mechanism and supplied to within the tag label producing apparatus 1 are also possible. Additionally, the structure of the roll is not limited to a type that is removable from the tag label producing apparatus 1 main body, such as the cartridge 3, but rather the first roll 102 may be provided as a so-called installation type or an integrated type that is not removable from the apparatus main body 2 side. In each of these cases as well, the same advantages are achieved.

While embodiments 1 to 3 of the present disclosure and the modifications thereof have been described above, other approaches according to the respective embodiments and exemplary modifications may be utilized in combination as appropriate.

What is claimed is:

1. A tag tape comprising a plurality of REID tag main bodies, and a first tape and a second tape provided on opposite sides in the tape thickness direction so as to position said plurality of RFID tag main bodies therebetween, wherein:
   said RFID tag main body comprises a sheet-shaped antenna base, a tag antenna provided on said antenna base and having an antenna pattern that transmits and receives information, and an IC holding body that includes an IC circuit art storing information and a holding member holding said IC circuit part to said antenna base;
   said IC holding body is provided so as to protrude toward one side in the tape thickness direction on the first tape side or the second tape side of said antenna base, and comprises a first connection land connected to one end part of said antenna pattern and a second connection land connected to the other end part of said antenna pattern;
   both ends of said IC circuit part are respectively connected to said first connection land and said second connection land;
   said second tape comprises an affixing adhesive layer for affixing said plurality of RFID tag main bodies to an object to be affixed, and a separation material layer provided on said affixing side of said affixing adhesive layer and peeled off by a user at the affixing; and
   said separation material layer comprises a cut art for separation material layer peel-off that is cut in at least part of the thickness of said separation material layer in at least one location in the surface direction of said separation material layer, and
   said first tape comprises a curved section which curves to project toward the one side in the tape thickness direction.

2. The tag tape according to claim 1 wherein:
   said IC holding body is provided so as to protrude on said second tape side of said antenna base.

3. The tag tape according to claim 1 wherein:
   said first tape comprises a bonding adhesive layer for bonding with a print-receiving layer made of a print-receiving material capable of forming print or a print-receiving tape capable of forming print.

4. The tag tape according to claim 1 wherein:

said tag antenna is a loop antenna comprising said antenna pattern of a loop coil shape;

said IC holding body comprises said first connection land for connecting said antenna pattern positioned on the radial direction outer side of said loop-cool shape from said IC circuit part and said IC circuit part, and said second connection land for connecting said antenna pattern positioned on the radial direction inner side of said loop coil shape from said IC circuit part and said IC circuit part; and said IC circuit part is provided so as to extend over said first connection land and said second connection land.

5. The tag tape according to claim 4, wherein:

said second connection land of said IC holding body is provided in a position that overlaps with said cut line of said separation material layer in a planar view.

6. An RFID label produced by use of the tag tape according to claim 1, wherein:

said RFID label is formed by cutting said tag tape with a predetermined length.

7. A tag tape roll comprising the tag tape according to claim 1, wherein:

said tag tape is wound around an axis substantially orthogonal to the longitudinal direction of said tag tape.

8. An RFID circuit element cartridge comprising a tag tape roll including the tag tape according to claim 1, wherein:

said RFID circuit element cartridge is detachably provided to a tag label producing apparatus.

\* \* \* \* \*